(12) United States Patent
Genolini et al.

(10) Patent No.: US 11,106,866 B2
(45) Date of Patent: Aug. 31, 2021

(54) INTERACTIVE INTERFACE FOR IMPROVING THE MANAGEMENT OF DATASETS

(71) Applicant: ZEBRYS, Toulouse (FR)

(72) Inventors: Christophe Genolini, Toulouse (FR); Aygul Abakirova, Toulouse (FR)

(73) Assignee: ZEBRYS, Toulouse (FR)

( * ) Notice: Subject to any disclaimer, the term of this patent is extended or adjusted under 35 U.S.C. 154(b) by 0 days.

(21) Appl. No.: 16/624,880

(22) PCT Filed: Jun. 27, 2018

(86) PCT No.: PCT/EP2018/067270
§ 371 (c)(1),
(2) Date: Dec. 19, 2019

(87) PCT Pub. No.: WO2019/002379
PCT Pub. Date: Jan. 3, 2019

(65) Prior Publication Data
US 2020/0143110 A1 May 7, 2020

(30) Foreign Application Priority Data

Jun. 27, 2017 (EP) .................................... 17305804

(51) Int. Cl.
*G06F 40/18* (2020.01)
*G06F 17/18* (2006.01)
*G06T 11/20* (2006.01)

(52) U.S. Cl.
CPC .............. *G06F 40/18* (2020.01); *G06F 17/18* (2013.01); *G06T 11/206* (2013.01)

(58) Field of Classification Search
CPC ........ G06F 17/18; G06F 40/18; G06F 40/103; G06F 40/111; G06F 40/205; G06T 11/206
See application file for complete search history.

(56) References Cited

U.S. PATENT DOCUMENTS

| 7,536,413 B1 * | 5/2009 | Mohan .................. G06F 16/355 |
| 9,542,622 B2 * | 1/2017 | Gulwani ............... G06F 3/0484 |

(Continued)

FOREIGN PATENT DOCUMENTS

| EP | 1 286 284 A1 | 2/2003 |
| WO | 2007/032913 A1 | 3/2007 |

OTHER PUBLICATIONS

Jon Peltier, "Highlighted Chart Source Data", published: May 2008, pp. 1-10, (Year: 2008).*

(Continued)

*Primary Examiner* — Wilson W Tsui
(74) *Attorney, Agent, or Firm* — BakerHostetler

(57) ABSTRACT

The invention relates to the field of data representation, for example for spreadsheet applications. The invention comprises accessing a dataset comprising values of variables for a plurality of objects. The invention further comprises generating a raw representation of the value, and a synthetic representation of the values for a variable, which depends on the type of variable. The synthetic representation of values comprises a plurality of elements, each elements corresponding to a plurality of values of the variable for a plurality of objects. The invention comprises receiving from a user a selection of an element of the synthetic representation, and selecting the corresponding plurality of objects. The type of synthetic representation being dependent upon the type of variable, the invention allows the user to easily and intuitively select objects interest him/her.

9 Claims, 39 Drawing Sheets

(56) References Cited

U.S. PATENT DOCUMENTS

| | | | |
|---|---|---|---|
| 2004/0205524 A1* | 10/2004 | Richter | G06F 40/18 715/213 |
| 2007/0055556 A1* | 3/2007 | Frank-Backman | G06F 40/18 715/212 |
| 2009/0300482 A1* | 12/2009 | Summers | G06F 16/832 715/234 |
| 2013/0080444 A1* | 3/2013 | Wakefield | G06F 16/904 707/748 |
| 2013/0097177 A1* | 4/2013 | Fan | G06F 16/221 707/748 |
| 2014/0149841 A1 | 5/2014 | Magar et al. | |
| 2015/0074127 A1* | 3/2015 | Cherwinka | G06F 40/103 707/755 |
| 2017/0046872 A1* | 2/2017 | Geselowitz | G06T 19/20 |
| 2018/0088753 A1* | 3/2018 | Viegas | G06F 40/216 |

OTHER PUBLICATIONS

Publisher: StackOverflow, published: 2012, pp. 1-2 (Year: 2012).*

Brath, et al., "Spreadsheet Validation and Analysis through Content Visualization", Mar. 3, 2008.

Campos, et al., "Data-Centric Automated Data Mining", Fourth International Conference on Machine Learning and Applications (ICMLA'05), Dec. 15, 2005.

"Microsoft SQL Server Integration Services: Mixed data types in Excel column", Jun. 25, 2011.

Baudel, "From information visualization to direct manipulation: extending a generic visualization framework for the interactive editing of large datasets", Proceedings of the 19th Annual ACM Symposium on User Interface Software and Technology, Montreux, Switzerland, Oct. 15-18, 2006.

Heer, et al., "Interactive Dynamics for Visual Analysis", vol. 10, Issue 2, Feb. 20, 2012.

* cited by examiner

| | File | | | | | Edit | | Color | | | | Fenêtres | | | | | Sous-groupes | | |
|---|---|---|---|---|---|---|---|---|---|---|---|---|---|---|---|---|---|---|---|
| Id | Age | Sexe | NiveauDEtude | UFR | Redoublement | MentionBac | Copier | Communiquer | EchangeBrouillon | Antiseche | SMS | CoursGenoux | GarderCopie | PreparerSalle | VolerSujet |
| 1 | 21 | Homme | L3 | STAPS | Oui | Passable | Souvent | Parfois | Rarement | Jamais | Jamais | Rarement | Jamais | Jamais | Jamais |
| 2 | 20 | Femme | L3 | STAPS | Non | Passable | Jamais | Parfois | Rarement | Jamais | Jamais | Jamais | Jamais | Jamais | Jamais |
| 3 | 21 | Femme | L3 | STAPS | Non | Passable | Rarement | Parfois | Parfois | Jamais | Jamais | Jamais | Jamais | Jamais | Jamais |
| 4 | 24 | Homme | L3 | STAPS | Oui | Passable | Jamais | Jamais | Jamais | Jamais | Jamais | Jamais | Jamais | Jamais | Jamais |
| 5 | 21 | Femme | L3 | STAPS | Oui | Assez Bien | Parfois | Souvent | Souvent | Souvent | Jamais | Rarement | Jamais | Jamais | Jamais |
| 6 | 20 | Femme | L3 | STAPS | Non | Passable | Rarement | Souvent | Parfois | Souvent | Jamais | Rarement | Jamais | Jamais | Rarement |
| 7 | 22 | Homme | L3 | STAPS | Non | Bien | Parfois | Toujours | Jamais | Jamais | Jamais | Jamais | Jamais | Jamais | Jamais |
| 8 | 21 | Femme | L3 | STAPS | Oui | Passable | Rarement | Parfois | Rarement | Jamais | Jamais | Jamais | Jamais | Jamais | Jamais |
| 9 | 22 | Femme | L3 | STAPS | Oui | Assez Bien | Jamais | Parfois | Jamais | Souvent | Jamais | Jamais | Jamais | Jamais | Jamais |
| 10 | 22 | Homme | L3 | STAPS | Oui | Passable | Rarement | Rarement | Rarement | Jamais | Jamais | Jamais | Jamais | Jamais | Jamais |
| 11 | 24 | Homme | L3 | STAPS | Oui | Passable | Rarement | Rarement | Rarement | Jamais | Jamais | Jamais | Jamais | Jamais | Jamais |
| 12 | 20 | Homme | L3 | STAPS | Non | Assez Bien | Rarement | Rarement | Jamais | Jamais | Jamais | Rarement | Jamais | Jamais | Jamais |
| 13 | 22 | Homme | L3 | STAPS | Oui | Assez Bien | Toujours | Toujours | Parfois | Parfois | Jamais | Jamais | Jamais | Jamais | Jamais |
| 14 | 23 | Homme | L2 | SEGMI | Oui | Passable | Souvent | Parfois | Parfois | Jamais | Jamais | Jamais | Jamais | Rarement | Jamais |
| 15 | 19 | Homme | L2 | SEGMI | Non | Assez Bien | Parfois | Parfois | Rarement | Rarement | Jamais | Jamais | Jamais | Jamais | Jamais |
| 16 | 18 | Homme | L2 | SEGMI | Non | Bien | Parfois | Parfois | Parfois | Rarement | Rarement | Jamais | Jamais | Jamais | Jamais |
| 17 | 20 | Femme | L2 | SEGMI | Oui | Passable | Parfois | Rarement | Rarement | Rarement | Jamais | Jamais | Jamais | Jamais | Jamais |
| 18 | 19 | Femme | L2 | SEGMI | Oui | Passable | Parfois | Rarement | Rarement | Rarement | Jamais | Jamais | Jamais | Jamais | Jamais |
| 19 | 19 | Femme | L2 | SEGMI | Non | Passable | Parfois | Parfois | Rarement | Rarement | Jamais | Jamais | Jamais | Jamais | Jamais |
| 20 | 20 | Femme | L2 | SEGMI | Non | Assez Bien | Rarement | Rarement | Rarement | Jamais | Jamais | Jamais | Jamais | Jamais | Jamais |
| 21 | 19 | Femme | L2 | SEGMI | Non | Assez Bien | Rarement | Parfois | Rarement | Rarement | Jamais | Jamais | Jamais | Jamais | Jamais |
| 22 | 18 | Femme | L2 | SEGMI | Non | Assez Bien | Rarement | Parfois | Rarement | Jamais | Jamais | Jamais | Jamais | Jamais | Jamais |
| 23 | 19 | Femme | L2 | SEGMI | Non | Assez Bien | Parfois | Jamais | Rarement | Rarement | Jamais | Jamais | Jamais | Jamais | Jamais |
| 24 | 21 | Femme | M1 | SJAP | Oui | Assez Bien | Rarement | Jamais | Rarement | Rarement | Jamais | Rarement | Jamais | Jamais | Jamais |
| 25 | 22 | Femme | M1 | SJAP | Oui | Rattrapage | Rarement | Jamais | Rarement | Rarement | Jamais | Jamais | Jamais | Jamais | Jamais |
| 26 | 19 | Femme | M1 | SJAP | Non | Assez Bien | Jamais | Jamais | Rarement | Rarement | Jamais | Jamais | Jamais | Jamais | Jamais |
| 27 | 22 | Femme | M1 | SJAP | Non | Rattrapage | Rarement | Rarement | Rarement | Rarement | Jamais | Rarement | Jamais | Jamais | Jamais |
| 28 | 21 | Femme | M1 | SJAP | Non | Passable | Passable | Parfois | Rarement | Rarement | Jamais | Jamais | Jamais | Jamais | Jamais |
| 29 | 21 | Femme | M1 | SJAP | Oui | Passable | Parfois | Parfois | Rarement | Jamais | Jamais | Rarement | Jamais | Jamais | Jamais |
| 30 | 22 | Femme | M1 | SJAP | Oui | Passable | Jamais | Jamais | Jamais | Jamais | Jamais | Jamais | Jamais | Jamais | Jamais |

FIG.2

| | File | | Edit | Color | | Fenêtres | | | Sous-groupes |
|---|---|---|---|---|---|---|---|---|---|
| | Id | Age | Sexe | NiveauDEtude | UFR | Redoublement | MentionBac | | Copier |
| 1 | 101 | 21 | Homme | L3 | STAPS | Oui | Passable | | Souvent |
| 2 | 104 | 20 | Femme | L3 | STAPS | Non | Passable | | Jamais |
| 3 | 106 | 21 | Femme | L3 | STAPS | Non | Passable | | Rarement |
| 4 | 107 | 24 | Homme | L3 | STAPS | Oui | Passable | | Jamais |
| 5 | 109 | 21 | Femme | L3 | STAPS | Oui | Assez Bien | | Parfois |
| 6 | 111 | 20 | Femme | L3 | STAPS | Non | Passable | | Rarement |
| 7 | 113 | 22 | Homme | L3 | STAPS | Non | Bien | | Parfois |
| 8 | 116 | 21 | Homme | L3 | STAPS | Oui | Passable | | Rarement |
| 9 | 119 | 22 | Homme | L3 | STAPS | Oui | Assez Bien | | Jamais |
| 10 | 122 | 22 | Homme | L3 | STAPS | Oui | Passable | | Rarement |
| 11 | 125 | 24 | Homme | L3 | STAPS | Oui | Passable | | Rarement |
| 12 | 128 | 20 | Homme | L3 | STAPS | Non | Passable | | Rarement |
| 13 | 130 | 22 | Homme | L3 | STAPS | Oui | Assez Bien | | Toujours |
| 14 | 132 | 23 | Homme | L2 | SEGMI | Oui | Passable | | Souvent |
| 15 | 136 | 19 | Homme | L2 | SEGMI | Non | Assez Bien | | Parfois |
| 16 | 139 | 18 | Homme | L2 | SEGMI | Non | Bien | | Parfois |
| 17 | 141 | 20 | Femme | L2 | SEGMI | Oui | Passable | | Parfois |
| 18 | 145 | 19 | Femme | L2 | SEGMI | Oui | Passable | | Parfois |
| 19 | 149 | 19 | Femme | L2 | SEGMI | Non | Passable | | Jamais |
| 20 | 151 | 20 | Femme | L2 | SEGMI | Non | Assez Bien | | Rarement |
| 21 | 153 | 19 | Femme | L2 | SEGMI | Non | Assez Bien | | Rarement |
| 22 | 157 | 18 | Femme | L2 | SEGMI | Non | Assez Bien | | Rarement |

| | Id | Age | Sexe | NiveauDEtude | UFR | Redoublement | MentionBac | | Copier |
|---|---|---|---|---|---|---|---|---|---|
| 1 | Min. | 101 | 18 | Femme | 120 L2 | 103 SEGMI | 104 Non | 143 Assez Bien | 86 Jamais | 54 |
| 2 | 1st Qu. | 286,8 | 20 | Homme | 166 L3 | 123 SJAP | 36 Oui | 143 Bien | 20 Parfois | 99 |
| 3 | Median | 469 | 21 | | M1 | 36 STAPS | 146 | Felicitations | 1 Rarement | 87 |
| 4 | 3rd Qu. | 652,5 | 22 | | M2 | 23 | | Jamais | 1 Souvent | 36 |
| 5 | Max. | 831 | 41 | | | | | Passable | 133 Toujours | 9 |
| 6 | Mean | 466,6 | 20,92 | | | | | Rattrapage | 42 | |
| 7 | Sd | 211,93 | 2,06 | | | | | ... | | |

FIG.3

| | File | | | | Edit | | | Color | | | Fenêtres | | | Sous-groupes | |
|---|---|---|---|---|---|---|---|---|---|---|---|---|---|---|---|
| Id | Age | Sexe | Taille | UFR | Redoublement | MentionBac | NiveauDEtude | Copier | Communiquer | EchangeBrouillon |
| ☐ Logical | ☐ Logical | ☐ Logical | ☐ Logical | ☐ Logical | ☑ Logical | ☐ Logical | ☐ Logical | ☐ Logical | ☐ Logical | ☐ Logical |
| ☑ Integer | ☑ Integer | ☐ Integer | ☐ Integer | ☐ Integer | ☐ Integer | ☐ Integer | ☐ Integer | ☐ Integer | ☐ Integer | ☐ Integer |
| ☑ Numeric | ☑ Numeric | ☑ Numeric | ☑ Numeric | ☐ Numeric | ☐ Numeric | ☐ Numeric | ☐ Numeric | ☐ Numeric | ☐ Numeric | ☑ Numeric |
| ☐ Ordered | ☐ Ordered | ☐ Ordered | ☐ Ordered | ☐ Ordered | ☐ Ordered | ☐ Ordered | ☐ Ordered | ☐ Ordered | ☐ Ordered | ☐ Ordered |
| ☐ Nominal | ☐ Nominal | ☐ Nominal | ☐ Nominal | ☑ Nominal | ☐ Nominal | ☑ Nominal | ☑ Nominal | ☑ Nominal | ☑ Nominal | ☑ Nominal |
| | 18 | Femme | 57053b | economie | Oui | Assez bien | L2 | Jamais | Jamais | Jamais |
| | 19 | Homme | | piano | Non | Bien | L3 | Parfois | Parfois | Parfois |
| | 20 | | | SEGMI | | Felicitation | M1 | Rarement | Rarement | Rarement |
| | 21 | | | Sjap | | Passable | M2 | Souvent | Souvent | Souvent |
| | 22 | | | SJAP | | Rattrapage | | Toujours | Toujours | Toujours |
| | ... | | | STAPS | | Tres bien | | | | |
| | New | New | New | New | New | New | New | New | New | New |
| Id | Age | Sexe | Taille | UFR | Redoublement | MentionBac | NiveauDEtude | Copier | Communiquer | EchangeBrouillon |
| 101 | 21 | Homme | 1,76 | STAPS | Oui | Passable | L3 | Souvent | Parfois | Rarement |
| 104 | 20 | Femme | 1,62 | economie | Non | Passable | L3 | Jamais | Parfois | Rarement |
| 106 | 21 | Femme | 1,7 | STAPS | Non | Passable | L3 | Rarement | Parfois | Parfois |
| 107 | 24 | Homme | 1,79 | STAPS | Oui | Passable | L3 | Jamais | Jamais | Jamais |
| 109 | 21 | Homme | 1,85 | STAPS | Oui | Assez Bien | L3 | Parfois | Souvent | Souvent |
| 111 | 20 | Femme | 1,69 | STAPS | Non | Passable | L3 | Rarement | Souvent | Parfois |
| 113 | 22 | Homme | 1,67 | STAPS | Non | Bien | L3 | Parfois | Toujours | Jamais |
| 116 | 21 | Homme | 1,74 | STAPS | Oui | Passable | L3 | Rarement | Parfois | Rarement |
| 119 | 22 | Homme | 1,86 | STAPS | Oui | Assez Bien | L3 | Jamais | Parfois | Jamais |
| 122 | 22 | Homme | 1,86 | piano | OUI | Passable | L3 | Rarement | Rarement | Rarement |
| 125 | 24 | Homme | 1,78 | STAPS | OUI | Passable | L3 | Rarement | Rarement | Jamais |
| 128 | 20 | Homme | 1,75 | STAPS | Non | Passable | L3 | Rarement | Rarement | Rarement |
| 130 | 22 | Homme | 1,77 | STAPS | Oui | Assez Bien | L3 | Toujours | Toujours | Jamais |
| 132 | 23 | Homme | 1,75 | SEGMI | Oui | Passable | L2 | Souvent | Parfois | Parfois |
| 136 | 19 | Homme | 1,75 | SEGMI | Non | Assez Bien | L2 | Parfois | Parfois | Rarement |
| 139 | 18 | Homme | 1,76 | SJAP | Non | Bien | L2 | Parfois | Parfois | Parfois |
| 141 | 20 | Femme | 1,72 | SJAP | Oui | Passable | L2 | Parfois | Parfois | Rarement |
| 145 | 19 | Femme | 1,65 | Sjap | Oui | Passable | L2 | Parfois | Parfois | Rarement |
| 149 | 19 | Femme | 1,64 | SJAP | Non | Passable | L2 | Parfois | Parfois | Rarement |

FIG.5b

| | File | | | | | | | Edit | | | | Color | | | | Fenêtres | | | | | | Sous-groupes | |
|---|---|---|---|---|---|---|---|---|---|---|---|---|---|---|---|---|---|---|---|---|---|---|---|---|
| | Id | | Age | | Sexe | | Taille | | UFR | | Redoublement | | MentionBac | | NiveauDEtude | | Copier | | Communiquer | | EchangeBrouillon | | | |
| | Logical | | Logical | | Logical | | Logical | | Logical | | Logical | | Logical | | Logical | | Logical | | Logical | | Logical | | | |
| | ☐ Integer | | ☐ Integer | | ☐ Integer | | ☐ Integer | | ☐ Integer | | ☐ Integer | | ☐ Integer | | ☐ Integer | | ☐ Integer | | ☐ Integer | | ☐ Integer | | | |
| | ☒ Numeric | | ☒ Numeric | | ☒ Numeric | | ☒ Numeric | | ☐ Numeric | | ☐ Numeric | | ☐ Numeric | | ☐ Numeric | | ☐ Numeric | | ☐ Numeric | | ☒ Numeric | | | |
| | ☐ Ordered | | ☐ Ordered | | ☐ Ordered | | ☐ Ordered | | ☐ Ordered | | ☐ Ordered | | ☐ Ordered | | ☐ Ordered | | ☐ Ordered | | ☐ Ordered | | ☐ Ordered | | | |
| | ☐ Nominal | | ☒ Nominal | | ☐ Nominal | | ☐ Nominal | | ☒ Nominal | | ☐ Nominal | | ☒ Nominal | | ☒ Nominal | | ☒ Nominal | | ☒ Nominal | | ☐ Nominal | | | |
| | | 18 | Femme | | | | economie | | Oui | | Assez bien | | L2 | | Jamais | | Jamais | | Jamais | | | | | |
| | | 19 | Homme | | | | SEGMI | | Non | | Bien | | L3 | | Parfois | | Parfois | | Parfois | | | | | |
| | | 20 | | | | | Sjap | | | | Félicitation | | M1 | | Rarement | | Rarement | | Rarement | | | | | |
| | | 21 | | | | | SJAP | | | | Passable | | M2 | | Souvent | | Souvent | | Souvent | | | | | |
| | | 22 | | | | | STAPS | | | | Rattrapage | | | | Toujours | | Toujours | | Toujours | | | | | |
| | | | | | | | | | | | Tres bien | | | | | | | | | | | | | |
| | New | | | | | | | | | | | | | | | | | | | | | | | |
| | Id | Age | Sexe | | Taille | | UFR | | Redoublement | | MentionBac | | NiveauDEtude | | Copier | | Communiquer | | EchangeBrouillon | | | | | |
| 1 | 101 | 21 | Homme | | 1,76 | | STAPS | | Oui | | Passable | | L3 | | Souvent | | Parfois | | Rarement | | | | | |
| 2 | 104 | 20 | Femme | | 1,62 | | economie | | Non | | Passable | | L3 | | Jamais | | Parfois | | Rarement | | | | | |
| 3 | 106 | 21 | Femme | | 1,7 | | STAPS | | Non | | Passable | | L3 | | Rarement | | Parfois | | Parfois | | | | | |
| 4 | 107 | 24 | Homme | | 1,79 | | STAPS | | Oui | | Assez Bien | | L3 | | Jamais | | Jamais | | Jamais | | | | | |
| 5 | 109 | 21 | Homme | | 1,85 | | STAPS | | Oui | | Passable | | L3 | | Parfois | | Souvent | | Souvent | | | | | |
| 6 | 111 | 20 | Femme | | 1,69 | | STAPS | | Non | | Bien | | L3 | | Rarement | | Souvent | | Parfois | | | | | |
| 7 | 113 | 22 | Homme | | 1,67 | | STAPS | | Non | | Passable | | L3 | | Parfois | | Toujours | | Jamais | | | | | |
| 8 | 116 | 21 | Homme | | 1,74 | | STAPS | | Oui | | Assez Bien | | L3 | | Rarement | | Parfois | | Rarement | | | | | |
| 9 | 119 | 22 | Homme | | 1,86 | | STAPS | | Oui | | Passable | | L3 | | Jamais | | Parfois | | Jamais | | | | | |
| 10 | 122 | 22 | Homme | | 1,86 | | piano | | OUI | | Passable | | L3 | | Rarement | | Rarement | | Rarement | | | | | |
| 11 | 125 | 24 | Homme | | 1,78 | | STAPS | | OUI | | Passable | | L3 | | Rarement | | Rarement | | Jamais | | | | | |
| 12 | 128 | 20 | Homme | | 1,75 | | STAPS | | Non | | Assez Bien | | L3 | | Rarement | | Rarement | | Jamais | | | | | |
| 13 | 130 | 22 | Homme | | 1,77 | | STAPS | | Oui | | Assez Bien | | L3 | | Toujours | | Toujours | | Parfois | | | | | |
| 14 | 132 | 23 | Homme | | 1,75 | | SEGMI | | Oui | | Passable | | L2 | | Souvent | | Parfois | | Parfois | | | | | |
| 15 | 136 | 19 | Homme | | 1,75 | | SEGMI | | Non | | Assez Bien | | L2 | | Parfois | | Parfois | | Rarement | | | | | |
| 16 | 139 | 18 | Homme | | 1,76 | | SJAP | | Non | | Bien | | L2 | | Parfois | | Parfois | | Parfois | | | | | |
| 17 | 141 | 20 | Femme | | 1,72 | | SJAP | | Oui | | Passable | | L2 | | Parfois | | Parfois | | Rarement | | | | | |
| 18 | 145 | 19 | Femme | | 1,65 | | Sjap | | Oui | | Passable | | L2 | | Parfois | | Parfois | | Rarement | | | | | |

FIG. 5c

| File | | Age | | | | | Edit | | | | | Color | | | | | Fenêtres | | | | | Sous-groupes | | |
|---|---|---|---|---|---|---|---|---|---|---|---|---|---|---|---|---|---|---|---|---|---|---|---|---|
| Id | | Age | | | | | Taille | | | | | Redoublement | | | | | NiveauDEtude | | | | | Communiquer | | EchangeBrouillon |
| Logical | | Logical | | | | | Logical | | | | | Logical | | | | | Logical | | | | | Logical | | Logical |
| ☐ Integer | | ☐ Integer | | | | | ☐ Integer | | | | | ☐ Integer | | | | | ☐ Integer | | | | | ☐ Integer | | ☐ Integer |
| ☑ Numeric | | ☑ Numeric | | Sexe | | UFR | ☑ Numeric | | | | | ☐ Numeric | | | | | ☐ Numeric | | Copier | | | ☐ Numeric | | ☑ Numeric |
| ☐ Ordered | | ☐ Ordered | | Logical | | Logical | ☐ Ordered | | | | | ☐ Ordered | | | | | ☐ Ordered | | Logical | | | ☐ Ordered | | ☐ Ordered |
| ☐ Nominal | | ☐ Nominal | | ☐ Integer | | ☐ Integer | ☐ Nominal | | | | | ☐ Nominal | | MentionBac | | | ☑ Nominal | | ☐ Integer | | | ☑ Nominal | | ☐ Nominal |
| | | | | ☐ Numeric | | ☐ Numeric | | 57056d | | | | | | | Logical | | | | ☐ Numeric | | | | | |
| | | 18 | | ☐ Ordered | | ☐ Ordered | | Femme | | economie | | Oui | | ☐ Integer | | Assez bien | | ☐ Ordered | L2 | Jamais | | Jamais | Jamais |
| | | 19 | | ☑ Nominal | | ☑ Nominal | | Homme | | SEGMI | | Non | | ☐ Numeric | | Bien | | ☑ Nominal | L3 | Parfois | | Parfois | Parfois |
| | | 20 | | | | | | | | Sjap | | | | ☐ Ordered | | Felicitation | | | M1 | Rarement | | Rarement | Rarement |
| | | 21 | | | | | | | | SJAP | | | | ☑ Nominal | | Passable | | | M2 | Souvent | | Souvent | Souvent |
| | | 22 | | | | | | | | STAPS | | | | | | Rattrapage | | | | Toujours | | Toujours | Toujours |
| | | ... | | | | | | | | | | | | | | Tres bien | | | | | | | |
| | | New | | New | | New | | New | | New | | New | | | | New | | | New | New | | New | New |
| Id | | Age | | Sexe | | UFR | Taille | | | | | Redoublement | | | | MentionBac | | | NiveauDEtude | Copier | | Communiquer | EchangeBrouillon |
| 1 | 101 | 21 | | Homme | | STAPS | 1,76 | | | | | Oui | | | | Passable | | | L3 | Souvent | | Parfois | Rarement |
| 2 | 104 | 20 | | Femme | | economie | 1,62 | | | | | Non | | | | Passable | | | L3 | Jamais | | Parfois | Rarement |
| 3 | 106 | 21 | | Femme | | STAPS | 1,7 | | | | | Non | | | | Passable | | | L3 | Rarement | | Parfois | Parfois |
| 4 | 107 | 24 | | Homme | | STAPS | 1,79 | | | | | Oui | | | | Passable | | | L3 | Parfois | | Jamais | Jamais |
| 5 | 109 | 21 | | Homme | | STAPS | 1,85 | | | | | Oui | | | | Assez Bien | | | L3 | Parfois | | Souvent | Souvent |
| 6 | 111 | 20 | | Femme | | STAPS | 1,69 | | | | | Non | | | | Passable | | | L3 | Rarement | | Souvent | Parfois |
| 7 | 113 | 22 | | Homme | | STAPS | 1,67 | | | | | Non | | | | Bien | | | L3 | Parfois | | Toujours | Jamais |
| 8 | 116 | 21 | | Homme | | STAPS | 1,74 | | | | | Oui | | | | Assez Bien | | | L3 | Rarement | | Parfois | Rarement |
| 9 | 119 | 22 | | Homme | | STAPS | 1,86 | | | | | Oui | | | | Passable | | | L3 | Jamais | | Parfois | Jamais |
| 10 | 122 | 22 | | Homme | | piano | 1,86 | | | | | OUI | | | | Assez Bien | | | L3 | Rarement | | Rarement | Rarement |
| 11 | 125 | 24 | | Homme | | STAPS | 1,78 | | | | | OUI | | | | Passable | | | L3 | Rarement | | Rarement | Jamais |
| 12 | 128 | 20 | | Homme | | STAPS | 1,75 | | | | | Non | | | | Passable | | | L3 | Rarement | | Rarement | Rarement |
| 13 | 130 | 22 | | Homme | | STAPS | 1,77 | | | | | Oui | | | | Assez Bien | | | L3 | Toujours | | Toujours | Jamais |
| 14 | 132 | 23 | | Homme | | SEGMI | 1,75 | | | | | Oui | | | | Passable | | | L2 | Souvent | | Parfois | Parfois |
| 15 | 136 | 19 | | Homme | | SEGMI | 1,75 | | | | | Non | | | | Assez Bien | | | L2 | Parfois | | Parfois | Parfois |
| 16 | 139 | 18 | | Homme | | SJAP | 1,76 | | | | | Non | | | | Bien | | | L2 | Parfois | | Parfois | Rarement |
| 17 | 141 | 20 | | Femme | | SJAP | 1,72 | | | | | Oui | | | | Passable | | | L2 | Parfois | | Parfois | Rarement |
| 18 | 145 | 19 | | Femme | | Sjap | 1,65 | | | | | Oui | | | | Passable | | | L2 | Parfois | | Parfois | Rarement |
| 19 | 149 | 19 | | Femme | | SJAP | 1,64 | | | | | Non | | | | Passable | | | L2 | Parfois | | Parfois | Rarement |

| | | File | | | | Edit | | | | Color | | | | Fenêtres | | | | Sous-groupes | |
|---|---|---|---|---|---|---|---|---|---|---|---|---|---|---|---|---|---|---|---|---|
| | Id | | Age | | Sexe | | Taille | | UFR | | Redoublement | | MentionBac | | NiveauDEtude | | Copier | | Communiquer | | EchangeBrouillon |
| | ☐ Logical | | ☐ Logical | | ☐ Logical | | ☐ Logical | | ☐ Logical | | ☐ Logical | | ☐ Logical | | ☐ Logical | | ☐ Logical | | ☐ Logical | | ☐ Logical |
| | ☐ Integer | | ☐ Integer | | ☐ Integer | | ☐ Integer | | ☐ Integer | | ☐ Integer | | ☐ Integer | | ☐ Integer | | ☐ Integer | | ☐ Integer | | ☐ Integer |
| | ☒ Numeric | | ☒ Numeric | | ☒ Numeric | | ☒ Numeric | | ☐ Numeric | | ☐ Numeric | | ☐ Numeric | | ☒ Numeric | | ☐ Numeric | | ☐ Numeric | | ☒ Numeric |
| | ☐ Ordered | | ☐ Ordered | | ☐ Ordered | | ☐ Ordered | | ☐ Ordered | | ☐ Ordered | | ☐ Ordered | | ☐ Ordered | | ☐ Ordered | | ☐ Ordered | | ☐ Ordered |
| | ☐ Nominal | | ☐ Nominal | | ☐ Nominal | | ☐ Nominal | | ☒ Nominal | | ☐ Nominal | | ☒ Nominal | | ☐ Nominal | | ☒ Nominal | | ☒ Nominal | | ☐ Nominal |
| | 18 | | | | Femme | | | | SEGMI | | Oui | | Assez bien | | L2 | | Jamais | | Jamais | | Jamais |
| | 19 | | | | Homme | | | | L economie | | Non | | Bien | | L3 | | Parfois | | Parfois | | Parfois |
| | 20 | | | | | | 57052g | | SJAP | | | | Felicitation | | M1 | | Rarement | | Rarement | | Rarement |
| | 21 | | | | | | 57051g | | L Sjap | | | | Passable | | M2 | | Souvent | | Souvent | | Souvent |
| | 22 | | | | | | 57059g | | STAPS | | | | Rattrapage | | | | Toujours | | Toujours | | Toujours |
| | ... | | | | | | | | | | | | Tres bien | | | | | | | | |
| | New | | | | New | | | | New | | New | | New | | New | | New | | New | | New |
| | Id | | Age | | Sexe | | Taille | | UFR | | Redoublement | | MentionBac | | NiveauDEtude | | Copier | | Communiquer | | EchangeBrouillon |
| 1 | 101 | | 21 | | Homme | | 1,76 | | STAPS | | Oui | | Passable | | L3 | | Souvent | | Parfois | | Rarement |
| 2 | 104 | | 20 | | Femme | | 1,62 | | STAPS | | Non | | Passable | | L3 | | Jamais | | Parfois | | Rarement |
| 3 | 106 | | 21 | | Femme | | 1,7 | | STAPS | | Non | | Passable | | L3 | | Rarement | | Parfois | | Parfois |
| 4 | 107 | | 24 | | Homme | | 1,79 | | STAPS | | Oui | | Passable | | L3 | | Jamais | | Jamais | | Jamais |
| 5 | 109 | | 21 | | Homme | | 1,85 | | STAPS | | Oui | | Assez Bien | | L3 | | Parfois | | Souvent | | Souvent |
| 6 | 111 | | 20 | | Femme | | 1,69 | | STAPS | | Non | | Passable | | L3 | | Rarement | | Souvent | | Parfois |
| 7 | 113 | | 22 | | Homme | | 1,67 | | STAPS | | Non | | Bien | | L3 | | Parfois | | Toujours | | Jamais |
| 8 | 116 | | 21 | | Homme | | 1,74 | | STAPS | | Oui | | Passable | | L3 | | Rarement | | Parfois | | Jamais |
| 9 | 119 | | 22 | | Homme | | 1,86 | | STAPS | | Oui | | Assez Bien | | L3 | | Jamais | | Parfois | | Jamais |
| 10 | 122 | | 22 | | Homme | | 1,86 | | piano | | OUI | | Passable | | L3 | | Rarement | | Rarement | | Jamais |
| 11 | 125 | | 24 | | Homme | | 1,78 | | STAPS | | OUI | | Passable | | L3 | | Rarement | | Rarement | | Parfois |
| 12 | 128 | | 20 | | Homme | | 1,75 | | STAPS | | Non | | Assez Bien | | L3 | | Rarement | | Rarement | | Jamais |
| 13 | 130 | | 22 | | Homme | | 1,77 | | STAPS | | Oui | | Passable | | L3 | | Toujours | | Toujours | | Parfois |
| 14 | 132 | | 23 | | Homme | | 1,75 | | SEGMI | | Oui | | Assez Bien | | L2 | | Souvent | | Parfois | | Parfois |
| 15 | 136 | | 19 | | Homme | | 1,75 | | SEGMI | | Non | | Bien | | L2 | | Parfois | | Parfois | | Parfois |
| 16 | 139 | | 18 | | Homme | | 1,76 | | SJAP | | Non | | Passable | | L2 | | Parfois | | Parfois | | Rarement |
| 17 | 141 | | 20 | | Femme | | 1,72 | | SJAP | | Oui | | Passable | | L2 | | Parfois | | Parfois | | Rarement |
| 18 | 145 | | 19 | | Femme | | 1,65 | | SJAP | | Oui | | Passable | | L2 | | Parfois | | Parfois | | Rarement |
| 19 | 149 | | 19 | | Femme | | 1,64 | | SJAP | | Non | | Passable | | L2 | | Parfois | | Parfois | | Rarement |

| | File | | | | Edit | | Color | | | Fenêtres | | | | Sous-groupes | |
|---|---|---|---|---|---|---|---|---|---|---|---|---|---|---|---|
| | Id | Age | Sexe | Taille | | UFR | Redoublement | MentionBac | NiveauDEtude | | Copier | Communiquer | | EchangeBrouillon |
| ☐ Logical | ☐ Logical | ☐ Logical | ☑ Logical | ☐ Logical | | ☐ Logical | ☑ Logical | ☐ Logical | ☐ Logical | | ☐ Logical | ☐ Logical | | ☐ Logical |
| ☑ Integer | ☐ Integer | ☐ Integer | ☐ Integer | ☐ Integer | | ☐ Integer | ☐ Integer | ☐ Integer | ☐ Integer | | ☐ Integer | ☐ Integer | | ☐ Integer |
| ☐ Numeric | ☑ Numeric | ☑ Numeric | ☐ Numeric | ☑ Numeric | | ☐ Numeric | ☐ Numeric | ☐ Numeric | ☐ Numeric | | ☐ Numeric | ☐ Numeric | | ☑ Numeric |
| ☐ Ordered | ☐ Ordered | ☐ Ordered | ☐ Ordered | ☐ Ordered | | ☐ Ordered | ☐ Ordered | ☑ Ordered | ☑ Ordered | | ☑ Ordered | ☑ Ordered | | ☐ Ordered |
| ☐ Nominal | ☐ Nominal | ☐ Nominal | ☐ Nominal | ☐ Nominal | | ☑ Nominal | ☑ Nominal | ☐ Nominal | ☐ Nominal | | ☐ Nominal | ☐ Nominal | | ☐ Nominal |
| | 18 | | Femme | | | SEGMI | | Assez bien | L2 | | Jamais | Jamais | | Jamais |
| | 19 | | Homme | | | SJAP | | Bien | L3 | | Parfois | Parfois | | Parfois |
| | 20 | | | | | STAPS | | Felicitation | M1 | | Rarement | Rarement | | Rarement |
| | 21 | | | | | | | Passable | M2 | | Souvent | Souvent | | Souvent |
| | 22 | | | | | 67061c | | Rattrapage | | | Toujours | Toujours | | Toujours |
| | ... | | | | | | | Tres bien | | | | | | |
| | New | | | | | New | New | New | New | | New | New | | New |
| | Id | Age | Sexe | Taille | | UFR | Redoublement | MentionBac | NiveauDEtude | | Copier | Communiquer | | EchangeBrouillon |
| 1 | 101 | 21 | Homme | 1,76 | | STAPS | Oui | Passable | L3 | | Souvent | Parfois | | Rarement |
| 2 | 104 | 20 | Femme | 1,62 | | SEGMI | Non | Passable | L3 | | Jamais | Parfois | | Rarement |
| 3 | 106 | 21 | Femme | 1,7 | | SJAP | Non | Passable | L3 | | Rarement | Parfois | | Parfois |
| 4 | 107 | 24 | Homme | 1,79 | | STAPS | Oui | Passable | L3 | | Jamais | Jamais | | Jamais |
| 5 | 109 | 21 | Homme | 1,85 | | STAPS | Oui | Assez Bien | L3 | | Parfois | Souvent | | Souvent |
| 6 | 111 | 20 | Femme | 1,69 | | STAPS | Non | Passable | L3 | | Rarement | Souvent | | Parfois |
| 7 | 113 | 22 | Femme | 1,67 | | STAPS | Non | Bien | L3 | | Parfois | Toujours | | Jamais |
| 8 | 116 | 21 | Homme | 1,74 | | STAPS | Oui | Assez Bien | L3 | | Rarement | Parfois | | Rarement |
| 9 | 119 | 22 | Homme | 1,86 | | STAPS | Oui | Passable | L3 | | Jamais | Parfois | | Jamais |
| 10 | 122 | 22 | Homme | 1,86 | | NA | OUI | Passable | L3 | | Rarement | Rarement | | Rarement |
| 11 | 125 | 24 | Homme | 1,78 | | STAPS | OUI | Passable | L3 | | Rarement | Rarement | | Jamais |
| 12 | 128 | 20 | Homme | 1,75 | | STAPS | Non | Passable | L3 | | Rarement | Rarement | | Parfois |
| 13 | 130 | 22 | Homme | 1,77 | | STAPS | Oui | Assez Bien | L3 | | Toujours | Toujours | | Parfois |
| 14 | 132 | 23 | Homme | 1,75 | | SEGMI | Oui | Passable | L2 | | Souvent | Parfois | | Rarement |
| 15 | 136 | 19 | Homme | 1,75 | | SEGMI | Non | Assez Bien | L2 | | Parfois | Parfois | | Parfois |
| 16 | 139 | 18 | Homme | 1,76 | | SJAP | Non | Bien | L2 | | Parfois | Parfois | | Rarement |
| 17 | 141 | 20 | Femme | 1,72 | | SJAP | Oui | Passable | L2 | | Parfois | Parfois | | Rarement |
| 18 | 145 | 19 | Femme | 1,65 | | SJAP | Oui | Passable | L2 | | Parfois | Parfois | | Rarement |
| 19 | 149 | 19 | Femme | 1,64 | | SJAP | Non | Passable | L2 | | Parfois | Parfois | | Rarement |

FIG.6c

| File | | Edit | | Color | | Fenêtres | | | | Sous-groupes | | |
|---|---|---|---|---|---|---|---|---|---|---|---|---|
| Id | Age | Sexe | Taille | UFR | Redoublement | MentionBac | NiveauDEtude | Copier | Communiquer | EchangeBrouillon | | |
| ☐ Logical | ☐ Logical | ☐ Logical | ☐ Logical | ☐ Logical | ☐ Logical | ☐ Logical | ☐ Logical | ☐ Logical | ☐ Logical | ☐ Logical | | |
| ☑ Integer | ☑ Integer | ☐ Integer | ☐ Integer | ☐ Integer | ☐ Integer | ☐ Integer | ☐ Integer | ☐ Integer | ☐ Integer | ☐ Integer | | |
| ☐ Numeric | ☐ Numeric | ☑ Numeric | ☑ Numeric | ☑ Numeric | ☑ Numeric | ☑ Numeric | ☑ Numeric | ☑ Numeric | ☑ Numeric | ☑ Numeric | | |
| ☐ Ordered | ☐ Ordered | ☐ Ordered | ☐ Ordered | ☐ Ordered | ☐ Ordered | ☑ Ordered | ☑ Ordered | ☑ Ordered | ☑ Ordered | ☑ Ordered | | |
| ☐ Nominal | ☐ Nominal | ☐ Nominal | ☐ Nominal | ☑ Nominal | ☑ Nominal | ☐ Nominal | ☐ Nominal | ☐ Nominal | ☐ Nominal | ☐ Nominal | | |

| | 18 | Femme | | SEGMI | | Assez bien | L2 | Jamais | Jamais | Jamais |
| | 19 | Homme | | SJAP | Oui — 67061d | Bien | L3 | Parfois | Parfois | Parfois |
| | 20 | | | STAPS | | Felicitation | M1 | Rarement | Rarement | Rarement |
| | 21 | | | | | Passable | M2 | Souvent | Souvent | Souvent |
| | 22 | | | | | Rattrapage | | Toujours | Toujours | Toujours |
| | … | | | | | Tres bien | | | | |

| | New | New | New | New | New | New | New | New | New | New |
|---|---|---|---|---|---|---|---|---|---|---|
| Id | Age | Sexe | Taille | UFR | Redoublement | MentionBac | NiveauDEtude | Copier | Communiquer | EchangeBrouillon |
| 1 | 101 | 21 Homme | 1,76 | STAPS | Oui | Passable | L3 | Souvent | Parfois | Rarement |
| 2 | 104 | 20 Femme | 1,62 | SEGMI | Non | Passable | L3 | Jamais | Parfois | Rarement |
| 3 | 106 | 21 Femme | 1,7 | STAPS | Non | Passable | L3 | Rarement | Parfois | Parfois |
| 4 | 107 | 24 Homme | 1,79 | STAPS | Oui | Passable | L3 | Jamais | Jamais | Jamais |
| 5 | 109 | 21 Homme | 1,85 | STAPS | Oui | Assez Bien | L3 | Parfois | Souvent | Souvent |
| 6 | 111 | 20 Femme | 1,69 | STAPS | Non | Passable | L3 | Rarement | Souvent | Parfois |
| 7 | 113 | 22 Femme | 1,67 | STAPS | Non | Bien | L3 | Parfois | Toujours | Jamais |
| 8 | 116 | 21 Homme | 1,74 | STAPS | Oui | Assez Bien | L3 | Rarement | Parfois | Rarement |
| 9 | 119 | 22 Homme | 1,86 | STAPS | Oui | Passable | L3 | Jamais | Parfois | Jamais |
| 10 | 122 | 22 Homme | 1,86 | NA | Oui | Passable | L3 | Rarement | Rarement | Jamais |
| 11 | 125 | 24 Homme | 1,78 | STAPS | Oui | Passable | L3 | Rarement | Rarement | Rarement |
| 12 | 128 | 20 Homme | 1,75 | STAPS | Non | Passable | L3 | Rarement | Rarement | Jamais |
| 13 | 130 | 22 Homme | 1,77 | STAPS | Oui | Assez Bien | L3 | Toujours | Toujours | Parfois |
| 14 | 132 | 23 Homme | 1,75 | SEGMI | Oui | Passable | L2 | Souvent | Parfois | Parfois |
| 15 | 136 | 19 Homme | 1,75 | SEGMI | Non | Assez Bien | L2 | Parfois | Parfois | Rarement |
| 16 | 139 | 18 Homme | 1,76 | SJAP | Non | Bien | L2 | Parfois | Parfois | Parfois |
| 17 | 141 | 20 Femme | 1,72 | SJAP | Oui | Passable | L2 | Parfois | Parfois | Rarement |
| 18 | 145 | 19 Femme | 1,65 | SJAP | Oui | Passable | L2 | Parfois | Parfois | Rarement |
| 19 | 149 | 19 Femme | 1,64 | SJAP | Non | Passable | L2 | Parfois | Parfois | Rarement |

| | File | | | | Edit | | | Color | | | Fenêtres | | | Sous-groupes | |
|---|---|---|---|---|---|---|---|---|---|---|---|---|---|---|---|
| Id | Age | Sexe | Taille | UFR | Redoublement | MentionBac | NiveauDEtude | Copier | Communiquer | EchangeBrouillon |
| ☐ Logical | ☐ Logical | ☐ Logical | ☐ Logical | ☐ Logical | ☐ Logical | ☐ Logical | ☐ Logical | ☐ Logical | ☐ Logical | ☐ Logical |
| ☑ Integer | ☐ Integer | ☐ Integer | ☐ Integer | ☐ Integer | ☐ Integer | ☐ Integer | ☐ Integer | ☐ Integer | ☐ Integer | ☐ Integer |
| ☐ Numeric | ☑ Numeric | ☑ Numeric | ☑ Numeric | ☑ Numeric | ☑ Numeric | ☑ Numeric | ☑ Numeric | ☑ Numeric | ☑ Numeric | ☑ Numeric |
| ☐ Ordered | ☐ Ordered | ☐ Ordered | ☐ Ordered | ☐ Ordered | ☐ Ordered | ☐ Ordered | ☐ Ordered | ☐ Ordered | ☐ Ordered | ☐ Ordered |
| ☐ Nominal | ☐ Nominal | ☐ Nominal | ☐ Nominal | ☑ Nominal | ☑ Nominal | ☑ Nominal | ☑ Nominal | ☑ Nominal | ☑ Nominal | ☑ Nominal |
| | 18 | Femme | | SEGMI | Oui | Assez bien | L2 | Jamais | Jamais | Jamais |
| | 19 | Homme | | SJAP | ⌐OUI | Bien | L3 | Parfois | Parfois | Parfois |
| | 20 | | | STAPS | Non | Felicitation | M1 | Rarement | Rarement | Rarement |
| | 21 | | | | | Passable | M2 | Souvent | Souvent | Souvent |
| | 22 | | | | | Rattrapage | | Toujours | Toujours | Toujours |
| | ... | | | | | Tres bien | | | | |
| | New | New | New | New | New | New | New | New | New | New |
| Id | Age | Sexe | Taille | UFR | Redoublement | MentionBac | NiveauDEtude | Copier | Communiquer | EchangeBrouillon |
| 1 | 101 | 21 | Homme | 1,76 | STAPS | Oui | Passable | L3 | Souvent | Parfois | Rarement |
| 2 | 104 | 20 | Femme | 1,62 | economie | Non | Passable | L3 | Jamais | Parfois | Rarement |
| 3 | 106 | 21 | Femme | 1,7 | STAPS | Non | Passable | L3 | Rarement | Parfois | Parfois |
| 4 | 107 | 24 | Homme | 1,79 | STAPS | Oui | Assez Bien | L3 | Jamais | Jamais | Jamais |
| 5 | 109 | 21 | Homme | 1,85 | STAPS | Oui | Passable | L3 | Parfois | Souvent | Souvent |
| 6 | 111 | 20 | Femme | 1,69 | STAPS | Non | Passable | L3 | Rarement | Souvent | Parfois |
| 7 | 113 | 22 | Homme | 1,67 | STAPS | Non | Bien | L3 | Parfois | Toujours | Jamais |
| 8 | 116 | 21 | Homme | 1,74 | STAPS | Oui | Passable | L3 | Rarement | Parfois | Rarement |
| 9 | 119 | 22 | Homme | 1,86 | STAPS | OUI | Assez Bien | L3 | Jamais | Parfois | Jamais |
| 10 | 122 | 22 | Homme | 1,86 | NA | OUI | Passable | L3 | Rarement | Rarement | Rarement |
| 11 | 125 | 24 | Homme | 1,78 | STAPS | OUI | Passable | L3 | Rarement | Rarement | Jamais |
| 12 | 128 | 20 | Homme | 1,75 | STAPS | Non | Assez Bien | L3 | Rarement | Rarement | Rarement |
| 13 | 130 | 22 | Homme | 1,77 | STAPS | Oui | Passable | L2 | Toujours | Toujours | Jamais |
| 14 | 132 | 23 | Homme | 1,75 | SEGMI | Oui | Assez Bien | L2 | Souvent | Parfois | Parfois |
| 15 | 136 | 19 | Homme | 1,75 | SEGMI | Non | Assez Bien | L2 | Parfois | Parfois | Rarement |
| 16 | 139 | 18 | Homme | 1,76 | SJAP | Non | Bien | L2 | Parfois | Parfois | Parfois |
| 17 | 141 | 20 | Femme | 1,72 | SJAP | Oui | Passable | L2 | Parfois | Parfois | Rarement |
| 18 | 145 | 19 | Femme | 1,65 | SJAP | Oui | Passable | L2 | Parfois | Parfois | Rarement |

| | File | | | | Edit | | | Color | | | Fenêtres | | | | Sous-groupes | |
|---|---|---|---|---|---|---|---|---|---|---|---|---|---|---|---|---|
| | Id | Age | Sexe | Taille | UFR | Redoublement | MentionBac | NiveauDEtude | Copier | Communiquer | EchangeBrouillon |
| | ☐ Logical | ☐ Logical | ☐ Logical | ☐ Logical | ☐ Logical | ☐ Logical | ☐ Logical | ☐ Logical | ☐ Logical | ☐ Logical | ☐ Logical |
| | ☐ Integer | ☑ Integer | ☐ Integer | ☐ Integer | ☐ Integer | ☐ Integer | ☐ Integer | ☐ Integer | ☐ Integer | ☐ Integer | ☐ Integer |
| | ☑ Numeric | ☐ Numeric | ☐ Numeric | ☑ Numeric | ☐ Numeric | ☐ Numeric | ☐ Numeric | ☐ Numeric | ☐ Numeric | ☐ Numeric | ☑ Numeric |
| | ☐ Ordered | ☐ Ordered | ☐ Ordered | ☐ Ordered | ☐ Ordered | ☐ Ordered | ☑ Ordered | ☑ Ordered | ☑ Ordered | ☑ Ordered | ☐ Ordered |
| | ☐ Nominal | ☐ Nominal | ☐ Nominal | ☐ Nominal | ☑ Nominal | ☐ Nominal | ☐ Nominal | ☐ Nominal | ☐ Nominal | ☐ Nominal | ☐ Nominal |
| | | ✻ | Femme | | SEGMI | Oui | Assez bien | L2 | | Jamais | Jamais | Jamais |
| | | | Homme | | SJAP | Non | Bien | L3 | | Parfois | Parfois | Parfois |
| | | | | | STAPS | | Felicitation | M1 | | Rarement | Rarement | Rarement |
| | | | | | | | Passable | M2 | | Souvent | Souvent | Souvent |
| | | | | | | | Rattrapage | | | Toujours | Toujours | Toujours |
| | | | | | | | Tres bien | | | | | |
| 72021c | New | New | New | New | New | New | New | New | New | New | New |
| | Id | Age | Sexe | Taille | UFR | Redoublement | MentionBac | NiveauDEtude | Copier | Communiquer | EchangeBrouillon |
| 6 | 111 | 20 | Femme | 1,69 | STAPS | Non | Passable | L3 | Rarement | Souvent | Parfois |
| 29 | 172 | Vingt | Femme | 1,59 | SJAP | Non | Passable | M1 | Parfois | Parfois | Rarement |
| 35 | 184 | Vingt | Homme | 1,8 | STAPS | Oui | Passable | L2 | Jamais | Parfois | Rarement |
| 1 | 101 | 21 | Homme | 1,76 | STAPS | Oui | Passable | L3 | Souvent | Parfois | Rarement |
| 2 | 104 | 20 | Femme | 1,62 | SEGMI | Non | Passable | L3 | Jamais | Parfois | Rarement |
| 3 | 106 | 21 | Femme | 1,7 | STAPS | Non | Passable | L3 | Rarement | Parfois | Parfois |
| 4 | 107 | 24 | Homme | 2,79 | STAPS | Oui | Assez Bien | L3 | Jamais | Jamais | Jamais |
| 5 | 109 | 21 | Homme | 1,85 | STAPS | Oui | Passable | L3 | Parfois | Souvent | Souvent |
| 7 | 113 | 22 | Homme | 1,67 | STAPS | Non | Bien | L3 | Parfois | Toujours | Jamais |
| 8 | 116 | 21 | Homme | 1,74 | NA | Oui | Passable | L3 | Rarement | Parfois | Rarement |
| 9 | 119 | 22 | Homme | 1,86 | STAPS | Oui | Assez Bien | L3 | Jamais | Parfois | Jamais |
| 10 | 122 | 22 | Homme | 1,86 | piano | Oui | Passable | L3 | Rarement | Rarement | Rarement |
| 11 | 125 | 24 | Homme | 1,78 | STAPS | Oui | Passable | L3 | Rarement | Rarement | Rarement |
| 12 | 128 | 20 | Homme | 1,75 | STAPS | Non | Assez Bien | L3 | Rarement | Rarement | Jamais |
| 13 | 130 | 22 | Homme | 1,77 | STAPS | Oui | Passable | L2 | Toujours | Toujours | Parfois |
| 14 | 132 | 23 | Homme | 1,75 | SEGMI | Oui | Assez Bien | L2 | Souvent | Parfois | Parfois |
| 15 | 136 | 19 | Homme | 1,75 | SEGMI | Non | Bien | L2 | Parfois | Parfois | Rarement |
| 16 | 139 | 18 | Homme | 1,76 | SJAP | Non | Passable | L2 | Parfois | Parfois | Parfois |
| 17 | 141 | 20 | Femme | 1,72 | SJAP | Oui | Passable | L2 | Parfois | Parfois | Rarement |
| 18 | 145 | 19 | Femme | 1,65 | SJAP | Oui | Passable | L2 | Parfois | Parfois | Rarement |
| 19 | 149 | 19 | Femme | 1,64 | SJAP | Non | Passable | L2 | Parfois | Parfois | Rarement |

FIG.7c

| File | | | Edit | | | Color | | | Fenêtres | | | Sous-groupes | |
|---|---|---|---|---|---|---|---|---|---|---|---|---|---|
| Id | Age | Sexe | Taille | UFR | Redoublement | MentionBac | NiveauDEtude | Copier | Communiquer | EchangeBrouillon |
| ☐ Logical | ☐ Logical | ☐ Logical | ☐ Logical | ☐ Logical | ☐ Logical | ☐ Logical | ☐ Logical | ☐ Logical | ☐ Logical | ☐ Logical |
| ☐ Integer | ☑ Integer | ☐ Integer | ☐ Integer | ☐ Integer | ☐ Integer | ☐ Integer | ☐ Integer | ☐ Integer | ☐ Integer | ☐ Integer |
| ☑ Numeric | ☐ Numeric | ☑ Numeric | ☑ Numeric | ☑ Numeric | ☑ Numeric | ☑ Numeric | ☑ Numeric | ☑ Numeric | ☑ Numeric | ☑ Numeric |
| ☐ Ordered | ☐ Ordered | ☐ Ordered | ☐ Ordered | ☐ Ordered | ☐ Ordered | ☑ Ordered | ☑ Ordered | ☑ Ordered | ☑ Ordered | ☑ Ordered |
| ☐ Nominal | ☐ Nominal | ☐ Nominal | ☐ Nominal | ☑ Nominal | ☐ Nominal | ☐ Nominal | ☐ Nominal | ☐ Nominal | ☐ Nominal | ☐ Nominal |
| | | Femme | | SEGMI | Oui | Assez bien | L2 | Jamais | Jamais | Jamais |
| | | Homme | | SJAP | Non | Bien | L3 | Parfois | Parfois | Parfois |
| | | | | STAPS | | Felicitation | M1 | Rarement | Rarement | Rarement |
| | | | | | | Passable | M2 | Souvent | Souvent | Souvent |
| | | | | | | Rattrapage | | Toujours | Toujours | Toujours |
| | | | | | | Tres bien | | | | |
| New | New | New | New | New | New | New | New | New | New | New |
| Id | Age | Sexe | Taille | UFR | Redoublement | MentionBac | NiveauDEtude | Copier | Communiquer | EchangeBrouillon |
| 6 | 11 2o | Femme | 1,69 | STAPS | Non | Passable | L3 | Rarement | Souvent | Parfois |
| 29 | 127 Trent | Femme | 1,59 | SJAP | Non | Passable | M1 | Parfois | Parfois | Rarement |
| 35 | 184 Vingt | Femme | 1,8 | STAPS | Oui | Passable | L2 | Jamais | Parfois | Rarement |
| 1 | 101 21 | Femme | 1,76 | SEGMI | Oui | Passable | L3 | Souvent | Parfois | Rarement |
| 2 | 104 20 | Femme | 1,62 | SEGMI | Non | Passable | L3 | Jamais | Parfois | Rarement |
| 3 | 106 21 | Femme | 1,7 | STAPS | Oui | Passable | L3 | Rarement | Jamais | Parfois |
| 4 | 107 24 | Homme | 1,79 | STAPS | Oui | Assez Bien | L3 | Jamais | Souvent | Jamais |
| 5 | 109 21 | Homme | 1,85 | STAPS | Oui | Bien | L3 | Parfois | Toujours | Souvent |
| 7 | 113 22 | Homme | 1,67 | STAPS | Non | Passable | L3 | Parfois | Parfois | Jamais |
| 8 | 116 21 | Homme | 1,74 | NA | Oui | Passable | L3 | Rarement | Parfois | Rarement |
| 9 | 119 22 | Homme | 1,86 | STAPS | Oui | Assez Bien | L3 | Jamais | Rarement | Jamais |
| 10 | 122 22 | Homme | 1,86 | piano | Oui | Passable | L3 | Rarement | Rarement | Jamais |
| 11 | 125 24 | Homme | 1,78 | STAPS | Oui | Assez Bien | L3 | Rarement | Rarement | Jamais |
| 12 | 128 2o | Homme | 1,75 | STAPS | Non | Passable | L3 | Rarement | Rarement | Parfois |
| 13 | 130 22 | Homme | 1,77 | STAPS | Oui | Assez Bien | L2 | Toujours | Toujours | Parfois |
| 14 | 132 23 | Homme | 1,75 | SEGMI | Oui | Assez Bien | L2 | Souvent | Parfois | Rarement |
| 15 | 136 19 | Homme | 1,75 | SEGMI | Non | Bien | L2 | Parfois | Parfois | Rarement |
| 16 | 139 18 | Homme | 1,76 | SJAP | Non | Passable | L2 | Parfois | Parfois | Rarement |
| 17 | 141 20 | Femme | 1,72 | SJAP | Oui | Passable | L2 | Parfois | Parfois | Rarement |
| 18 | 145 19 | Femme | 1,65 | SJAP | Oui | Passable | L2 | Parfois | Parfois | Rarement |
| 19 | 149 19 | Femme | 1,64 | SJAP | Non | Passable | L2 | Parfois | Parfois | Rarement |

Callout: NA — All cases :

FIG.7d

| | | File | | | | Edit | | | Color | | | Fenêtres | | | | Sous-groupes | |
|---|---|---|---|---|---|---|---|---|---|---|---|---|---|---|---|---|---|
| | Id | Age | Sexe | Taille | UFR | Redoublement | MentionBac | NiveauDEtude | Copier | Communiquer | EchangeBrouillon |
| ☐ | Logical | ☐ Logical | ☐ Logical | ☐ Logical | ☐ Logical | ☐ Logical | ☐ Logical | ☐ Logical | ☐ Logical | ☐ Logical | ☐ Logical |
| ☐ | Integer | ☑ Integer | ☐ Integer | ☐ Integer | ☐ Integer | ☐ Integer | ☐ Integer | ☐ Integer | ☐ Integer | ☐ Integer | ☐ Integer |
| ☑ | Numeric | ☐ Numeric | ☑ Numeric | ☑ Numeric | ☐ Numeric | ☐ Numeric | ☐ Numeric | ☐ Numeric | ☐ Numeric | ☐ Numeric | ☐ Numeric |
| ☐ | Ordered | ☐ Ordered | ☐ Ordered | ☐ Ordered | ☐ Ordered | ☐ Ordered | ☐ Ordered | ☑ Ordered | ☑ Ordered | ☑ Ordered | ☑ Ordered |
| ☐ | Nominal | ☐ Nominal | ☐ Nominal | ☐ Nominal | ☑ Nominal | ☑ Nominal | ☑ Nominal | ☐ Nominal | ☐ Nominal | ☐ Nominal | ☐ Nominal |
| | | ✱ | Femme | | SEGMI | Oui | Assez bien | L2 | Jamais | Jamais | Jamais |
| | | | Homme | | SJAP | Non | Bien | L3 | Parfois | Parfois | Parfois |
| | | | | | STAPS | | Felicitation | M1 | Rarement | Rarement | Rarement |
| | | | | | | | Passable | M2 | Souvent | Souvent | Souvent |
| | | | | | | | Rattrapage | | Toujours | Toujours | Toujours |
| | | | | | | | Tres bien | | | | |
| | | New | New | New | New | New | New | New | New | New | New |
| | Id | Age | Sexe | Taille | UFR | Redoublement | MentionBac | NiveauDEtude | Copier | Communiquer | EchangeBrouillon |
| 6 | 111 | 2o | Femme | 1,69 | STAPS | Non | Passable | L3 | Rarement | Souvent | Parfois |
| 29 | 172 | | Femme | 1,59 | SJAP | Non | Passable | M1 | Parfois | Parfois | Rarement |
| 35 | 184 | | Homme | 1,8 | STAPS | Oui | Passable | L2 | Jamais | Parfois | Rarement |
| 1 | 101 | 21 | Homme | 1,76 | SEGMI | Oui | Passable | L3 | Souvent | Parfois | Rarement |
| 2 | 104 | 20 | Homme | 1,62 | SEGMI | Non | Passable | L3 | Jamais | Parfois | Rarement |
| 3 | 106 | 21 | Femme | 1,7 | STAPS | Non | Passable | L3 | Rarement | Jamais | Parfois |
| 4 | 107 | 24 | Homme | 1,79 | STAPS | Oui | Assez Bien | L3 | Jamais | Souvent | Souvent |
| 5 | 109 | 21 | Homme | 1,85 | STAPS | Oui | Bien | L3 | Parfois | Toujours | Jamais |
| 7 | 113 | 22 | Homme | 1,67 | STAPS | Non | Passable | L3 | Parfois | Parfois | Rarement |
| 8 | 116 | 21 | Homme | 1,74 | NA | Oui | Assez Bien | L3 | Rarement | Parfois | Jamais |
| 9 | 119 | 22 | Homme | 1,86 | STAPS | Oui | Passable | L3 | Jamais | Rarement | Jamais |
| 10 | 122 | 22 | Homme | 1,86 | piano | Oui | Passable | L3 | Rarement | Rarement | Jamais |
| 11 | 125 | 24 | Homme | 1,78 | STAPS | Non | Assez Bien | L3 | Rarement | Rarement | Jamais |
| 12 | 128 | 2o | Homme | 1,75 | STAPS | Oui | Passable | L3 | Rarement | Toujours | Parfois |
| 13 | 130 | 22 | Homme | 1,77 | STAPS | Oui | Assez Bien | L2 | Toujours | Toujours | Parfois |
| 14 | 132 | 23 | Homme | 1,75 | SEGMI | Oui | Passable | L2 | Souvent | Parfois | Parfois |
| 15 | 136 | 19 | Homme | 1,75 | SEGMI | Non | Assez Bien | L2 | Parfois | Parfois | Rarement |
| 16 | 139 | 18 | Homme | 1,76 | SJAP | Non | Bien | L2 | Parfois | Parfois | Parfois |
| 17 | 141 | 20 | Femme | 1,72 | SJAP | Oui | Passable | L2 | Parfois | Parfois | Rarement |
| 18 | 145 | 19 | Femme | 1,65 | SJAP | Oui | Passable | L2 | Parfois | Parfois | Rarement |
| 19 | 149 | 19 | Femme | 1,64 | SJAP | Non | Passable | L2 | Parfois | Parfois | Rarement |

72024e

NA
20
All cases :

| | File | | | | | Edit | | | | | Color | | | | | Fenêtres | | | | | Sous-groupes | | | | |
|---|---|---|---|---|---|---|---|---|---|---|---|---|---|---|---|---|---|---|---|---|---|---|---|---|---|
| | Id | | Age | | Sexe | | Taille | | UFR | | Redoublement | | MentionBac | | NiveauDEtude | | Copier | | Communiquer | | EchangeBrouillon | | | | |
| | Logical | ☐ | Logical | ☐ | Logical | ☐ | Logical | ☐ | Logical | ☐ | Logical | ☐ | Logical | ☐ | Logical | ☐ | Logical | ☐ | Logical | ☐ | Logical | ☐ | | | |
| | Integer | ☑ | Integer | ☑ | Integer | ☐ | Integer | ☐ | Integer | ☐ | Integer | ☑ | Integer | ☐ | Integer | ☐ | Integer | ☐ | Integer | ☐ | Integer | ☐ | | | |
| | Numeric | ☑ | Numeric | ☑ | Numeric | ☑ | Numeric | ☑ | Numeric | ☑ | Numeric | ☑ | Numeric | ☑ | Numeric | ☑ | Numeric | ☑ | Numeric | ☑ | Numeric | ☑ | | | |
| | Ordered | ☐ | Ordered | ☐ | Ordered | ☑ | Ordered | ☑ | Ordered | ☑ | Ordered | ☑ | Ordered | ☑ | Ordered | ☑ | Ordered | ☑ | Ordered | ☑ | Ordered | ☑ | | | |
| | Nominal | ☑ | Nominal | ☑ | Nominal | ☐ | Nominal | ☐ | Nominal | ☐ | Nominal | ☐ | Nominal | ☐ | Nominal | ☐ | Nominal | ☐ | Nominal | ☐ | Nominal | ☐ | | | |
| | | | | | Femme | | | | SEGMI | | Oui | | Assez Bien | | L2 | | Jamais | | Jamais | | Jamais | | | | |
| | | | | | Homme | | | | SJAP | | Non | | Bien | | L3 | | Parfois | | Parfois | | Parfois | | | | |
| | | | | | | | | | STAPS | | | | Felicitation | | M1 | | Rarement | | Rarement | | Rarement | | | | |
| | | | | | | | | | | | | | Passable | | M2 | | Souvent | | Souvent | | Souvent | | | | |
| | | | | | | | | | | | | | Rattrapage | | | | Toujours | | Toujours | | Toujours | | | | |
| | | | | | | | | | | | | | Tres bien | | | | | | | | | | | | |
| | New | | | | New | | | | New | | New | | New | | New | | New | | New | | New | | | | |
| | Id | Age | Sexe | Taille | UFR | Redoublement | MentionBac | NiveauDEtude | Copier | Communiquer | EchangeBrouillon | | | | | | | | | | | | | | |
| 1 | 101 | 21 | Homme | 1,76 | STAPS | Oui | Passable | L3 | Souvent | Parfois | Rarement | | | | | | | | | | | | | | |
| 2 | 104 | 20 | Femme | 1,62 | SEGMI | Non | Passable | L3 | Jamais | Parfois | Parfois | | | | | | | | | | | | | | |
| 3 | 106 | 21 | Femme | 1,7 | STAPS | Non | Passable | L3 | Rarement | Rarement | Parfois | | | | | | | | | | | | | | |
| 4 | 107 | 24 | Homme | 1,79 | STAPS | Oui | Assez Bien | L3 | Jamais | Jamais | Jamais | | | | | | | | | | | | | | |
| 5 | 109 | 21 | Homme | 1,85 | STAPS | Non | Passable | L3 | Parfois | Souvent | Souvent | | | | | | | | | | | | | | |
| 6 | 111 | 20 | Femme | 1,69 | STAPS | Oui | Assez Bien | L3 | Parfois | Souvent | Parfois | | | | | | | | | | | | | | |
| 7 | 113 | 22 | Homme | 1,67 | STAPS | Non | Bien | L3 | Rarement | Parfois | Jamais | | | | | | | | | | | | | | |
| 8 | 116 | 21 | Homme | 1,74 | STAPS | Oui | Passable | L3 | Jamais | Parfois | Rarement | | | | | | | | | | | | | | |
| 9 | 119 | 22 | Homme | 1,86 | STAPS | Oui | Assez Bien | L3 | Rarement | Rarement | Jamais | | | | | | | | | | | | | | |
| 10 | 122 | 22 | Homme | 1,86 | NA | Oui | Passable | L3 | Rarement | Rarement | Jamais | | | | | | | | | | | | | | |
| 11 | 125 | 24 | Homme | 1,78 | STAPS | Oui | Passable | L3 | Rarement | Rarement | Parfois | | | | | | | | | | | | | | |
| 12 | 128 | 20 | Homme | 1,75 | STAPS | Non | Assez Bien | L3 | Toujours | Toujours | Parfois | | | | | | | | | | | | | | |
| 13 | 130 | 22 | Homme | 1,77 | STAPS | Oui | Passable | L3 | Souvent | Parfois | Parfois | | | | | | | | | | | | | | |
| 14 | 132 | 23 | Femme | 1,75 | SEGMI | Oui | Passable | L2 | Parfois | Parfois | Parfois | | | | | | | | | | | | | | |
| 15 | 136 | 19 | Homme | 1,75 | SEGMI | Non | Assez Bien | L2 | Parfois | Parfois | Rarement | | | | | | | | | | | | | | |
| 16 | 139 | 18 | Homme | 1,76 | SJAP | Non | Bien | L2 | Parfois | Parfois | Jamais | | | | | | | | | | | | | | |
| 17 | 141 | 20 | Femme | 1,72 | SJAP | Oui | Passable | L2 | Parfois | Parfois | Rarement | | | | | | | | | | | | | | |
| 18 | 145 | 19 | Femme | 1,65 | SJAP | Oui | Passable | L2 | Jamais | Rarement | Jamais | | | | | | | | | | | | | | |
| 19 | 149 | 19 | Femme | 1,64 | SJAP | Non | Assez Bien | L2 | Rarement | Parfois | Rarement | | | | | | | | | | | | | | |
| 20 | 151 | 20 | Femme | 1,63 | SEGMI | Non | Assez Bien | L2 | Rarement | Parfois | Rarement | | | | | | | | | | | | | | |
| 21 | 153 | 19 | Femme | 1,74 | SEGMI | Non | Assez Bien | L2 | Rarement | Rarement | Jamais | | | | | | | | | | | | | | |
| 22 | 157 | 18 | Femme | 1,66 | SEGMI | Non | Assez Bien | L2 | Parfois | Parfois | Rarement | | | | | | | | | | | | | | |
| 23 | 159 | 19 | Femme | 1,73 | SEGMI | Non | Assez Bien | L2 | Parfois | Parfois | Rarement | | | | | | | | | | | | | | |
| 24 | 163 | 21 | Femme | 1,73 | SJAP | Oui | Assez Bien | M1 | Jamais | Jamais | Jamais | | | | | | | | | | | | | | |

| | | | File | | | Edit | | Color | | | Fenêtres | | | Sous-groupes | |
|---|---|---|---|---|---|---|---|---|---|---|---|---|---|---|---|
| | Id | Age | Sexe | NiveauDetude | UFR | Redoublement | MentionBac | Copier | Communiquer | EchangeBrouillon | Antiseche | SMS | CoursGenoux |
| 1 | ☐ 101 | ☐ 18 | ☐ Femme | ☐ L1 | ☐ Droit | ☐ Oui | ☐ Rattrapage | ☐ Jamais | ☐ Jamais | ☐ Jamais | ☐ Jamais | ☐ Jamais | ☐ Jamais |
| 2 | ☐ [104-215] | ☐ [19;20] | ☐ Homme | ☐ L2 | ☐ Economie | ☐ Non | ☐ Passable | ☐ Rarement | ☐ Rarement | ☐ Rarement | ☐ Rarement | ☐ Rarement | ☐ Rarement |
| 3 | ☐ 216 | ☐ 21 | | ☐ L3 | ☐ Sport | | ☐ Assez bien | ☐ Parfois | ☐ Parfois | ☐ Parfois | ☐ Parfois | ☐ Parfois | ☐ Parfois |
| 4 | ☐ [218-271] | ☐ [22;25] | | ☑ M1 | | | ☐ Bien | ☐ Souvent | ☐ Souvent | ☐ Souvent | ☐ Souvent | ☐ Souvent | ☐ Souvent |
| 5 | ☐ 281 | ☐ 26 | | ☐ M2 | | | ☐ Tres bien | ☐ Toujours | ☐ Toujours | ☐ Toujours | ☐ Toujours | ☐ Toujours | ☐ Toujours |
| 6 | | | | | | | ☐ Felicitation | | | | | | |
| 7 | | | | | | | | | | | | | |
| | Id | Age | Sexe | NiveauDetude | UFR | Redoublement | MentionBac | Copier | Communiquer | EchangeBrouillon | Antiseche | SMS | CoursGenoux |
| 1 | 101 | 19 | Femme | M1 | Sport | Non | Assez Bien | Toujours | Toujours | Parfois | Parfois | Rarement | Parfois |
| 2 | 104 | 20 | Femme | M1 | Sport | Non | Passable | Parfois | Souvent | Parfois | Jamais | Jamais | Jamais |
| 5 | 109 | 19 | Femme | M1 | Economie | Oui | Passable | Parfois | Rarement | Rarement | Rarement | Jamais | Jamais |
| 6 | 111 | 19 | Femme | M1 | Sport | Non | Assez Bien | Rarement | Parfois | Jamais | Parfois | Parfois | Jamais |
| 8 | 116 | 21 | Femme | M1 | Sport | Oui | Rattrapage | Parfois | Souvent | Rarement | Rarement | Jamais | Jamais |
| 9 | 119 | 22 | Homme | M1 | Economie | Non | Assez Bien | Rarement | Souvent | Parfois | Souvent | Jamais | Rarement |
| 10 | 122 | 20 | Femme | M1 | Sport | Non | Passable | Rarement | Rarement | Jamais | Jamais | Jamais | Jamais |
| 11 | 125 | 21 | Homme | M1 | Sport | Oui | Assez Bien | Jamais | Rarement | Rarement | Rarement | Jamais | Jamais |
| 12 | 128 | 20 | Femme | M1 | Economie | Non | Assez Bien | Parfois | Parfois | Jamais | Jamais | Jamais | Rarement |
| 13 | 130 | 20 | Femme | M1 | Economie | Oui | Passable | Parfois | Jamais | Souvent | Jamais | Jamais | Jamais |
| 14 | 132 | 24 | Femme | M1 | Sport | Oui | Assez Bien | Parfois | Souvent | Rarement | Jamais | Souvent | Rarement |
| 17 | 141 | 21 | Homme | M1 | Sport | Oui | Assez Bien | Rarement | Parfois | Rarement | Rarement | Jamais | Jamais |
| 18 | 145 | 18 | Femme | M1 | Economie | Non | Assez Bien | Rarement | Rarement | Rarement | Jamais | Jamais | Jamais |
| 21 | 153 | 22 | Femme | M1 | Droit | Oui | Passable | Jamais | Parfois | Rarement | Rarement | Jamais | Rarement |
| 26 | 168 | 20 | Homme | M1 | Sport | Oui | Passable | Parfois | Parfois | Rarement | Jamais | Jamais | Jamais |
| 27 | 170 | 19 | Femme | M1 | Economie | Non | Assez Bien | Rarement | Parfois | Rarement | Rarement | Jamais | Jamais |
| 28 | 171 | 22 | Femme | M1 | Sport | Oui | Passable | Rarement | Parfois | Rarement | Jamais | Jamais | Jamais |
| 31 | 177 | 18 | Homme | M1 | Sport | Non | Passable | Rarement | Rarement | Rarement | Rarement | Jamais | Jamais |
| 36 | 186 | 22 | Femme | M1 | Droit | Oui | Rattrapage | Rarement | Rarement | Parfois | Rarement | Jamais | Jamais |
| 34 | 189 | 18 | Homme | M1 | Economie | Non | Bien | Parfois | Parfois | Parfois | Jamais | Jamais | Jamais |
| 38 | 203 | 24 | Femme | M1 | Economie | Non | Passable | Parfois | Jamais | Parfois | Jamais | Jamais | Jamais |
| 40 | 210 | 22 | Femme | M1 | Droit | Oui | Passable | Jamais | Parfois | Jamais | Jamais | Jamais | Jamais |
| 41 | 212 | 21 | Femme | M1 | Droit | Non | Assez Bien | Jamais | Jamais | Jamais | Jamais | Jamais | Jamais |
| 42 | 214 | 19 | Femme | M1 | Economie | Non | Assez Bien | Parfois | Parfois | Jamais | Jamais | Jamais | Jamais |
| 44 | 220 | 20 | Femme | M1 | Sport | Oui | Assez Bien | Rarement | Toujours | Toujours | Souvent | Toujours | Parfois |

| | Id | Age | Sexe | Taille | NiveauDEtude | UFR | Redoublement | MentionBac | Copier | Communiquer | EchangeBrouillon | Antiseche | SMS | CoursGenoux |
|---|---|---|---|---|---|---|---|---|---|---|---|---|---|---|
| 1 | 101 | 21 | Homme | 1,76 | L3 | STAPS | Oui | Passable | Souvent | Parfois | Rarement | Jamais | Jamais | Rarement |
| 2 | 104 | 20 | Femme | 1,62 | L3 | STAPS | Non | Passable | Jamais | Parfois | Rarement | Jamais | Jamais | Jamais |
| 3 | 106 | 21 | Femme | 1,7 | L3 | STAPS | Non | Passable | Rarement | Parfois | Parfois | Jamais | Jamais | Jamais |
| 4 | 107 | 24 | Homme | 1,79 | L3 | STAPS | Oui | Passable | Jamais | Jamais | Jamais | Jamais | Jamais | Rarement |
| 5 | 109 | 21 | Homme | 1,85 | L3 | STAPS | Oui | Assez Bien | Parfois | Souvent | Souvent | Souvent | Jamais | Rarement |
| 6 | 111 | 20 | Femme | 1,69 | L3 | STAPS | Non | Passable | Rarement | Souvent | Parfois | Souvent | Jamais | Jamais |
| 7 | 113 | 22 | Homme | 1,67 | L3 | STAPS | Non | Bien | Parfois | Toujours | Jamais | Jamais | Jamais | Jamais |
| 8 | 116 | 21 | Homme | 2,05 | L3 | STAPS | Oui | Passable | Jamais | Parfois | Rarement | Jamais | Jamais | Jamais |
| 9 | 119 | 22 | Homme | 1,86 | L3 | STAPS | Oui | Assez Bien | Rarement | Rarement | Jamais | Souvent | Jamais | Jamais |
| 10 | 122 | 22 | Homme | 1,78 | L3 | STAPS | Oui | Passable | Rarement | Rarement | Rarement | Jamais | Jamais | Rarement |
| 11 | 125 | 24 | Homme | 1,75 | L3 | STAPS | Oui | Passable | Rarement | Rarement | Jamais | Jamais | Jamais | Jamais |
| 12 | 128 | 20 | Homme | 2,12 | L3 | STAPS | Non | Assez Bien | Toujours | Toujours | Parfois | Parfois | Jamais | Jamais |
| 13 | 130 | 22 | Homme | 1,75 | L2 | SEGMI | Oui | Passable | Souvent | Parfois | Parfois | Jamais | Jamais | Jamais |
| 14 | 132 | 23 | Homme | 1,75 | L2 | SEGMI | Oui | Assez Bien | Jamais | Rarement | Jamais | Rarement | Jamais | Jamais |
| 15 | 136 | 19 | Homme | 1,76 | L2 | SEGMI | Non | Bien | Parfois | Parfois | Parfois | Rarement | Jamais | Jamais |
| 16 | 139 | 18 | Homme | 1,72 | L2 | SEGMI | Oui | Passable | Parfois | Parfois | Rarement | Rarement | Jamais | Jamais |
| 17 | 141 | 20 | Femme | 1,65 | L2 | SEGMI | Oui | Passable | Parfois | Parfois | Rarement | Jamais | Jamais | Jamais |
| 18 | 145 | 19 | Femme | 1,64 | L2 | SEGMI | Non | Passable | Parfois | Rarement | Rarement | Rarement | Jamais | Jamais |
| 19 | 149 | 19 | Femme | 1,63 | L2 | SEGMI | Non | Assez Bien | Jamais | Rarement | Jamais | Rarement | Jamais | Jamais |
| 20 | 151 | 20 | Femme | 1,74 | L2 | SEGMI | Non | Assez Bien | Rarement | Rarement | Rarement | Jamais | Jamais | Jamais |
| 21 | 153 | 19 | Femme | 1,66 | L2 | SEGMI | Non | Assez Bien | Rarement | Parfois | Rarement | Rarement | Jamais | Jamais |
| 22 | 157 | 18 | Femme | 1,73 | L2 | SEGMI | Non | Assez Bien | Parfois | Parfois | Rarement | Jamais | Jamais | Jamais |
| 23 | 159 | 19 | Femme | 1,73 | L2 | SJAP | Non | Assez Bien | Jamais | Jamais | Jamais | Jamais | Jamais | Jamais |
| 24 | 163 | 21 | Femme | 1,73 | M1 | SJAP | Oui | Rattrapage | Rarement | Rarement | Rarement | Jamais | Jamais | Jamais |
| 25 | 164 | 22 | Femme | 1,69 | M1 | SJAP | Oui | Assez Bien | Jamais | Jamais | Jamais | Jamais | Jamais | Jamais |
| 26 | 168 | 21 | Femme | 1,55 | M1 | SJAP | Non | Assez Bien | Jamais | Jamais | Jamais | Jamais | Jamais | Jamais |

FIG.9a

| | File | | | | Edit | | Color | | | | | Fenêtres | | | Sous-groupes | |
|---|---|---|---|---|---|---|---|---|---|---|---|---|---|---|---|---|
| | Id | Age | Sexe | Taille | NiveauDEtude | UFR | Redoublement | MentionBac | Copier | Communiquer | EchangeBrouillon | Antiseche | SMS | CoursGenoux |
| 1 | 101 | 21 | Homme | 1,76 | L3 | STAPS | Oui | Passable | Souvent | Parfois | Rarement | Jamais | Jamais | Rarement |
| 2 | 104 | 20 | Femme | 1,62 | L3 | STAPS | Non | Passable | Jamais | Parfois | Rarement | Jamais | Jamais | Jamais |
| 3 | 106 | 21 | Femme | 1,7 | L3 | STAPS | Non | Passable | Rarement | Parfois | Parfois | Jamais | Jamais | Jamais |
| 4 | 107 | 24 | Homme | 1,79 | L3 | STAPS | Oui | Passable | Jamais | Jamais | Jamais | Jamais | Jamais | Rarement |
| 5 | 109 | 21 | Homme | 1,85 | L3 | STAPS | Oui | Assez Bien | Parfois | Souvent | Souvent | Souvent | Jamais | Jamais |
| 6 | 111 | 20 | Femme | 1,69 | L3 | STAPS | Non | Passable | Rarement | Souvent | Parfois | Souvent | Jamais | Rarement |
| 7 | 113 | 22 | Homme | 167 | L3 | STAPS | Non | Bien | Parfois | Toujours | Jamais | Jamais | Jamais | Rarement |
| 8 | 116 | 21 | Homme | 2,05 | L3 | STAPS | Oui | Passable | Parfois | Parfois | Rarement | Souvent | Jamais | Jamais |
| 9 | 119 | 22 | Homme | 1,86 | L3 | STAPS | Oui | Assez Bien | Jamais | Parfois | Jamais | Jamais | Jamais | Jamais |
| 10 | 122 | 22 | Homme | 1,86 | L3 | STAPS | Oui | Passable | Rarement | Rarement | Rarement | Jamais | Jamais | Jamais |
| 11 | 125 | 24 | Homme | 1,78 | L3 | STAPS | Oui | Passable | Rarement | Rarement | Jamais | Parfois | Jamais | Jamais |
| 12 | 128 | 20 | Homme | 1,75 | L3 | STAPS | Non | Passable | Rarement | Toujours | Parfois | Jamais | Jamais | Jamais |
| 13 | 130 | 22 | Homme | 2,12 | L3 | STAPS | Oui | Assez Bien | Toujours | Toujours | Parfois | Parfois | Jamais | Rarement |
| 14 | 132 | 23 | Homme | 1,75 | L2 | SEGMI | Oui | Passable | Souvent | Parfois | | | | |
| 15 | 136 | 19 | Homme | 1,75 | L2 | SEGMI | Non | Assez Bien | | | | | | |
| 16 | 139 | 18 | Homme | 1,76 | L2 | SEGMI | Non | Bien | Parfois | Parfois | Parfois | Rarement | Jamais | Jamais |
| 17 | 141 | 20 | Femme | 1,72 | L2 | SEGMI | Oui | Passable | Parfois | Parfois | Rarement | Rarement | Jamais | Jamais |
| 18 | 145 | 19 | Femme | 1,65 | L2 | SEGMI | Oui | Passable | Parfois | Parfois | Rarement | Jamais | Jamais | Jamais |
| 19 | 149 | 19 | Femme | 1,64 | L2 | SEGMI | Non | Passable | Jamais | Rarement | Jamais | Rarement | Jamais | Jamais |
| 20 | 151 | 20 | Femme | 1,63 | L2 | SEGMI | Non | Assez Bien | Rarement | Rarement | Jamais | Rarement | Jamais | Jamais |
| 21 | 153 | 19 | Femme | 1,74 | L2 | SEGMI | Non | Assez Bien | Rarement | Parfois | Jamais | Jamais | Jamais | Jamais |
| 22 | 157 | 18 | Femme | 1,66 | L2 | SEGMI | Non | Assez Bien | Parfois | Parfois | Rarement | Rarement | Jamais | Jamais |
| 23 | 159 | 19 | Femme | 1,73 | L2 | SEGMI | Non | Assez Bien | Jamais | Jamais | Jamais | Jamais | Jamais | Jamais |
| 24 | 163 | 21 | Femme | 1,73 | M1 | SJAP | Oui | Rattrapage | Rarement | Rarement | Rarement | Jamais | Jamais | Jamais |
| 25 | 164 | 22 | Femme | 1,69 | M1 | SJAP | Oui | Assez Bien | Jamais | Jamais | Jamais | Jamais | Jamais | Jamais |
| 26 | 168 | 21 | Femme | 1,55 | M1 | SJAP | Non | Assez Bien | Jamais | Jamais | Jamais | Jamais | Jamais | Jamais |

FIG. 9b

| | Id | Age | Sexe | Taille | NiveauDEtude | UFR | Redoublement | MentionBac | Copier | Communiquer | EchangeBrouillon | Antiseche | SMS | CoursGenoux |
|---|---|---|---|---|---|---|---|---|---|---|---|---|---|---|
| 1 | 101 | 21 | Homme | 1,76 | L3 | STAPS | Oui | Passable | Souvent | Parfois | Rarement | Jamais | Jamais | Rarement |
| 2 | 104 | 20 | Femme | 1,62 | L3 | STAPS | Non | Passable | Jamais | Parfois | Rarement | Jamais | Jamais | Jamais |
| 3 | 106 | 21 | Femme | 1,7 | L3 | STAPS | Non | Passable | Rarement | Parfois | Parfois | Jamais | Jamais | Jamais |
| 4 | 107 | 24 | Homme | 1,79 | L3 | STAPS | Oui | Assez Bien | Jamais | Jamais | Jamais | Jamais | Jamais | Jamais |
| 5 | 109 | 21 | Homme | 1,85 | L3 | STAPS | Oui | Passable | Parfois | Souvent | Souvent | Souvent | Jamais | Rarement |
| 6 | 111 | 20 | Femme | 1,69 | L3 | STAPS | Non | Passable | Rarement | Souvent | Parfois | Souvent | Jamais | Rarement |
| 7 | 113 | 22 | Homme | 1,69 | L3 | STAPS | Non | Bien | Parfois | Toujours | Jamais | Jamais | Jamais | Jamais |
| 8 | 116 | 21 | Homme | 2,05 | L3 | STAPS | Oui | Passable | Jamais | Parfois | Rarement | Jamais | Jamais | Jamais |
| 9 | 119 | 22 | Homme | 1,86 | L3 | STAPS | Oui | Assez Bien | Rarement | Parfois | Jamais | Souvent | Jamais | Rarement |
| 10 | 122 | 22 | Homme | 1,86 | L3 | STAPS | Oui | Passable | Rarement | Rarement | Rarement | Jamais | Jamais | Jamais |
| 11 | 125 | 24 | Homme | 1,78 | L3 | STAPS | Oui | Passable | Rarement | Rarement | Jamais | Parfois | Jamais | Jamais |
| 12 | 128 | 20 | Homme | 1,75 | L3 | STAPS | Non | Passable | Rarement | Toujours | Parfois | Jamais | Jamais | Jamais |
| 13 | 130 | 22 | Homme | 2,12 | L3 | STAPS | Oui | Assez Bien | Toujours | Toujours | Parfois | Jamais | Jamais | Rarement |
| 14 | 132 | 23 | Homme | 1,75 | L2 | SEGMI | Oui | Passable | Souvent | Parfois | | Rarement | Jamais | Jamais |
| 15 | 136 | 19 | Homme | 1,75 | L2 | SEGMI | Non | Assez Bien | | | Parfois | Rarement | Jamais | Jamais |
| 16 | 139 | 18 | Homme | 1,76 | L2 | SEGMI | Non | Bien | Parfois | Parfois | Rarement | Rarement | Jamais | Jamais |
| 17 | 141 | 20 | Femme | 1,72 | L2 | SEGMI | Oui | Passable | Parfois | Parfois | Rarement | Rarement | Jamais | Jamais |
| 18 | 145 | 19 | Femme | 1,65 | L2 | SEGMI | Oui | Passable | Parfois | Parfois | Rarement | Rarement | Jamais | Jamais |
| 19 | 149 | 19 | Femme | 1,64 | L2 | SEGMI | Non | Passable | Parfois | Parfois | Jamais | Rarement | Jamais | Jamais |
| 20 | 151 | 20 | Femme | 1,63 | L2 | SEGMI | Non | Assez Bien | Jamais | Rarement | Jamais | Jamais | Jamais | Jamais |
| 21 | 153 | 19 | Femme | 1,74 | L2 | SEGMI | Non | Assez Bien | Rarement | Parfois | Rarement | Rarement | Jamais | Jamais |
| 22 | 157 | 19 | Femme | 1,66 | L2 | SEGMI | Non | Assez Bien | Rarement | Parfois | Rarement | Jamais | Jamais | Jamais |
| 23 | 159 | 19 | Femme | 1,73 | L2 | SJAP | Non | Assez Bien | Parfois | Parfois | Rarement | Jamais | Jamais | Jamais |
| 24 | 163 | 21 | Femme | 1,73 | M1 | SJAP | Oui | Assez Bien | Jamais | Jamais | Rarement | Jamais | Jamais | Jamais |
| 25 | 164 | 22 | Femme | 1,69 | M1 | SJAP | Oui | Rattrapage | Rarement | Rarement | Rarement | Jamais | Jamais | Jamais |
| 26 | 168 | 21 | Femme | | M1 | SJAP | Non | Assez Bien | Jamais | Jamais | Jamais | Jamais | Jamais | Jamais |

FIG.9c

|  | Id | Age | Sexe | Taille | NiveauDEtude | UFR | Redoublement | MentionBac | Copier | Communiquer | EchangeBrouillon | Antiseche | SMS | CoursGenoux |
|---|---|---|---|---|---|---|---|---|---|---|---|---|---|---|
| 1 | 101 | 21 | Homme | 1,76 | L3 | STAPS | Oui | Passable | Souvent | Parfois | Rarement | Jamais | Jamais | Rarement |
| 2 | 104 | 20 | Femme | 1,62 | L3 | STAPS | Non | Passable | Jamais | Parfois | Rarement | Jamais | Jamais | Jamais |
| 3 | 106 | 21 | Femme | 1,7 | L3 | STAPS | Non | Passable | Rarement | Parfois | Parfois | Jamais | Jamais | Jamais |
| 4 | 107 | 24 | Homme | 1,79 | L3 | STAPS | Oui | Assez Bien | Parfois | Jamais | Jamais | Jamais | Jamais | Rarement |
| 5 | 109 | 21 | Homme | 1,85 | L3 | STAPS | Oui | Passable | Rarement | Souvent | Souvent | Souvent | Jamais | Rarement |
| 6 | 111 | 20 | Femme | 1,69 | L3 | STAPS | Non | Bien | Parfois | Souvent | Parfois | Souvent | Jamais | Jamais |
| 7 | 113 | 22 | Homme | | L3 | STAPS | Non | Passable | | Toujours | Jamais | Jamais | Jamais | Jamais |
| 8 | 116 | 21 | Homme | | L3 | STAPS | Oui | Assez Bien | Jamais | Parfois | Rarement | Souvent | Jamais | Jamais |
| 9 | 119 | 22 | Homme | 1,86 | L3 | STAPS | Oui | Passable | Rarement | Rarement | | Jamais | Jamais | Rarement |
| 10 | 122 | 22 | Homme | 1,86 | L3 | STAPS | Oui | Passable | Rarement | Rarement | Rarement | Jamais | Jamais | Jamais |
| 11 | 125 | 24 | Homme | 1,78 | L3 | STAPS | Oui | Passable | Rarement | Rarement | Jamais | Jamais | Jamais | Jamais |
| 12 | 128 | 20 | Homme | 1,75 | L3 | STAPS | Non | Assez Bien | Toujours | Toujours | Parfois | Parfois | Jamais | Rarement |
| 13 | 130 | 22 | Homme | 2,12 | L3 | STAPS | Oui | Passable | Souvent | Parfois | Parfois | Jamais | Jamais | Jamais |
| 14 | 132 | 23 | Homme | 1,75 | L2 | SEGMI | Oui | Assez Bien | | Parfois | | | Jamais | Jamais |
| 15 | 136 | 19 | Homme | 1,75 | L2 | SEGMI | Non | Bien | Parfois | Parfois | Parfois | Rarement | Jamais | Jamais |
| 16 | 139 | 18 | Homme | 1,76 | L2 | SEGMI | Non | Passable | Parfois | Parfois | Rarement | Rarement | Jamais | Jamais |
| 17 | 141 | 20 | Femme | 1,72 | L2 | SEGMI | Oui | Passable | Parfois | Parfois | Rarement | Rarement | Jamais | Jamais |
| 18 | 145 | 19 | Femme | 1,65 | L2 | SEGMI | Non | Passable | Parfois | Parfois | Rarement | Rarement | Jamais | Jamais |
| 19 | 149 | 19 | Femme | 1,64 | L2 | SEGMI | Non | Assez Bien | Jamais | Rarement | Jamais | Jamais | Jamais | Jamais |
| 20 | 151 | 20 | Femme | 1,63 | L2 | SEGMI | Non | Assez Bien | Rarement | Rarement | Rarement | Rarement | Jamais | Jamais |
| 21 | 153 | 19 | Femme | 1,74 | L2 | SEGMI | Non | Assez Bien | Rarement | Parfois | Rarement | Jamais | Jamais | Jamais |
| 22 | 157 | 18 | Femme | 1,66 | L2 | SEGMI | Non | Passable | Parfois | Parfois | Rarement | Rarement | Jamais | Jamais |
| 23 | 159 | 19 | Femme | 1,73 | L2 | SEGMI | Oui | Assez Bien | Rarement | Jamais | Jamais | Jamais | Jamais | Jamais |
| 24 | 163 | 21 | Femme | 1,73 | M1 | SJAP | Oui | Rattrapage | Rarement | Rarement | Rarement | Jamais | Jamais | Jamais |
| 25 | 164 | 22 | Femme | 1,69 | M1 | SJAP | Oui | Assez Bien | Jamais | Jamais | Jamais | Jamais | Jamais | Jamais |
| 26 | 168 | 21 | Femme | | M1 | SJAP | Non | Assez Bien | | | | | | |

FIG.9d

| | Id | Age | Sexe | Taille | NiveauDEtude | UFR | Redoublement | MentionBac | Copier | Communiquer | EchangeBrouillon | Antiseche | SMS | CoursGenoux |
|---|---|---|---|---|---|---|---|---|---|---|---|---|---|---|
| 1 | 101 | 21 | Homme | 1,76 | L3 | STAPS | Oui | Passable | Souvent | Parfois | Rarement | Jamais | Jamais | Rarement |
| 2 | 104 | 20 | Femme | 1,62 | L3 | STAPS | Non | Passable | Jamais | Parfois | Rarement | Jamais | Jamais | Jamais |
| 3 | 106 | 21 | Femme | 1,7 | L3 | STAPS | Non | Passable | Rarement | Parfois | Parfois | Jamais | Jamais | Jamais |
| 4 | 107 | 21 | Homme | 1,79 | L3 | STAPS | Oui | Passable | Jamais | Jamais | Souvent | Jamais | Jamais | Rarement |
| 5 | 109 | 21 | Homme | 1,85 | L3 | STAPS | Oui | Parfois | Souvent | Souvent | Souvent | Jamais | Jamais | Rarement |
| 6 | 111 | 20 | Femme | 1,69 | L3 | STAPS | Non | Assez Bien | Rarement | Souvent | Parfois | Souvent | Jamais | Rarement |
| 7 | 113 | 22 | Homme | | L3 | STAPS | Non | Passable | Parfois | Toujours | Jamais | Jamais | Jamais | Jamais |
| 8 | 116 | 21 | Homme | 1,86 | L3 | STAPS | Oui | Bien | Jamais | Parfois | Rarement | Souvent | Jamais | Jamais |
| 9 | 119 | 22 | Homme | 1,86 | L3 | STAPS | Oui | Assez Bien | Rarement | Parfois | Jamais | Jamais | Jamais | Jamais |
| 10 | 122 | 22 | Homme | 1,78 | L3 | STAPS | Oui | Passable | Rarement | Rarement | Rarement | Jamais | Jamais | Rarement |
| 11 | 125 | 24 | Homme | 1,75 | L3 | STAPS | Non | Passable | Rarement | Rarement | Jamais | Parfois | Jamais | Jamais |
| 12 | 128 | 20 | Homme | 2,12 | L3 | STAPS | Oui | Assez Bien | Toujours | Toujours | Parfois | Jamais | Jamais | Rarement |
| 13 | 130 | 22 | Homme | 1,75 | L2 | SEGMI | Oui | Passable | Souvent | Parfois | Parfois | Jamais | Jamais | Jamais |
| 14 | 132 | 23 | Homme | 1,75 | L2 | SEGMI | Non | Assez Bien | | | | | | |
| 15 | 136 | 19 | Homme | 1,76 | L2 | SEGMI | Non | Bien | Parfois | Parfois | Parfois | Rarement | Jamais | Jamais |
| 16 | 139 | 18 | Homme | 1,72 | L2 | SEGMI | Oui | Passable | Parfois | Parfois | Rarement | Rarement | Jamais | Jamais |
| 17 | 141 | 20 | Femme | 1,65 | L2 | SEGMI | Oui | Passable | Parfois | Parfois | Rarement | Rarement | Jamais | Jamais |
| 18 | 145 | 19 | Femme | 1,64 | L2 | SEGMI | Non | Passable | Parfois | Parfois | Rarement | Jamais | Jamais | Jamais |
| 19 | 149 | 19 | Femme | 1,63 | L2 | SEGMI | Non | Assez Bien | Rarement | Rarement | Jamais | Rarement | Jamais | Jamais |
| 20 | 151 | 20 | Femme | 1,74 | L2 | SEGMI | Non | Assez Bien | Rarement | Rarement | Rarement | Jamais | Jamais | Jamais |
| 21 | 153 | 19 | Femme | 1,66 | L2 | SEGMI | Non | Assez Bien | Rarement | Parfois | Rarement | Rarement | Jamais | Jamais |
| 22 | 157 | 18 | Femme | 1,73 | L2 | SEGMI | Non | Assez Bien | Parfois | Jamais | Jamais | Jamais | Jamais | Jamais |
| 23 | 159 | 19 | Femme | | L2 | SJAP | Oui | Rattrapage | Rarement | Rarement | Rarement | Jamais | Jamais | Jamais |
| 24 | 163 | 21 | Femme | 1,73 | M1 | SJAP | Oui | Assez Bien | Jamais | Rarement | Rarement | Rarement | Jamais | Jamais |
| 25 | 164 | 22 | Femme | 1,69 | M1 | SJAP | Non | Assez Bien | Rarement | Jamais | Jamais | Jamais | Jamais | Jamais |
| 26 | 168 | 21 | Femme | | M1 | SJAP | Non | | | | | | | |

FIG.9e

INTERACTIVE INTERFACE FOR IMPROVING THE MANAGEMENT OF DATASETS

CROSS-REFERENCE TO RELATED APPLICATIONS

This application is a National Stage of International patent application PCT/EP2018/067270, filed on Jun. 27, 2018, which claims priority to foreign European patent application No. EP17305804.1, filed on Jun. 27, 2017, the disclosures of which are incorporated by reference in their entirety.

FIELD OF THE INVENTION

The present invention relates to the field of database management. More specifically, it relates to the interaction between a user and a dataset through an interface.

BACKGROUND PRIOR ART

A number of solutions exist to display and manage datasets, databases, or more generally organized sets of data. Spreadsheet applications, such as Microsoft Excel®, usually represent data in the form of a two dimensional array. This representation has proven to be effective for managing data describing a large number of objects, wherein the data comprises values of a number of variables for each object. This kind of application can be used for example to perform statistical computations regarding a number of variables, such as the gender, age, grade, etc. . . . of objects. The values of variables are generally displayed in a two dimensional array, wherein each line represents an object, and each column represents a variable.

In such solutions, the user can use the interface to modify values of the variables. The user can also perform a number of operations such as filtering values or drawing graphs in order to have a quick overview of the data. For example, if the dataset comprises ages of students, and if a user wishes to have an overview of the ages of the students, he/she can select the column which contains the ages and click on a button. Prior art applications let the user choose a type of graph, for example by presenting all the possible types of graph in a window, and the user can select the desired type of graph to represent data to generate a graph, for example an histogram.

However, the user of existing solutions faces a number of problems. One of these problems is that the user needs to manually select the type of graphics that he/she wants to display. This may represent a burden for users which are not used to manipulate statistics. Furthermore, the sources of data may be very diverse. In a large number of cases, the data is inputted manually by many different persons. It is for example the case of data issued from a poll, wherein a large number of subjects are invited to provide information about themselves. In this case, many errors may occur in input data. For example, if the subjects are asked to indicate their ages, many of them could enter their ages in an incorrect format, for example by entering the age in letters instead of numbers. In this case, existing solution are unable to correctly interpret data as numbers, and to provide a valid graph.

Another functionality of spreadsheet is to allow the user to perform statistical calculations. For example, the user can input formulas to calculate statistical values (i.e the minimum, maximum, median, average, etc. . . . ) of a series of values of a variable for all the objects. However, the existing solutions suffer at least two major drawbacks. One of them is that the user needs to manually enter formulas to perform these calculations. These solutions thus require the user to be familiar with semantics of formulas and programming, which is not the case of many users. Moreover, in case of errors in the input (for example if one of the occurrences of the variable "age" is entered in letters instead of numbers), the existing solutions are unable to correctly interpret data and thus generate errors. Furthermore, they are unable to indicate to the user the origin of the error. In case of a large dataset, the user may thus be unable to locate the faulty value and correct it.

Even in cases of semantically correct inputs, inconsistent values may be problematic. For example, if a subject inputs an age of "200" instead of "20", and the user wishes to display an histogram of ages, the value "200" will be processed as semantically correct, but will affect the histogram by generating an isolated meaningless bar in the histogram. Once the user has identified that an inconsistent value is present in the data, the existing solutions do not provide any simple and efficient mechanism to identify and correct the inconsistent values, especially when the amount of data is very large.

More generally, input errors or inconsistent data generate a number of issues in spreadsheet, statistical, or other kind of data management applications, and these applications lack the functionality of allowing the user to easily identify and correct the faulty data. It shall be noted that correcting such errors usually require knowledge from the user of the actual meaning of data. Performing automatic corrections of data without intervention of the user is thus not a satisfying solution, and provides a risk of incorrect modifications of data.

There is therefore the need of a device, method and application to allow a user to intuitively and easily detect and correct input data errors in any kind of data defining the values of variables for a number of objects.

SUMMARY OF THE INVENTION

To this effect, the invention discloses a device comprising: an access to a display; one or more input interfaces to receive commands from a user; an access to one or more memories storing a dataset comprising values of one or more sets of variables for a plurality of objects; a processing logic comprising: an adaptation to obtain automatically a type of a variable in one or more sets of variables; an adaptation to generate a raw representation of values of said variable for said plurality of objects; an adaptation to determine a synthetic representation type based on said type of variable; an adaptation to generate a synthetic representation of values of said variable for said plurality of objects using said synthetic representation type, said synthetic representation comprising a plurality of elements, each element representing one or more values of the variable for one or more objects; an adaptation to output said raw representation of values and said synthetic representation of values to said display; an adaptation to receive from said one or more input interfaces a selection by the user of an element of said synthetic representation; an adaptation to perform a selection of all objects in said plurality of objects whose value of the variable is represented by said element.

In the course of the invention, the term "object" is similar in scope to the term "individual" in statistics. Therefore, it designates objects, as well as animals or humans or the like, whose properties can be described through variables.

As will be exemplified above, a raw representation is a representation that provides to the user values of the variables for each object. For example, the raw representation can be a two dimensional array of a spreadsheet.

The use of type of data to present synthetic values allows the user to have an immediate overview of specific or inconsistent data. The selection of the one or more object corresponding to this data allows the user to modify easily the values which he/she is looking for.

The invention thus allows a user to easily and intuitively detect interesting, inconsistent or incorrect values within data, and modify them.

Advantageously, the dataset comprising the values of the variable for the plurality of objects is stored in one or more files; the adaptation to obtain automatically a type of the variable comprises an adaptation to detect automatically the type of the variable, based on the values of said variable for the plurality of objects.

This allows, from any compressed or non-compressed source, for example a text-based source (for example, an Excel® file), using the most appropriate type for each type of variable. Moreover, the correct typing of variables advantageously allows saving space in memory, because the most relevant representation is used for each value of each variable. A correct typing of variables also allows the use of the most relevant statistical operations on the variables. This is also simpler to use by the user, who do not need to manually set a type of the variable.

Advantageously, said adaptation to detect automatically the type of the variable comprises one or more adaptations to: retrieve a collection of text strings for all occurrences of the variable; if the number of dictionary words in the collection of text strings is equal to two, detect the type of the variable as a binary type; if the number of dictionary words in the collection of text strings is different from two: if each string in the collection is representative of an integer number, and if the size of each string is below a predefined threshold, detect the type of the variable as an integer type; if each string in the collection is representative of a number, and if at least one number is a non-integer number or if the size of at least one string is above the predefined threshold, detect the type of the variable as a numeric type; if the collection of text strings comprises at least one non-numeric character, detect the type of the variable as a nominal type.

This allows good detection of types of variables, and using the most efficient variable type. This also allows a reduction of the memory footprint to store variables in memory. Indeed, storing a variable having only two words in a binary type, or numeric variables using an integer or numeric type uses much less memory than storing these variables as an array of strings. Meanwhile, the detection of the variable as a nominal variable by default ensures that a type is always detected for each variable.

Advantageously, the synthetic representation type is an array comprising one or more statistical parameters; said adaptation to determine the synthetic representation type based on said type of variable comprises an adaptation to determine said one or more statistical parameters based on said type of variable; said adaptation to generate the synthetic representation of values comprises an adaptation to calculate one or more statistical parameters for said variable; said adaptation to receive from said one or more input interfaces the selection by the user of the element of said representation comprises an adaptation to receive from said one or more input interfaces a selection by the user of a statistical parameter; said adaptation to perform the selection of one or more objects corresponding to said element comprises an adaptation to select said one or more objects based on said statistical parameter and an adaptation to highlight values of said variable for said one or more objects in the raw representation.

The automatic calculation of statistical parameters based on the type of variables allows an automatic calculation of the most relevant statistical parameters. For example, an average, median, minimum and maximum could be calculated for a numeric variable, while a percentage of occurrences of each value could be calculated for a nominal variable.

The selection by the user of a statistical parameter allows the user to intuitively select a statistical value which appears abnormal or of interest. For example, the user may select a maximum value if it is abnormally high.

The selection of corresponding object and highlighting of corresponding values allows the user to have an immediate overview of the locations of the abnormal or interesting values.

Therefore, these features allow the user to interact with data, select and modify values of interest intuitively.

Advantageously, said synthetic representation is a graph, each section of the graph representing the number of occurrences of one or more values of the variable for the plurality of objects; said adaptation to determine the synthetic representation type based on said type of variable comprises an adaptation to determine a type of graph based on the type of variable; said adaptation to generate the synthetic representation of values comprises an adaptation to calculate a size of each section of the graph; said adaptation to receive from said one or more input interfaces a selection by the user of an element of said representation comprises an adaptation to receive from said one or more input interfaces a selection by the user of a section of the graph; said adaptation to perform a selection of one or more objects corresponding to said element comprises an adaptation to select said one or more objects whose value of the variable is represented by the section selected by the user.

The automatic generation of a graph based on the type of variable allows representing the most relevant type of graph for each type of variable, for example a histogram for numeric variables, a spaced bar graph for binary variables, or a circle graph for nominal variables.

The selection by the user of a section of the graph allows the user to intuitively select a section of the graph value which visually appears abnormal or of interest. For example, a user can select an isolated bar of a histogram, which visually represents a value with an unlikely high or low value, or a very small section of a circle graph, which represents a value of a nominal variable with a very low, or a unique occurrence, any of these values likely representing an input error.

The selection of corresponding object and highlighting of corresponding values allows the user to have an immediate overview of the locations of the abnormal or interesting values.

Therefore, these features allow the user to intuitively and visually select abnormal or interesting values by simply clicking on a graph.

Advantageously, said synthetic representation is a list of modalities of the variable; said adaptation to determine the synthetic representation type based on said type of variable comprises an adaptation to determine if the variable is a categorical variable; said adaptation to generate the synthetic representation of values comprises an adaptation to represent, if the variable is a categorical variable, modalities of the variable among the plurality of objects; said adaptation to receive from said one or more input interfaces a selection by the user of an element of said representation comprises an adaptation to receive from said one or more input interfaces an association between a first and a second modality of the variable; said adaptation to perform a selection of one or more objects corresponding to said element comprises an adaptation to select one or more objects having the first modality as value of the variable, and assign the second modality as value of the variable for said one or more objects.

The representation of the modalities of the variable allows the user to obtain an overview of the values of the variables for the plurality of objects, and detect values which are similar (for example values which differ from a single letter, singular and plurals, or by capital letters), which likely have the same meaning.

The reception of an association from the user between two modalities allows identifying the modalities that should have been the same. This avoids using automatic rules of associations of modalities that generate a high risk of incorrect modifications. Furthermore, allowing the user to associate the modalities allows obtaining an insight from the comprehension of the user of statistical data.

The automatic assignation of the second modality to the values of the variable for objects that had previously the first modality allows automatically propagating of the association made by the user to all the objects. Therefore, the occurrences of the first modality are deleted and replaced by occurrences of the second modality, which simplify the management and understanding of statistical data.

Therefore, these features allow simplifying the management and understanding of statistical data while letting the user intuitively indicating the modalities that should be associated and deleted.

Advantageously, said synthetic representation is one of a list of variable types or a combination of a list of variable types and a list of modalities of the variable; said adaptation to determine the synthetic representation type based on said type of variable comprises an adaptation to determine if the variable is a categorical variable; said adaptation to generate the synthetic representation of values comprises an adaptation to represent a list of variable types and, if the variable is a categorical variable, modalities of the variable among the plurality of objects; said adaptation to receive from said one or more input interfaces a selection by the user of an element of said representation comprises an adaptation to receive from said one or more input a selection by the user of a desired type of the variable, which is different from said type of variable; said adaptation to perform a selection of one or more objects corresponding to said element comprises: an adaptation to identify and output to said display modalities of the variable that do not match the desired type of the variable; an adaptation to receive from said one or more input interfaces a selection of a modality of the variable that do not match the desired type of the variable, and a replacement modality to replace said modality; an adaptation to select one or more objects whose value of the variable is said modality that do not match the desired type of the variable, and replace said modality that do not match the desired type of the variable by said replacement modality for said one or more objects.

The display of the list of possible types of the variable allows the user to determine instantaneously if the variable has been casted in a type it should not be, and to display to the end user a proposal of the type that the variable should have.

Furthermore, this allows the user to automatically verify the modalities of the variable that prevent the relevant type of variable to be determined. Input errors can thus be detected and corrected by the user (for example if a user entered a "O" instead of a "0" for a value, the variable is detected as a nominal variable instead of a numeric variable).

The automatic replacement of the modalities that prevent the variable to be casted in the relevant type furthermore allows the variable to be determined as belonging to the desired type of variables.

These features thus allow the user to intuitively and efficiently assign the right type to each variable. Furthermore, this operation is much more intuitive and easy to perform for the user than a manual verification of all occurrences of the variable.

Advantageously, the processing logic further comprises an adaptation to set the type of the variable as the desired type of variable, and modify representations in memory of the occurrences of said variable according to said desired type of variable, when all occurrences of said variable match the desired type of variable.

These features allow casting all the occurrences of the variable in memory to a memory type which is best suited for the management of said variable. For example, when a variable is converted from a nominal to an integer variable, the occurrences of said variable can be casted in memory from a string to an integer memory type. This advantageously allows a save of memory space, and an increase of the speed of execution of the program, because the values of variables are expressed in memory in the most relevant form.

Advantageously, said synthetic representation type is one of a list of modalities, a list of intervals, or a list of modalities and intervals; said adaptation to determine the synthetic representation type based on said type of variable comprises an adaptation to set the representation type as a list of modalities if the variable is of a categorical type, and one of a list of intervals, or a list of modalities and intervals if the variable is of an integer or numeric type; said adaptation to generate the synthetic representation of values comprises an adaptation to generate a list of modalities, intervals, or combination thereof describing all the values of the variable for the plurality of object, depending on the synthetic representation type; the processing logic further comprises an adaptation to filter the values of the raw representation in order to display only values corresponding to an element of said list of modalities, intervals, or combination thereof selected by the user.

The generation of a list of elements that encompasses all values of variable for the plurality of objects allows the user to have an overview of all possible values of the variable. Meanwhile, defining the elements of the list based on the type of the variable allows tailoring the representation of the list of elements to best represent the type of the variable. For example, a nominal variable can be represented by a list of all its modalities; an integer variable can be represented using a mix of single values and intervals; a continuous numeric variable can be represented using intervals.

These features thus allow the user to filter the variable intuitively, using the most appropriate representation of values of variable depending of the type of said variable.

Advantageously, said synthetic representation type is one or more types of values to highlight; said adaptation to determine the synthetic representation type based on said type of variable comprises an adaptation to determine said one or more types of values to highlight based on said type of variable; said adaptation to generate the synthetic representation of values comprises an adaptation to select values of the variable where to superimpose colors in the raw representation based on said types of values to highlight, and to superimpose colors on said selected values; said adaptation to receive from said one or more input interfaces a selection by the user of an element of said representation comprises an adaptation to receive from said one or more input interfaces a selection by the user of a value highlighted in a color in the raw representation; said adaptation to perform a selection of one or more objects corresponding to said element comprises an adaptation to select one or more objects having a value of the variable highlighted in the color.

These features allow the user to have a direct overview of specific values depending on the type of variable. For example, if the variable is a nominal variable, empty values can be highlighted. On the other hand, if the variable is a numeric variable, particularly high or low values (for example, the minimum, maximum, top 5% values, etc. . . . ) can be highlighted. Meanwhile, the user can intuitively select and modify the values he/she is interested in.

The invention also discloses a method comprising: accessing one or more memories storing a dataset comprising values of one or more sets of variables for a plurality of objects; obtaining a type of a variable in the one or more sets of variables; generating a raw representation of values of said variable for said plurality of objects; determining a synthetic representation type based on said type of variable; generating a synthetic representation of values of said variable for said plurality of objects using said synthetic representation type, said synthetic representation comprising a plurality of elements, each element representing one or more values of the variable for one or more objects; displaying said raw representation of values and said synthetic representation of values; receiving a selection by a user of an element of said synthetic representation; selecting all objects in said plurality of objects whose value of the variable is represented by said element.

The invention also discloses a computer program product comprising computer code instructions configured to: access one or more memories storing a dataset comprising values of one or more sets of variables for a plurality of objects; obtain a type of a variable in the one or more sets of variables; generate a raw representation of values of said variable for said plurality of objects; determine a synthetic representation type based on said type of variable; generate a synthetic representation of values of said variable for said plurality of objects using said synthetic representation type, said synthetic representation comprising a plurality of elements, each element representing one or more values of the variable for one or more objects; display said raw representation of values and said synthetic representation of values; receive a selection by a user of an element of said synthetic representation; select all objects in said plurality of objects whose value of the variable is represented by said element.

BRIEF DESCRIPTION OF THE DRAWINGS

The invention will be better understood and its various features and advantages will emerge from the following description of a number of exemplary embodiments provided for illustration purposes only and its appended figures in which:

FIG. 2 displays an example of an interface of a device in a number of embodiments of the invention;

FIG. 3 displays an example of an automatic generation and display of statistical parameters in a number of embodiments of the invention;

FIGS. 5a to 5h display an example of association and modification of modalities of a variable in a number of embodiments of the invention;

FIGS. 6a to 6g display a first example of modification of a type of variable in a number of embodiments of the invention;

FIGS. 7a to 7g display a second example of modification of a type of variable in a number of embodiments of the invention;

FIGS. 8a to 8d display an example of filtering of values based on two variables in a number of embodiment of the invention;

FIGS. 9a to 9e display an example of highlighting values of interest depending of the types of each variable in a number of embodiments of the invention;

DETAILED DESCRIPTION OF THE INVENTION

Figure 1:
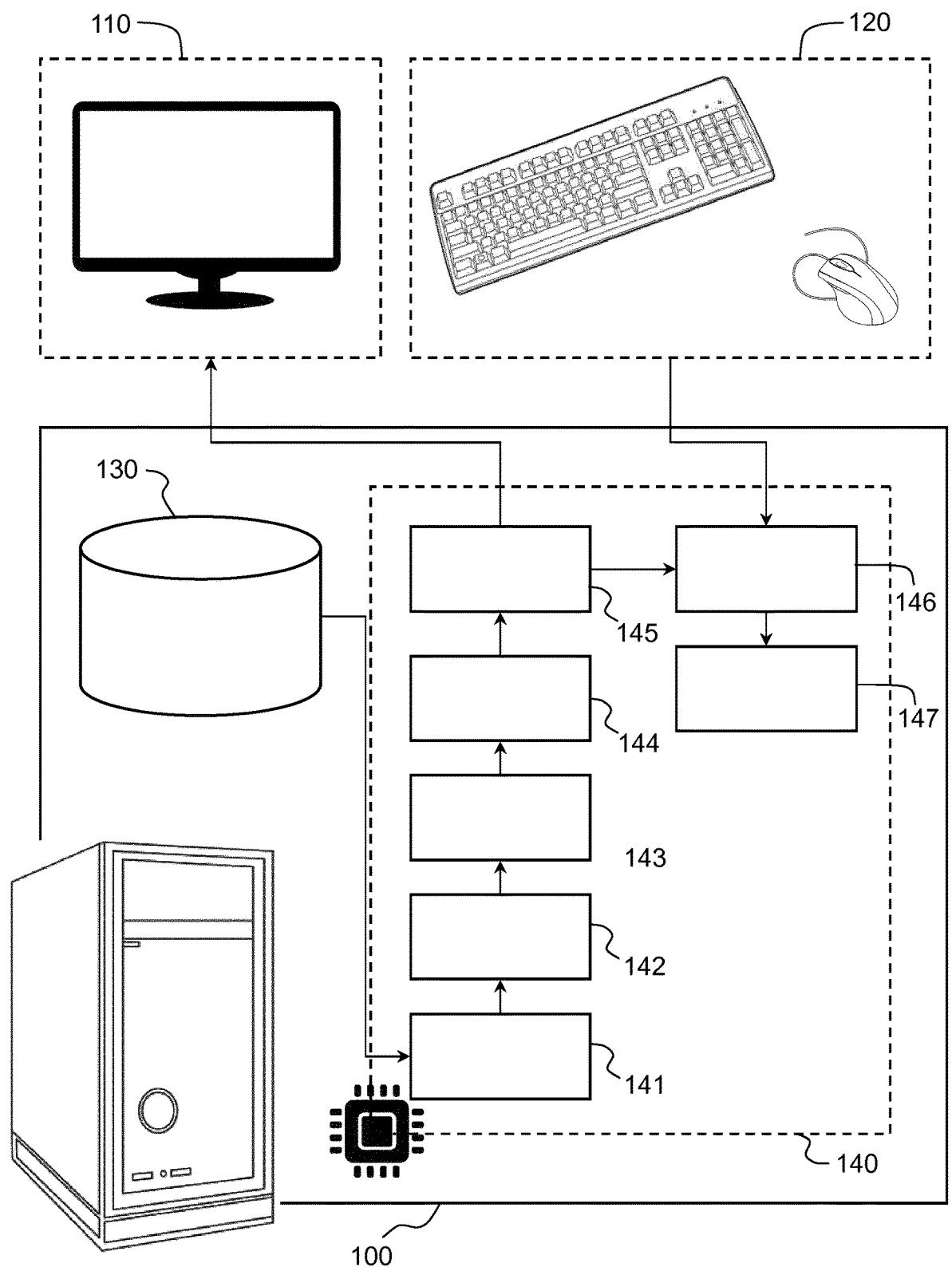
FIG. 1 displays an example of a functional architecture of a device in a number of embodiments of the invention.

FIG. 1 displays an example of a functional architecture of a device in a number of embodiments of the invention.

The device 100 may be any kind of device with computing capabilities. For example, the device 100 may be a computer, a smartphone or a tablet, an IoT device or the like.

The device comprises an access to a display 110. The display 110 can be any kind of display allowing the user to view images from the device 100. For example, the display 110 may be a any screen or the like such as glasses, a tactile screen, a watch or a video projector. The display 110 may be embedded within the same housing as the device 100. This is for example the case if the display 110 is a screen (whether tactile or not) of a smartphone or a tablet. The display may also be embedded within a housing separated from the device 100, and the device 100 connected to the display 110. It is for example the case if the display is a separate screen, or a video projector. The device 100 can be associated to the display 110 through any kind of connection, for example through a wire or a wireless connection (e.g Bluetooth™, Wi-Fi™, or any kind of wireless connection allowing the device 100 to send images to the display 110).

The display can also be a combination of elementary displays. For example, the display can comprise two screens side by side, and the user can use seamlessly the two screens.

The device 100 also comprises one or more input interfaces 120 to receive commands from a user. The one or more input interfaces 120 can be any kind of interface allowing the user to input commands such as a mouse, vocal command system, buttons, keys, keyboard, eyes contact or the like.

Although FIG. 1 displays the one or more input interfaces 120 as being a connection to a mouse and a keyboard in a separate housing, according to various embodiments of the invention, the one or more input interfaces may be either a connection to an external device, a part of the device, or a connection to the display 110. For example, the one or more input interfaces may comprise a wired or wireless connection to a mouse, a wired or wireless connection to a keyboard, a connection to an external tactile screen (which can in this case also serve as display 110), a touchpad or keyboard embedded within the housing of the device 100, a microphone to receive vocal commands, or any other kind of suitable input interface.

The device 100 further comprises an access to one or more memories 130 storing a dataset. The one or more memories 130 may be any kind of internal, external, volatile or non-volatile memories. For example, it can be formed by an internal or external hard drive, a memory in a cloud which can be accessed by the device 100, a memory shared among a plurality of devices, a memory on a server, a CD-ROM, or a combination thereof, or more generally any suitable memory or combination thereof.

The one or more memories 130 store a dataset comprising values of one or more sets of variables for a plurality of objects. The dataset can take any suitable form to store values of variables for objects. For example, the dataset can be a database, a text file, a raw or compressed file associated with a spreadsheet application (for example an Excel® file such as one with the extension ".xls" or ".xlsx") or more generally any format allowing a storage of values of variables for a plurality of objects. It should be understood that, in the course of the application, the term "object" is to be defined as a statistical object or individual. Therefore, an object can designate a human, animal or an item, provided that the object can be characterized at least in part by value of variables.

The invention can thus be applied to a large number of datasets. For example, it can be applied to datasets of vehicles, wherein the variables may be the number of wheels, the number of doors, the license plate, the color, the brand of the vehicles, the expected consumption, the price, etc. . . . . It can also be applied to datasets of persons, wherein the variables may be the age, gender, weight, etc. . . . . These examples are provided by means of example only, and the invention can be applied to any kind of dataset.

As will be described in more details hereinafter, the device 100 allows the user to view, modify and interact with the dataset. For example, the device 100 allows the user to view the values of the variables for each object, but also modify these variables. It also allows drawing graphs and displaying colors that allow the user to have a quick overview and understanding of the content of the dataset.

According to various embodiments of the invention, the dataset can be retrieved from a wide variety of sources. For example, the values may be entered manually by the user of the device 100, may be retrieved from external sources or databases, or may be input by a large number of persons, for example through a poll. The latter case is for example commonly used if the dataset is created from questions asked to a large number of persons, in particular when users themselves enter the values.

In certain circumstances, incorrect values of variables may be input. This case is especially frequent when the dataset is built from inputs of a large number of persons. For example, if a person aged 20 is asked to input his/her age, and if the age is to be entered in the form of a number, he/she should input "20". However, in some cases he/she may enter incorrect inputs such as "200", "twenty" or "2O" (with a capital letter "O" instead of the digit "0").

As will be exemplified hereinafter, such input errors may be very problematic for data representation and statistical analysis. Meanwhile, it is a cumbersome and impractical task for the user to review all data in order to look for errors, especially in the frequent case of large datasets. Meanwhile, an automatic correction of errors is not desirable, because correcting such input errors require an in-depth understanding of the meaning of the values of variables within the dataset, which is very difficult to acquire by a machine, especially if new types of objects and variables are used.

One objective of the invention is to let the user to analyze and correct easily and intuitively input data.

To do so, the device 100 comprises a processing logic 140.

According to various embodiments of the invention, a processing logic may be a processor operating in accordance with software instructions, a hardware configuration of the processor, or a combination thereof. It should be understood that any or all of the functions discussed herein may be implemented in a pure hardware implementation and/or by a processor operating in accordance with software instructions, and/or a configuration of a machine learning engine or neural network. A processing logic may also be a multi-core processor executing operations in parallel, a series of processors, or a combination thereof. It should also be understood that any or all software instructions may be stored in a non-transitory computer-readable medium. The term "adaptation of a processing logic" refers to any means (for example hardware configuration, software instructions, machine learning, training or neural network, or any other adaptation means or combination thereof) of adapting a processing logic to execute operations.

In the course of the application, various embodiments of the invention will often be exemplified in relation to a single variable, that will be designated as "the variable". However, it shall be noted that the invention can be applied to a plurality of variables in parallel.

The invention relies on a management of values of variables in the one or more sets of variables. In a number of embodiments, the processing described in the application is performed on a single set of data. However, in many cases the invention can be applied concurrently on a plurality of sets of data. According to various embodiments of the invention, the invention can be applied to a plurality of sets of data: it is for example the case if the invention is applied on a spreadsheet comprising a plurality of tabs: each tab can define a set of variables. It can also be the case within a single tab of a spreadsheet, if variables within the tab are clearly separated in a plurality of sets. It can also be the case if the invention is applied to a plurality of files, each file can define its own set of variables.

In such cases, the invention can be applied separately on each set of variables. The processing logic can comprise an adaptation, not represented in the figures, to identify the one or more sets of variables. Any suitable method can be used to identify the one or more sets of variables. For example, some file or database formats explicitly define the variables. In such cases, the variables can be simply read in a file or database. In other cases, the variables are not explicitly defined, but the presentation of data implicitly indicates what are the variables. It is for example the case of files that organize data by columns, wherein the name of the variable is written in the top cell of the columns. In such cases, the set of variables can be defined by detecting patterns representative of an organization of the dataset, and reading the names of variables in the place defined by the pattern, for example the top cell of each column. In yet other cases, the raw data can be presented to the user, who defines what are the variables, for example by clicking on the names of the variable, and selecting the values of each variable.

The processing logic 140 comprises an adaptation 141 to obtain automatically a type of a variable in the one or more sets of variables.

Automatically obtaining the type of the variable allows an obtaining the most relevant information depending on the type of variable, without requiring the user to manually define the type of variable.

The invention applies to any type of variables. Some commonly used types and subtypes of variables include the following:
- numeric variable: defines a number:
  - continuous numeric variable: a numeric variable that can take any value within a range (for example, a temperature);
  - discrete numeric variable: a numeric variable that can take only discrete values (for example a grade expressed with a precision of 0.1);
- integer variable: a kind of numeric variable that can take only integer values (for example, the number of wheels of a vehicle);
- binary or boolean variable: a variable that can take only two values, each value having a meaning (for example true/false, present/absent . . . )
- nominal variable: a variable having modalities expressed by words (for example, names of persons). The term 'word' is used in the description as alphanumeric strings. The strings are interpreted as words of a nominal variable if they do not appear to belong to other categories;
- ordered variable: kind of nominal variable, in which the modalities of the variable can be logically ordered (for example, an appreciation of an experience by the user can be expressed using 6 ordered modalities: "very poor", "poor", "average", "good", "excellent", "outstanding").

The variables which are not numeric can be generally referred to as "categorical variables".

In a number of embodiments of the invention, the dataset comprises values of variables for objects in one or more files. In a number of embodiments of the invention, the dataset comprises information to explicitly determine the type of data. For example, a variable may be explicitly defined as an 'integer' variable. In such cases, the adaptation 141 can comprise an adaption to retrieve the type of variable from the dataset.

In other embodiments of the invention, the dataset comprises values of variables without any explicit mention of the type of variable, but the type of variable can be deduced from the values in the dataset. It is for example the case if the values are stored in a file in the form of text characters, either in a raw or compressed form. This kind of file is very common for storing dataset. For example, the .xls, .xlsx or .odt filed belong to these types of storage, unless they comprise words to explicitly define the types of variables.

In such cases, the adaptation 141 can comprise an adaptation to retrieve the text characters corresponding to values of said variable for the plurality of objects, and analyze these text characters to deduce the type of the variable.

For example, these adaptations may comprise one or more adaptations to:
- retrieve a collection of text strings for all occurrences of the variable, i.e, retrieve the text strings that correspond to each occurrence of the variable;
- if the number of dictionary words (i.e the number of different text strings) in the collection of text strings is equal to two, to detect the type of the variable as a binary type. Indeed, if only two different text strings are present among all the values of the variables, it can be assumed that they are representative a binary option. This can be performed for example by counting the number of different text strings, and setting the type of the variable as binary if there are exactly two different text strings;
- if the number of words in the collection is different from two, and if each string in the collection comprises only digits, detect the variable type as one of an integer or a numeric type;
- a number of different options can be used to disambiguate a integer or a numeric type. For example, an integer type could be selected if all numbers are integers, and a numeric type could be selected if at least one number is not an integer number. Alternatively, the size of the numbers can also be used. For example, a numeric type can be selected instead of an integer type, if at least on number has a number of digits above a predefined threshold, for example at least 10 digits;
- if the number of words in the collection is different from two, and if the text string comprises at least one non-numeric character, detect the variable type as a nominal type.

This example of typing variables are provided by means of non-limitative example only, and other rules can be applied to detect these types of variables, or other types of variables in the invention.

The processing logic 140 further comprises an adaptation 142 to generate a raw representation of values of said variable for said plurality of objects.

The raw representation can be any kind of representation that provides a view of the values themselves, and allows the user to read values of the variables for the objects. For example, the raw representation can be a two dimensional array wherein each column represents a variable, each line represents an object, and each cell in a line and a column contains the value of the variable represented by the column for the object represented by the line. An example of such a representation is provided in FIG. 2. However this kind of representation is provided by means of non limitative example only, and any kind of representation that allows the user to read the each value of the variable can be used as raw representation.

The processing logic 140 further comprises an adaptation 143 to determine a synthetic representation type based on said type of variable.

A synthetic representation is a representation that is built using an analyze and/or processing of values, in order to display to the user information that is meaningful at the first sight. The synthetic representation may be of different types. For example, the synthetic representation types comprise different types of graphs (histogram, circular graph . . . ) or representations of statistical values (average, maximum . . . ) wherein the statistical vales are chosen depending on the type of variables. Examples of synthetic representations will be provided hereinafter. Determining the type of synthetic representation depending on the type of variable allows providing a synthesis of information to the user, which is the most relevant depending on the type of variable.

The processing logic 140 further comprises an adaptation 144 to generate a synthetic representation of values of said variable for said plurality of objects using said synthetic representation type.

The synthetic representation comprises a plurality of elements and each element represents one or more values for the plurality of objects. For example, if the synthetic representation type is a histogram, each bar of the histogram represents one or more values of the variables, and the height of the bar is representative of the number of occurrences of the one or more variables. The generation of the synthetic representation can be performed for example by calculating the synthetic values which characterize the synthetic representation (for example, the heights of the bars of a histogram, or an average of the values of the variable).

Since the representation type is selected depending on the type of variable, the representation highlights specific or abnormal values.

The processing logic 140 further comprises an adaptation 145 to output the raw representation of values and said synthetic representation of values to the display 110.

The adaptation 145 can thus send the raw representation and the synthetic representation of values to the display 110 in order for the representations to be seen by the user. The representations can be sent in any kind of communication which is used between the device 100 and the display 110, for example by sending images to the display.

The processing logic 140 can further comprise an adaptation 146 to receive from said one or more input interfaces a selection by the user of an element of said synthetic representation.

The selection of the element the user is interested in can be performed in any way. For example, the user can move a cursor on the display, and click where the element is displayed, or navigate among elements using a keyboard, and press a button when the relevant element is selected.

The processing logic 140 further comprises an adaptation 147 to perform a selection of one or more objects corresponding to said element.

The one or more objects corresponding to said elements are the one or more objects whose values of the variable have been used to generate the element. The one or more objects can thus be selected automatically on the basis of the element selected by the user.

As highlighted above, the synthetic representation highlights values that are of interest for the user, for example abnormal or incorrect values, because the synthetic representation type is based on the type of the variable. The user can thus intuitively select an element of the synthetic representation that attracts his/her attention. The corresponding objects are then selected. This allows the user to select intuitively and efficiently the one or more objects that he/she may wish to verify or modify, without having to check all objects of the dataset, which is often a cumbersome and impracticable task.

Manipulating large datasets without using the invention often requires to be done with desktop computers with large screens, large memories capabilities and powerful computation capabilities. As described in FIG. 1, the invention brings great efficiency to various tasks users and statisticians have to perform. In addition to desktop computers, the invention makes the manipulation of datasets advantageously much more practical on tablets and smartphones which may have smaller display and memories and less powerful computing power.

While the next Figures (2 and after) correspond to a desktop computer implementation of the invention for greater clarity, a tablet or a smartphone display would also bring powerful data selection, processing and representation. For example, a column of an array may be selecting by touching the column with a finger, a pen, a smart watch or by means of a gesture. Display may adapt itself to bring data representation as depicted in the invention. For example, a graphical representation may appear. A long pressure or a harder pressure on the screen may bring a conceptual menu. Menu selection may trigger processing and adaptation to the selected values. The speed and efficiency to select and process values of interest makes it possible to work with large datasets on tablets and smartphones despite the reduced computing power capabilities compared to powerful desktop computers used by professional statisticians.

FIG. 2 displays an example of an interface of a device in a number of embodiments of the invention.

The interface 200 allows visualizing and modifying values of a dataset. The interface 200 share certain common aspects of interfaces of spreadsheets applications (such as for example the Microsoft Excel® application). The interface 200 comprises a toolbar 210, and a raw representation of values 220. The interface 200 can be displayed in the display 110, and the user can interact with it using the one or more input interfaces 120.

The toolbar 210 comprises:
- a "File" section 211 that comprises buttons to manage the files: open, save close, import, export a file, etc . . . ;
- an "Edit" section 212, that comprises an undo and redo buttons, to undo and redo last action(s);
- a "Color" section 213 that comprise buttons to add color information to the raw representation to highlight specific values;
- a "Windows" section 214 that comprise buttons to manage the windowing of the interface (for example by providing a second window, cascading windows, etc. . . . ),
- a "Subgroups" section 215 to separate values into groups.

The raw representation 220 represents the values of the dataset using a two dimensional array. A first line 230 displays the name of the variables; each subsequent line 231, 232, 233 . . . represents an object.

In this example, the raw representation 220 represents a French dataset representing information regarding French university students. A first column 2400 represents the number of the lines.

Each subsequent column represents a variable. For example:
- the column 2401 represents the values of the variable "Id", representative of the IDs the students;
- the column 2402 represents the values of the variable "Age", representative of the ages of the students;
- the column 2403 represents the values of the variable "Sexe" (French for "Gender", representative of the genders of the students, with two possible modalities:
  "Homme" (French for "Male");
  "Femme" (French for "Female");
- the column 2404 represents the values of the variable "NiveauDEtude", representative of the grades of the students (in French, "Niveau d'Etudes"—literally "Level of Studies"), with three possible modalities:
  "L2" (second year of Bachelor's degree);
  "L3" (third year of Bachelor's degree);
  "M1" (first year of master's degree);
- the column 2405 represents the values of the variable "UFR", representative of the faculties of the students (in French, "UFR"—for "Unité de Formation et de Recherche"—literally "Formation and Research Unity"), with three possible modalities:
  "Staps" (French for "Faculty of Sports"—"STAPS" means "Sciences et Techniques des Activités Physiques et Sportives", literally "Sciences and Techniques of Sportive and Physical Activities");
  "SEGMI" (French for "Faculty of Mathematics and Economy"—"SEGMI" means "Sciences Economiques, Gestion, Mathématiques et Informatique", literally "Economic Sciences, Management, Mathematics and Computing Science");

"SJPA" (French for "Faculty of Politics Science"—in French "SJPA" means "Sciences Juridiques Administratives et Politiques", literally "Politics, Administrative and legal sciences");

the column 2406 represents the values of the variable "Redoublement", representative of whether the students have already repeated a school year at least once (in French, "Redoublement" means "Repeating a year), with two modalities:

"Oui" (French for "Yes": the student has already repeated at least one year);

"Non" (French for "No": the student never repeated any year);

the column 2407 represents the values of the variable "MentionBac", representative of if the grade at the French grade "baccalaureat" (equivalent of A level grade—in French "Mention Bac"), with five possible modalities:

"Félicitations" (French for "Congratulations");

"Très bien" (French for "Very good");

"Bien" (French for "Good");

"Assez Bien" (French for "Fair");

"Passable" (French for "Poor");

"Rattrapage" (French for "Re-take");

the column 2408 represents the values of the variable "Copier", representative of whether students copy off during exams (in French "Copier" means "Copy off");

the column 2409 represents the values of the variable "Communiquer", representative of whether the students communicate during exams (in French "Communiquer" means "Communicate");

the column 2410 represents the values of the variable "EchangeBrouillon", representative of whether the students exchange drafts during exams (in French "EchangeBrouillon" means "Exchange Draft");

the column 2411 represents the values of the variable "Antiseche", representative of whether the students use cheat sheets (in French "Antiseche" means "Cheat sheet");

the column 2412 represents the values of the variable "SMS", representative of whether the students use text messages during exams (in French "SMS" means "text message");

the column 2413 represents the values of the variable "CoursGenoux", representative of whether the students hold lessons on the knees during exams (in French "CoursGenoux" means Lessons on Knees");

the column 2414 represents the values of the variable "GarderCopie", representative of whether the students keep their examination test (in French "GarderCopie" means "Keep Copy");

the column 2415 represents the values of the variable "PreparerSalle", representative of whether the students prepare the examination rooms during exams (in French "Preparer Salle" means "Prepare Room");

the column 2416 represents the values of the variable "VolerSujet", representative of whether the students steal exam subjects (in French "VolerSujet" means "Steal subject").

Each cell represents the value of a variable for an object. For example, the cell 251 indicates that the value for the variable "Age" for student having the ID 101 is 21 (i.e the student is aged 21), and the cell 252 indicates that the value of the variable "NiveauDEtude" for student having the ID 107 has the value "L3", thereby indicating that the student is in the third year of Bachelor's degree.

The values can thus be extracted from the dataset to be displayed to the user, for example by loading a file. The user can also enter values in the cells to modify one or more values, and save the modified dataset in a file.

Due to the limited size used for drawings, and the large size of typical datasets, the FIG. 2 displays only the first lines and the first columns of the exemplary dataset. The interface 200 comprises sliders, not represented in FIG. 2, to navigate in the raw representation, see and modify values of the variables for the objects in the dataset.

The interface 200 is provided by means of non-limitative example only, and other interfaces may be used in various embodiments of the invention. The invention is applicable to other interfaces with other kinds of raw representations of values of a dataset.

FIG. 3 displays an example of an automatic generation and display of statistical parameters in a number of embodiments of the invention.

The example of FIG. 3 is based on the exemplary interface 200 of FIG. 2. The example of FIG. 3 applies on the same dataset, objects, variables and values than FIG. 2. Therefore the columns and lines of the raw representation 220 are identical between FIG. 2 and FIG. 3. However the techniques disclosed in FIG. 3 can be adapted to any embodiment and interface of the invention, and can be applied to other datasets.

As discussed above, there may be in dataset errors, incorrect or abnormal values, or more generally normal but unusual ones. In prior art solutions, a user can detect such values by 'manually' inspecting all values of the dataset. However this solution is cumbersome and impossible in practice for large datasets. Another option for the user is to enter formulas that provide statistical parameters (for example the minimum, maximum, number of occurrences of a variable . . . ) and, if one of these indexes is abnormal or unusual, look for the cell comprising the values that generated this abnormal or unusual. However, this solution is also not satisfying, for at least two reasons. It first requires a user to enter correct and adequate formulas, which a lot of users are not used to. In addition, once an abnormal or unusual statistical parameter is identified, the user has to check the values that generated that abnormal or unusual statistical parameter, which is not an obvious task.

In one aspect, the invention advantageously solves this issue by calculating and displaying statistical parameters that depend upon the type of a variable, and, when the user clicks on a statistical parameter, selecting and/or highlighting the corresponding objects and/or values. Therefore, the user is able to intuitively select unusual or abnormal values.

In this example, statistical parameters are calculated and displayed for all variables when the user clicks on a specific button. However this is provided by means of example only, and the invention could be applied to any means of displaying statistical parameters for one or more variable.

As discussed above, upon the reception or load of the dataset, the types of one or more variables are automatically defined based on the values in the dataset.

In this example, the following types are automatically determined for the variables:

Variable "Id": classified as an 'integer' variable, because all values of the column 2401 are integer numbers with less than 10 digits;

Variable "Age": classified as an 'integer' variable, because all values of the column 2402 are integer numbers with less than 10 digits;

Variable "Sexe" and "Redoublement": classified as a 'binary' variable, because they have only two occurrences in the dataset (for example "Oui"/"Non" for "Redoublement");

Variable "NiveauDEtude", "UFR", "MentionBac", "Copier": classified as 'nominal', because it has more than two occurrences, and the values comprise letters.

In order to determine, calculate, and display the statistical values:

the adaptation 143 to determine the synthetic representation types based on said type of variable comprises an adaptation to determine one or more statistical parameters based on said type of variable;

the adaptation 144 to generate the synthetic representation of values comprises an adaptation to calculate one or more statistical parameters for said variable.

In this example, in order to let the user view and select specific values, synthetic representations 3401, 3402, 3403, 3404, 3405, 3406, 3407, 3408 are generated and displayed. These representations are arrays comprising one or more statistical parameters depending on the type of variable. In this example:

For each integer or numeric variable, a synthetic representation displays the minimum, maximum, $1^{st}$ quartile, median, $3^{rd}$ quartile, maximum, average and standard deviation values. It is for example the case of synthetic representations 3401, 3402 for variables "Id" and "Age" respectively;

For each binary, nominal or ordered variables, a synthetic representation displays a list of the modalities of the variable, and the number of occurrences of each modality. It is for example the case of the synthetic representations 3403, 3404, 3405, 3406, 3407, 3408 for the variables "Sexe", "NiveauDEtude", "UFR", "Redoublement", "MentionBac", "Copier" respectively.

These variables are chosen by means of non-limitative example only. In some embodiments of the invention, other statistical variables may be used, provided that they are selected based on the type of variable. For example, a percentage of occurrences of each modality may be used instead of the number of modalities for binary, nominal or ordered variables.

In a number of embodiments of the invention, the variables can take values representative of an undefined or inapplicable value. For example, a "NA" or "N/A" modality can stand for "Not Applicable". In a number of embodiments of the invention, the number of undefined values can be indicated for each variable. For example, it is indicated in 3502 that the variable "Age" has 10 undefined or empty values.

The synthetic representation of statistical variables allows the user to have a quick understanding of the repartition of values among the variables, and detect abnormal or unusual values. For example, the user can detect easily than the maximum value 34021 of the variable "Age" is 41, which is far above the median value 34022, or even the third quarter 34023 of the variable "Age" (respectively 21 and 22).

There is therefore a strong probability than the value "41" is an incorrect input. The user can determine if it is the case using his/her knowledge of the dataset. In this case, the user is aware than the dataset is representative of university students aged around 20. Therefore, the user suspects that the value "41" results from an incorrect input and wishes to replace the "41" by "21".

In order to let the user select and modify values:

the adaptation 146 to receive from said one or more input interfaces the selection by the user of the element of said representation comprises an adaptation to receive from said one or more input interfaces a selection by the user of a statistical parameter;

the adaptation 147 to perform the selection of one or more objects corresponding to said element comprises an adaptation to select said one or more objects based on said statistical parameter and an adaptation to highlight values of said variable for said one or more objects in the raw representation.

In this example, the interface 200 allows this operation by letting the user click on the maximum value 34021. Upon the click, the object whose value of the variable "Age" is 41 is selected and displayed. The user can then modify the value "41" and "21". Similarly, the user may click on the $3^{rd}$ percentile 34023 to select all the user whose value of "Age" is in the $3^{rd}$ percentile, click on the number 34041 of occurrences of the modality "M2" of the variable "NiveauDEtude" to select all the occurrences of this modality, etc. . . . .

According to various embodiments of the invention, the values that the user wishes to select can be selected and/or highlighted. The object for which the variable has the desired value can also be placed in the top lines of the raw representation, in order to be easily identified by the user.

Therefore, the user is able to identify and modify abnormal or unusual values.

FIGS. 4a to 4d display an example of a drawing of a graph representing values of a variable, detection and correction of inconsistent data using an interaction of the user with the graph.

This example provides another option for allowing the user to detect and correct intuitively and easily unusual or abnormal values. In order to provide to the user an even more intuitive experience, the values of variable can be represented in the form of a graph, and the user can select values by clicking on elements of the graph.

Figure 4A:
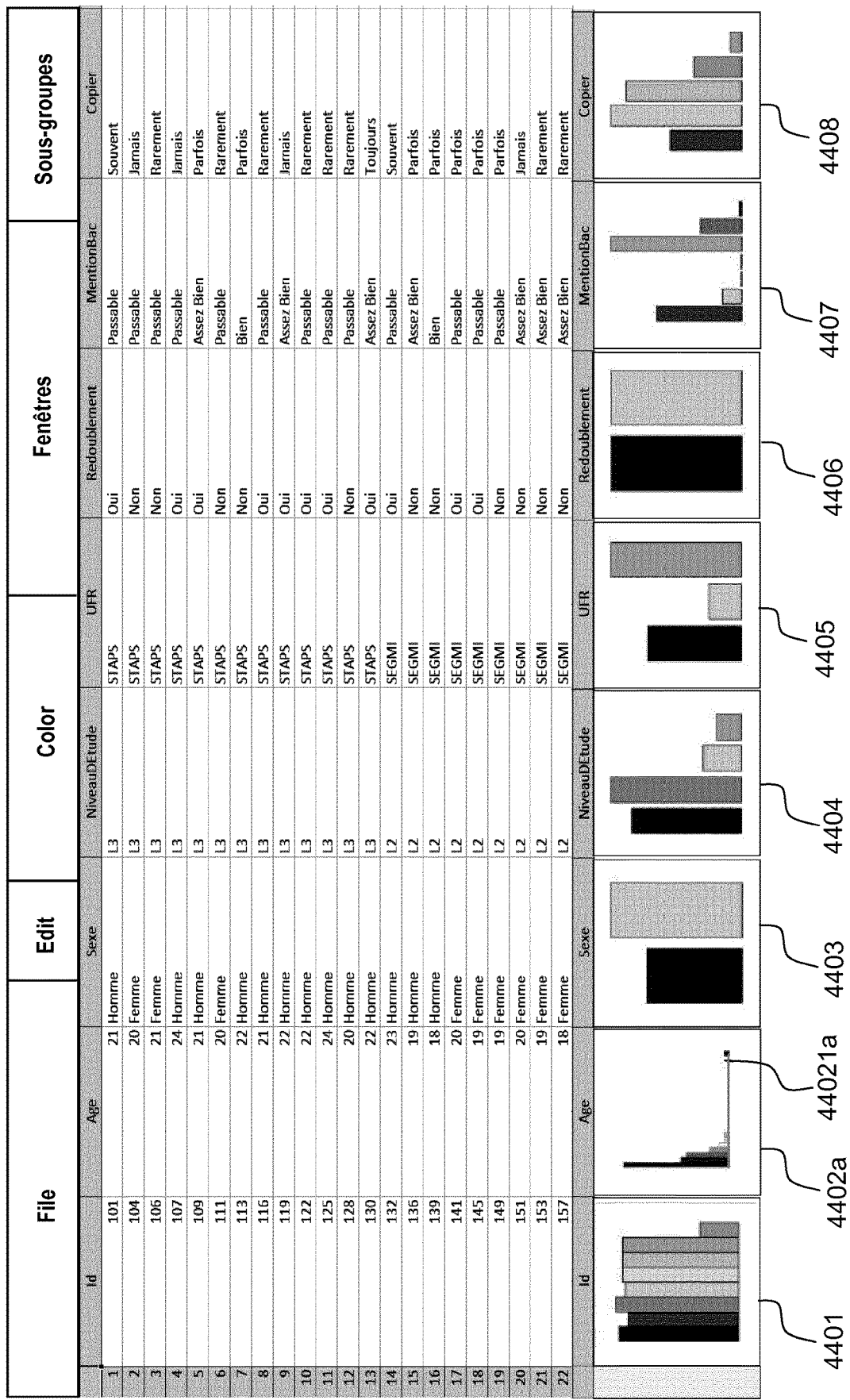
FIGS. 4a to 4d display an example of a drawing of a graph representing values of a variable, detection and correction of inconsistent data using an interaction of the user with the graph.

FIG. 4a displays an example of synthetic representation of values using graphs, which is generated in this example when the user clicks on the fifth button of the "Windows" section 214.

In this example, the synthetic representation type is a graph, wherein each section of the graph represents the number of occurrences of one or more values of the variable for the plurality of objects.

In order to provide the best overview of the values for each variable, different types of graphs can be used, and:

the adaptation 143 to determine the synthetic representation type based on said type of variable comprises an adaptation to determine a type of graph based on the types of variable;

the adaptation 144 to generate the synthetic representation of values comprises an adaptation to calculate a size of each section of the graph.

In this example:

for each integer, numeric variable or ordered variables, a histogram is used. It is for example the case of synthetic representations 4401, 4402a for variables "Id" and "Age" respectively;

for each binary or nominal variable, a bar graph is used. It is for example the case of the synthetic representations 4403, 4404, 4405, 4406, 4407, 4408 for the variables "Sexe", "NiveauDEtude", "UFR", "Redoublement", MentionBac", "Copier" respectively.

These types of graphs are chosen by means of example only. In some embodiments of the invention, other types of graphs may be used, provided that they are selected based on the type of variable. For example, a circle graph may be used instead of a bar graph for binary, nominal or ordered variables. It shall be noted that graphs that simply indicate a number of occurrences, such as bar or circle graphs, may be used for variables that do not trigger any kind of order between the values, for example binary or nominal variables, while histograms may be used for variables that imply an order in the values of variables, such as integer, numeric or ordered variables. Indeed, the sizes of the bars of the graphs are representative of the number of occurrences of values, or the number of occurrences of values within a range. In the cases of histogram, the positions of the bars are in addition representative of the value themselves.

The graphical representation of statistical variables advantageously allows the user to have a quick understanding of the repartition of values among the variables, and detect abnormal or unusual values. The exemplary dataset of FIGS. 4a to 4d is identical to the exemplary dataset of FIG. 3. In this case, the abnormal value "41" of the variable "Age" can be immediately identified by the small and isolated bar 44021a.

Figure 4B:
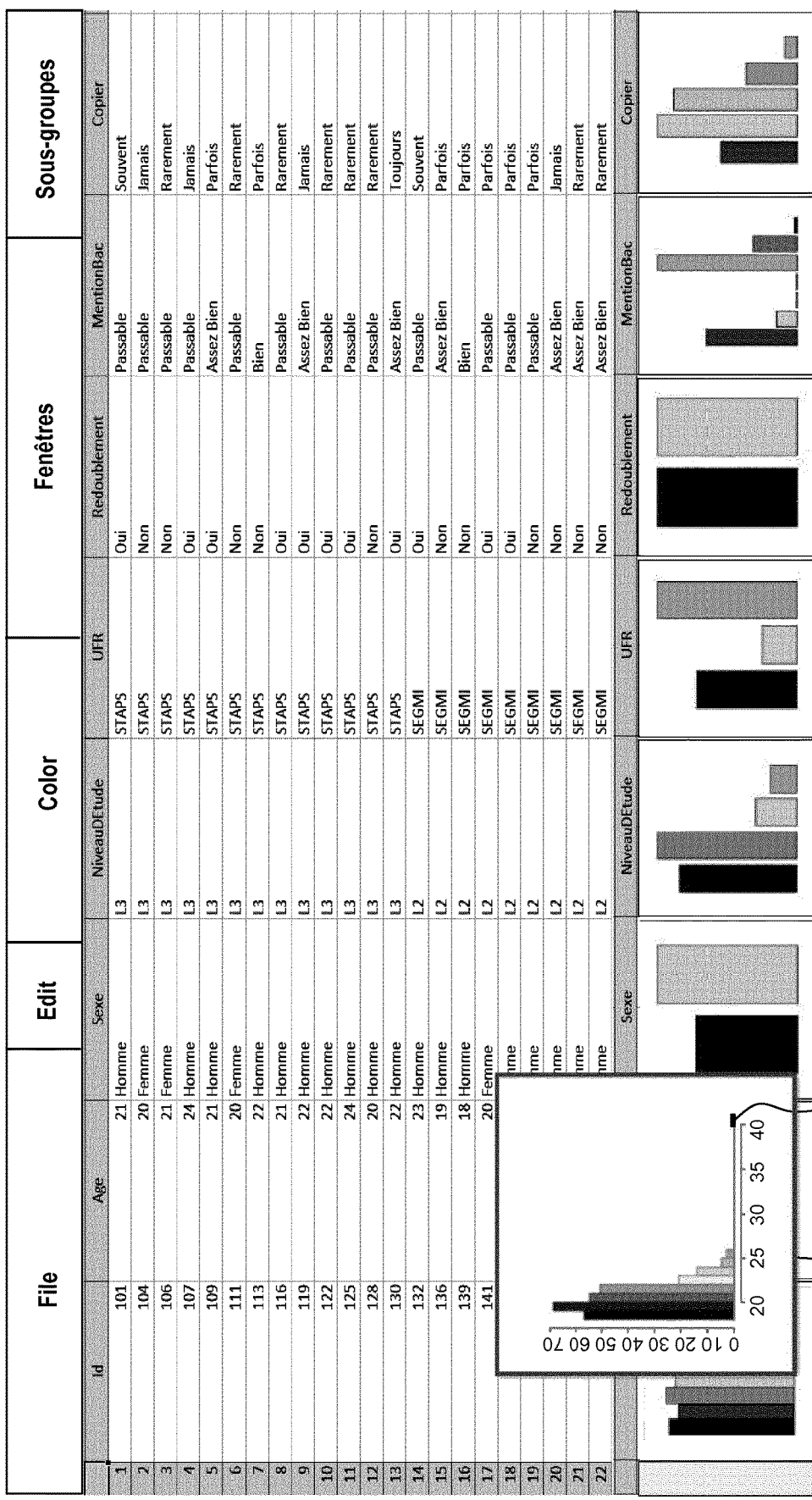

As shown in FIG. 4b, the user can click on the graph in order to enlarge it: the graph 4402b is an enlarged version of the graph 4402a, and further enhances the isolation of bar 44021b corresponding to the value "41" of the variable "Age".

There is therefore a strong probability than the value "41" is an incorrect input. The user can determine if it is the case using his/her knowledge of the dataset. In this case, the user is aware than the dataset is representative of "university student aged around 20". Therefore, the user suspects that the value "41" results from an incorrect input and may wish to replace the value "41" by "21".

In order to let the user select and modify values:
the adaptation 146 to receive from said one or more input interfaces a selection by the user of an element of said representation comprises an adaptation to receive from said one or more input interfaces a selection by the user of a section of the graph;
the adaptation 147 to perform a selection of one or more objects corresponding to said element comprises an adaptation to select said one or more objects whose value of the variable is represented by the section selected by the user.

Figure 4C:
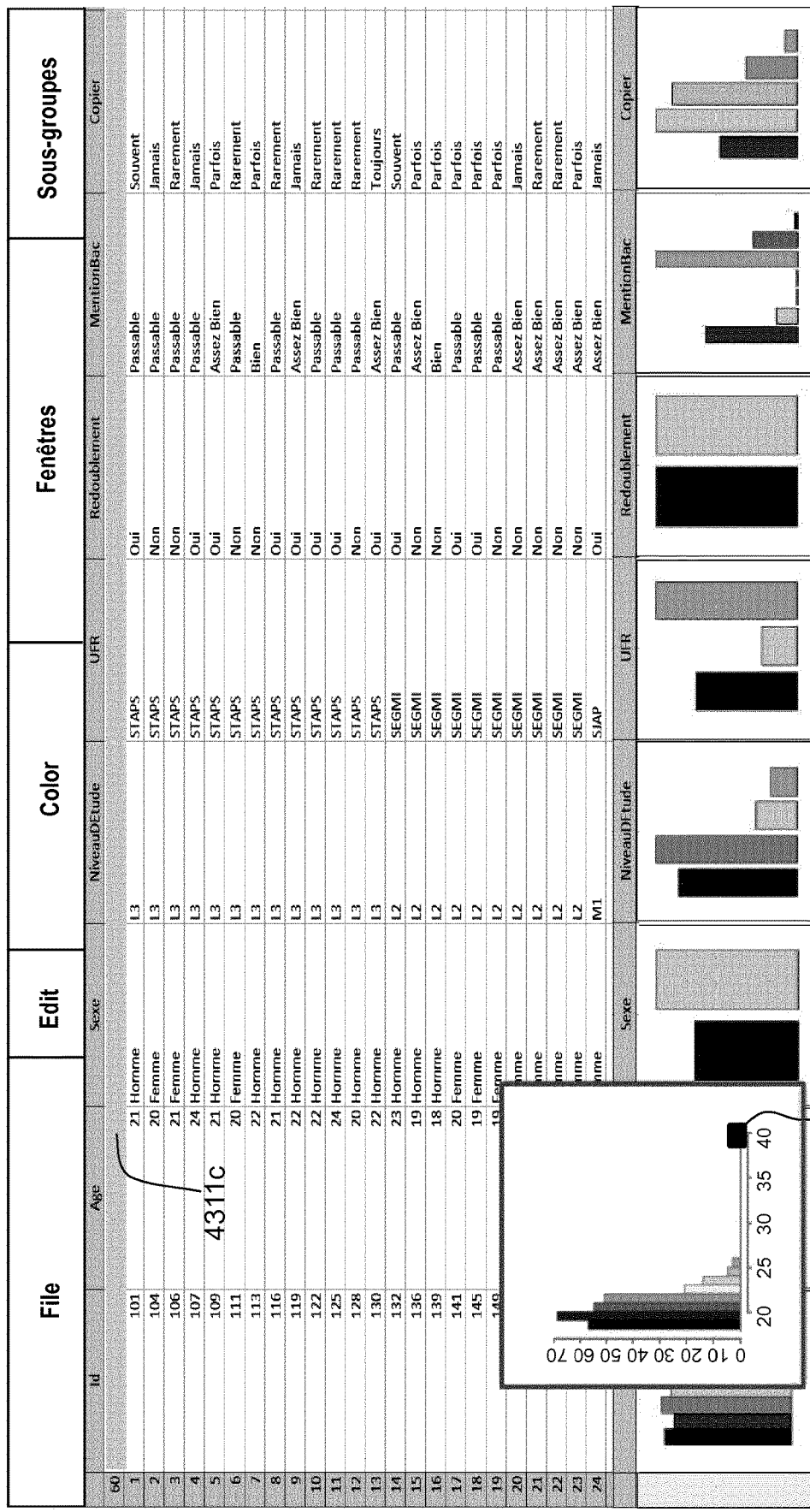

As shown in FIG. 4c, in this example, the interface 200 allows this operation by letting the user click on the isolated bar 44021c. Upon the click, the student whose value of the variable "Age" is 41 is selected and displayed: the corresponding line 431 is displaced on top of the raw representation, and highlighted. The abnormal value "41" is thus immediately apparent 4311c.

Figure 4D:
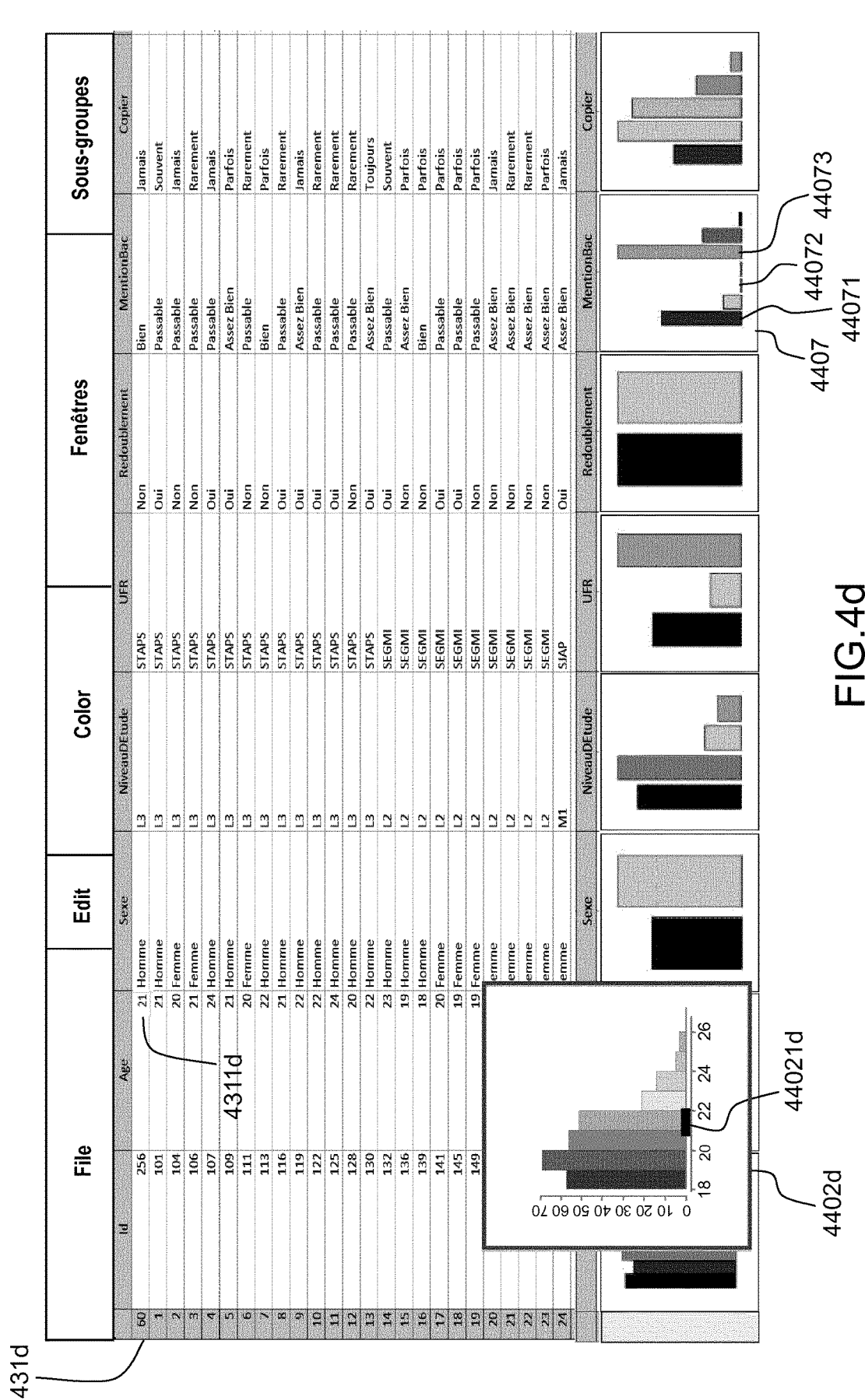

As shown in FIG. 4d, the user can modify the value "41" and replace it by the value "21" 4311d, by simply clicking on the value and entering the new value. Upon the modification of the value, the graph 4402d is immediately updated, while the modified value remains highlighted 44021d. The user can thus ensure that the value that he/she entered is a correct one, and that no other abnormal values are present.

It shall be noted that, while in this example the user selects and modifies a single value, in cases where an element of a graph represents a plurality of values, the user can select and modify the plurality of values in the same time by clicking on the element of the graph, and entering a new value.

Therefore, the user is able to easily and intuitively identify and modify abnormal or unusual values.

Such graph representations also allow the user to detect values which are placed in a wrong order. It is for example the case upon inspection of the graph 4407, as shown in FIG. 4d: the order of the sizes of the bars of the graph seems random, with for example a high bar 44071, then smaller bars 44072, then a yet higher bar 44073. This graph is not coherent with the signification of the variable "MentionBac". Indeed, the variable "MentionBac" represents appreciations obtained by the student in their "baccalaureate" exams. Therefore, the sizes of the bar should roughly decrease from the middle to the sides of the graph, as the probability of obtaining a very high or very low appreciation is lower than the probability of obtaining an average appreciation. The invention also allows a correction of this issue, as will be explained with reference hereinafter. Therefore, a simple overview of the graphs allows the user to intuitively detect and correct incoherent or abnormal values.

FIGS. 5a to 5h display an example of association and modification of modalities of a variable in a number of embodiments of the invention.

One issue arising with datasets created from a large number of sources (for example datasets created by polling a large number of individuals) is that some inputs may be erroneous inputs, or use several different words for designating the same value of a variable.

Figure 5A:
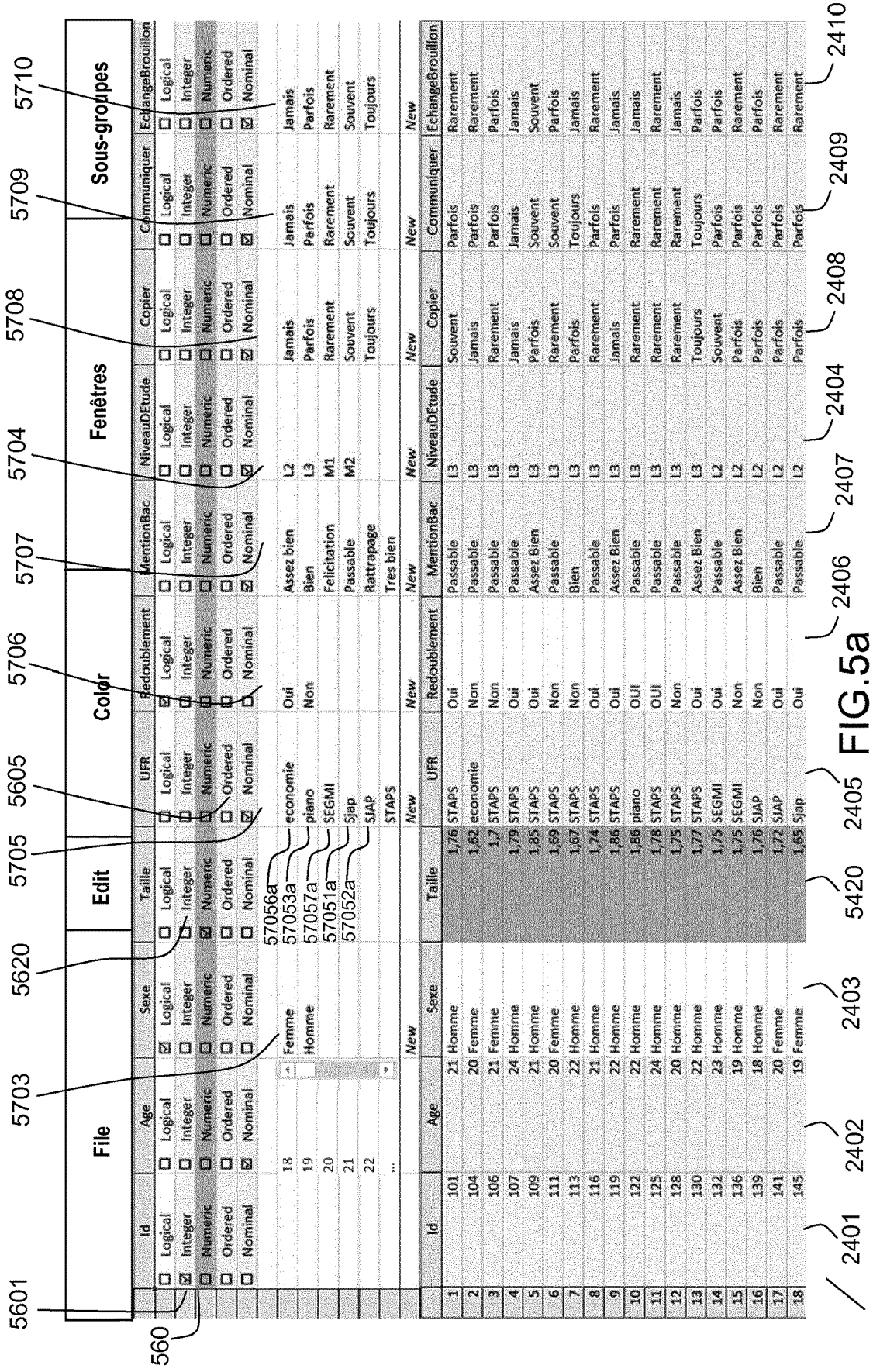

FIG. 5a displays an example of synthetic representation allowing a detection by the user of such inconsistencies within the dataset.

FIG. 5a also displays the interface 200 for managing the dataset displayed in FIGS. 2 and 3: the variables "Id", "Age", "Sexe", "UFR", "Redoublement", "MentionBac", "Copier", "Communiquer", "EchangeBrouillon" are respectively displayed in columns 2401, 2402, 2403, 2405, 2406, 2407, 2408, 2409 and 2410. The variable "NiveauDetude" is still represented in column 2404, but the column has been displaced between the columns 2407 and 2408.

A variable "Taille" (French for "Height") has been added in column 5420, that represent the values of the heights of the users, in meters. The variable "Taille" is classified as a numeric variable, because all values belonging to this variable are non-integer numbers.

In this example, when the user clicks on the third button of the "Windosw" section 214, the interface 200 displays 560 the type of each variable. For example, it displays 5601 that the variable "Id" is an integer variable, it displays 5620 that the variable "Taille" is a numeric variable and it displays 5605 that the variable "UFR" is a nominal variable.

In addition, the interface 200 displays synthetic representations for each categorical variable. In this example, the synthetic representation type is a list of modalities of the variable, if the variable is a categorical variable (for example, a nominal, ordered or binary variable). In this example, the variable "Age" is considered as a nominal variable, because at least one student used letters to enter his/her age. Methods to correct such input error will be presented hereinafter.

An integer or numeric variable can take a large number of different values. Displaying the values of numeric or integer variable would thus lead to reduce the clarity of the presentation of the modalities of the variables to the user. In order to let the user have a clear overview of the modalities of variable, the modalities should be represented only for categorical variables, and:
the adaptation 143 to determine the synthetic representation type based on said type of variable comprises an adaptation to determine if the variable is a categorical variable;

the adaptation 144 to generate the synthetic representation of values comprises an adaptation to represent, if the variable is a categorical variable, modalities of the variable among the plurality of objects.

In this example, the interface thus displays lists of modalities 5703, 5705, 5706, 5707, 5704, 5708, 5709 and 5710 for the variables "Sexe", "UFR", "Redoublement", "MentionBac", "NiveauDEtude", "Copier", "Communiquer", and "EchangeBrouillon" respectively. Meanwhile, no list of values is displayed for variables "Id", "Age" and "Taille", which are integer or numeric variables.

In this example, the occurrences of the variable are represented in alphabetical order. This allows the user to quickly identify variables that have been entered using separate words for the same notion. For example, the user can identify easily that the variable "UFR" has a modality "Sjap" 57051a and a modality "SJAP" 57052a, and that these modalities should associated. The user can also identify easily incorrect inputs such as the modality "piano" 57053a, which does not correspond to any faculty. The modality "economie" 57056a (French word for economics) also does not correspond to a name of a faculty, but should be associated to the modality "SEGMI" 57057a (as discussed before, the "SEGMI" is the faculty of economics).

The user may thus wish to remove the value 57053a that does not correspond to a possible modality, and associate the values 57051a and 57052a that should correspond to the same modality.

In order to do so:
the adaptation 146 to receive from said one or more input interfaces a selection by the user of an element of said representation comprises an adaptation to receive from said one or more input interfaces an association between a first and a second modality of the variable;
the adaptation 147 to perform a selection of one or more objects corresponding to said element comprises an adaptation to select one or more objects having the first modality as value of the variable, and assign the second modality as value of the variable for said one or more objects.

As shown in FIGS. 5b and 5c, the user can select the modality "piano" 57053b, then provide an instruction to delete this modality. The information to delete the modality can be provided for example by clicking on a specific button (for example the button 'suppr' or 'delete'). Every suitable option is possible to indicate that the modality should be deleted. Once the instruction to delete the modality is received, the corresponding occurrences (in this case, the unique occurrence) are highlighted 57053c.

In this example, when changes of the values are to be performed, a validation button 57054 and a cancel button 57055 appear. Then changes are not performed until the user clicks on the validation button 57054. At any moment, the user can click on the cancel button 57055 to cancel the changes of values.

Figure 5E:
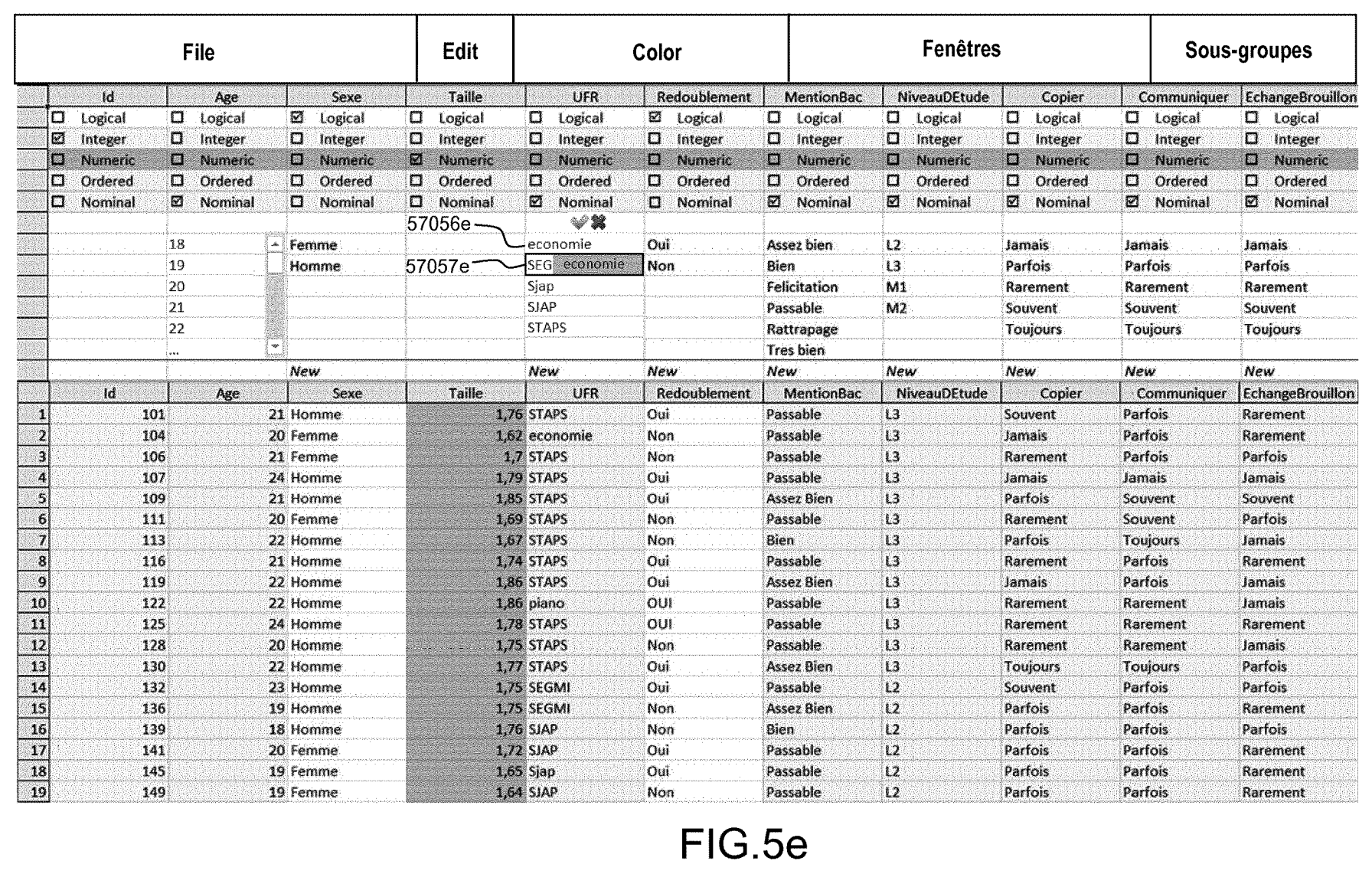
Figure 5F:
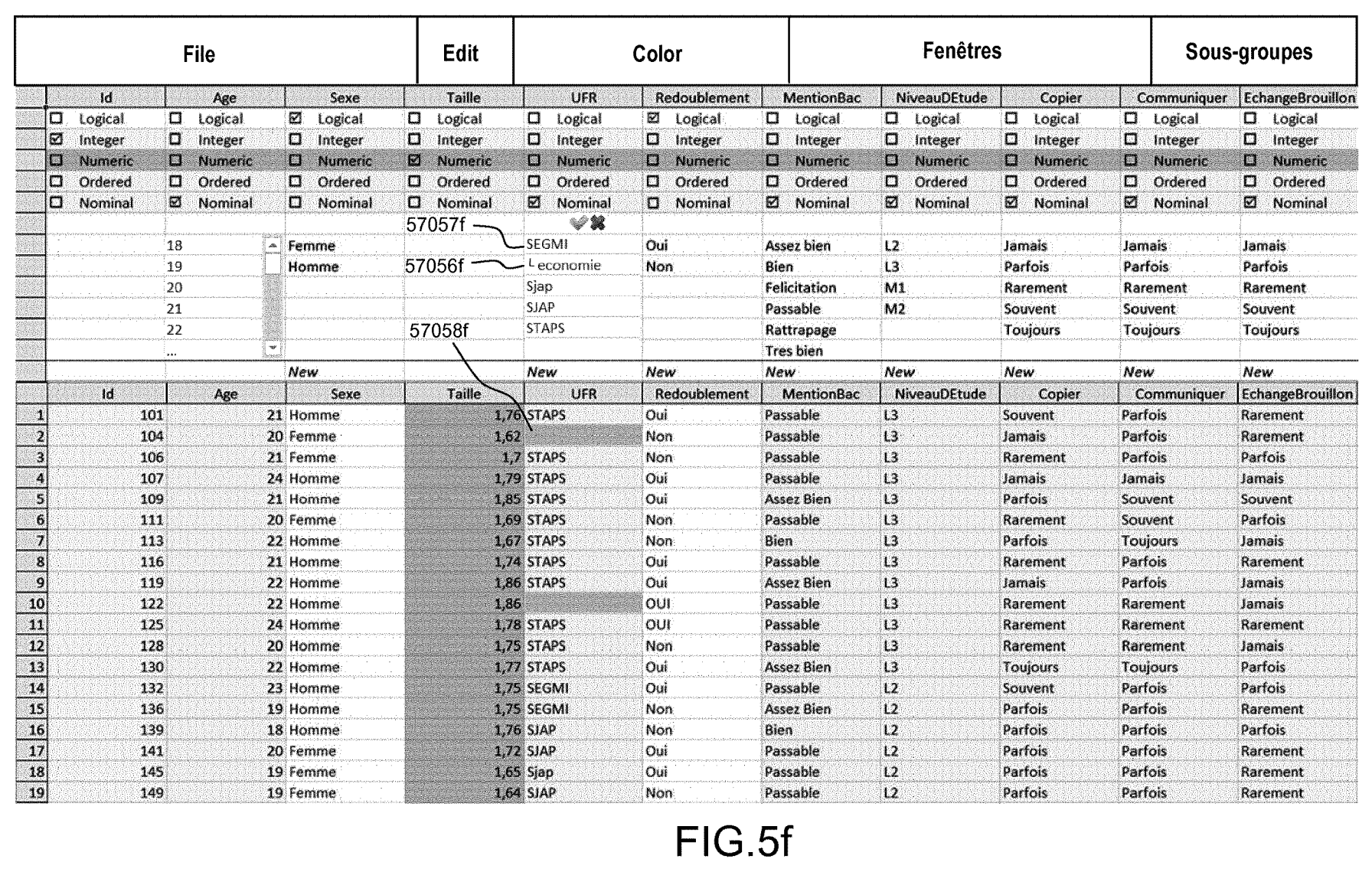

FIGS. 5d, 5e and 5f display the association by the user of the modality "economie" to the modality "SEGMI". The user drags and drops the word "economie" to the word "SEGMI" 57056d, 57056e, 57056f. When the word "economie" is placed on the cell "SEGMI", the cell "SEGMI" is highlighted 57057e. When the modalities are successfully associated, the modality "economy" 57056f is placed under "SEGMI" 57057f. The occurrences 57058f of the modality "economy" are highlighted, in order to indicate the values which are subject to change upon the validation of the user.

The FIG. 5g displays the results of the same operation, to associate the modality "Sjap" 57051g with the modality "SJAP" 57052g. The occurrences 57059g of the modality "Sjap" to be modified are highlighted in addition to the occurrences of the modality "piano" and the occurrences of the modality "economie" that were previously highlighted. The user then clicks on the validation button 57054.

Figure 5H:
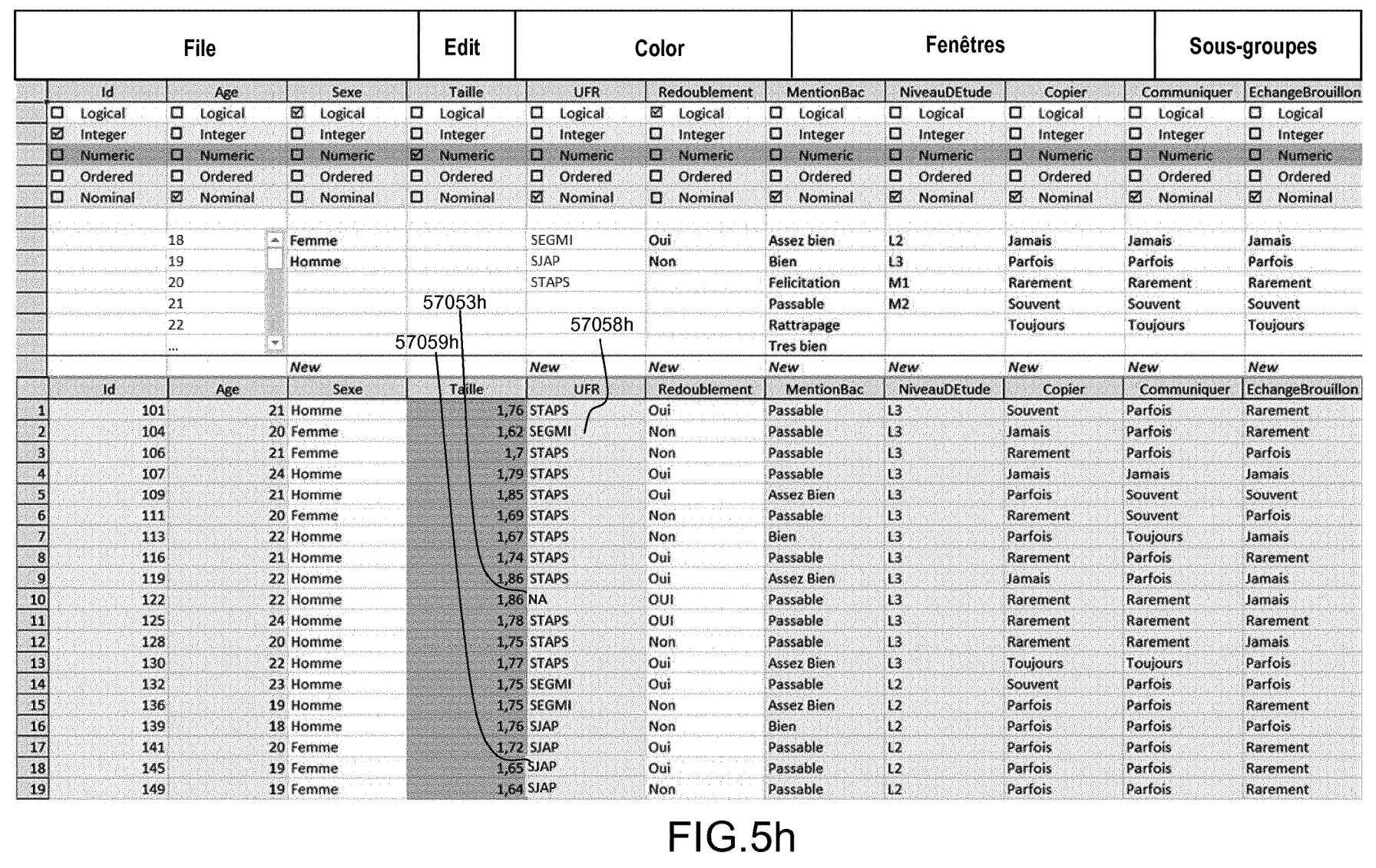

The FIG. 5h displays the interface 200 once the user has clicked on the validation button 57054. The modalities "piano", "Sjap" and "economics" have been successfully deleted. The occurrence of the modality "piano" has been replaced by a "NA" value 57053h indicating an empty value; the occurrences of the "economie" modality has been replaced by occurrences of the "SEGMI" modality 57058h; the occurrence of the "Sjap" modality has been replaced by occurrences of the "SJAP" modality 57059h.

This example demonstrates the ability of the invention to remove incorrect values and associate values of variables that have the same meaning. This interface present the advantages to be very intuitive and convenient to use for the user. The modifications performed by the user apply optimally automatically to all values of a variable. This advantageously allows a removal of inconsistent values from the dataset, which improves the statistics and graphics that can be built on the dataset afterwards.

FIGS. 6a to 6g display a first example of modification of a type of variable in a number of embodiments of the invention.

In certain cases of error inputs, an incorrect type could be associated to a variable. This is for example the case if a variable should be binary, and the inputs provided by a large number of individuals define at least three values for the variable. The variable can then be automatically detected as a nominal variable instead of a logical one.

Figure 6A:
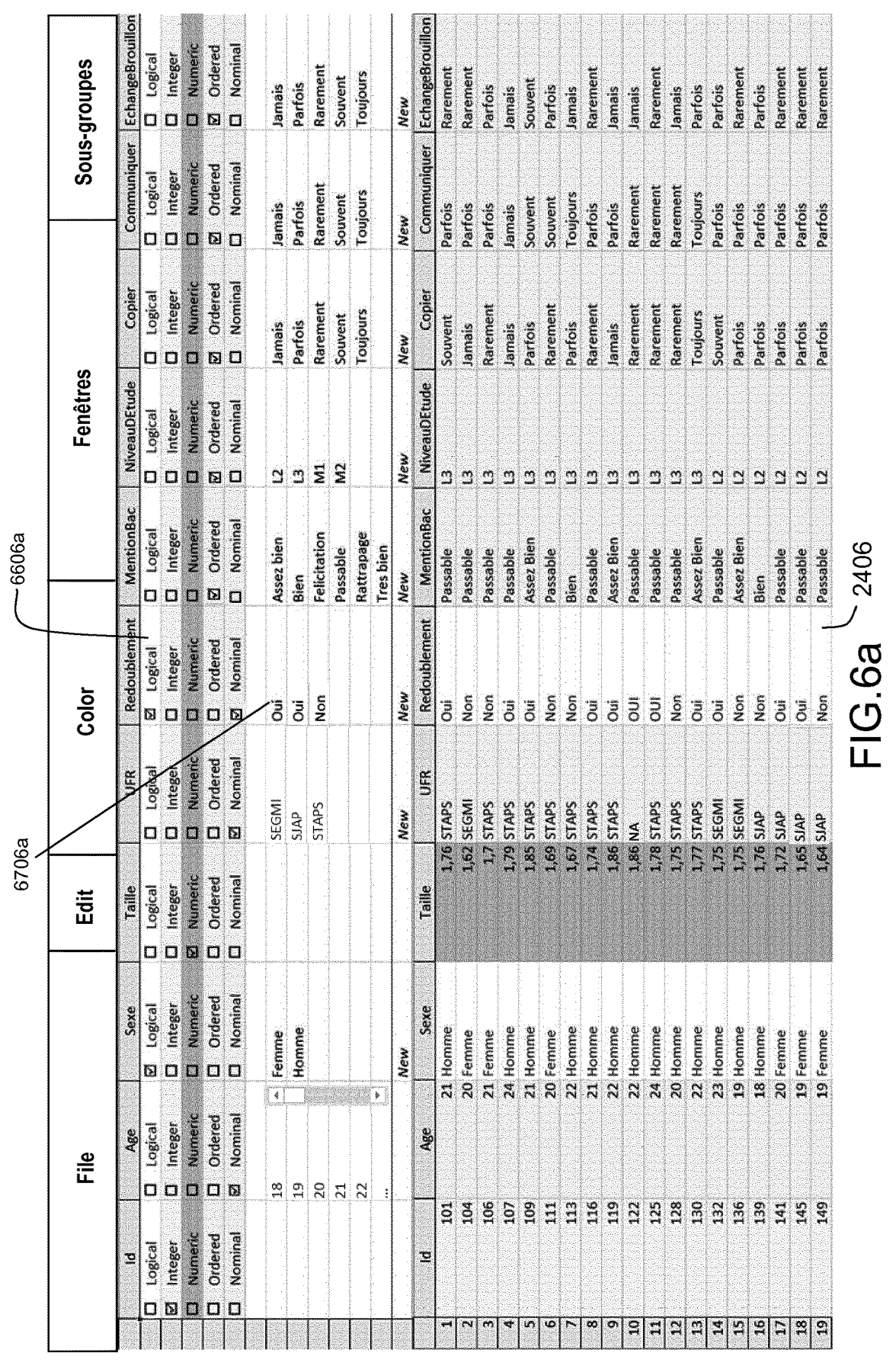

FIG. 6a displays an example of synthetic representation allowing a detection by the user of an incorrect detection of a type of a variable.

FIG. 6a also displays the interface 200 for managing the same dataset displayed than in FIGS. 5a to 5h.

In this example, the synthetic representations for each variable are lists of the variable types indicating to which type belong the variables, and, for categorical variables (i.e binary, nominal or ordered variables), a list of occurrences.

The integer or numeric variable can take a large number of different values. Displaying the values of numeric or integer variable would thus lead to reduce the clarity of the presentation of the modalities of the variables to the user In order to let the user have a clear overview of the modalities of variable, the modalities should be represented only for categorical variable, and:
the adaptation 143 to determine the synthetic representation type based on said type of variable comprises an adaptation to determine if the variable is a categorical variable;
the adaptation 144 to generate the synthetic representation of values comprises an adaptation to represent a list of variable types and, if the variable is a categorical variable, modalities of the variable among the plurality of objects.

In this example, it thus displays lists of modalities for the variables "Sexe", "Age", "UFR", "Redoublement", "Mention Bac", "NiveauDEtude", "Copier", "Communiquer" and "EchangeBrouillon" respectively. Meanwhile, no list of values is displayed for variables "Id", and "Taille", which are integer or numeric variables. On the other hand, the type of variable is represented for all variables. It shall be noted that the variable "Age" is interpreted as a nominal variable in this example, as it should be interpreted as integer. This issue will be explained in more details with reference to FIGS. 7*a* to 7*h*.

The column 2406 represents the values of the variable "Redoublement". The synthetic representation for the variable "Redoublement" is formed of a list of variable types 6606*a* indicating that the variable "Redoublement" is a Nominal variable, and a list of occurrences 6706*a* indicating that the variable "Redoublement" has three modalities: "Oui", "OUI" and "Non".

As explained above, the variable "Redoublement" indicates if students repeated a school year at least once. It therefore should be a binary variable with two modalities "Oui" (French for "Yes") and "Non" (French for "No"). In this example, some student entered "OUI" (French for "YES") using only capital letters. The synthetic representation using the lists 6606*a* and 6706*a* allows the user to detect intuitively and efficiently the issue with the variable "Redoublement".

The user may thus wish to associate the "OUI" and "Oui" modalities within a single one, in order for the variable "Redoublement" to be correctly interpreted as a binary variable.

In order to do so:
- the adaptation 146 to receive from said one or more input interfaces a selection by the user of an element of said representation comprises an adaptation to receive from said one or more input a selection by the user of a desired type of the variable, which is different from said type of variable;
- the adaptation 147 to perform a selection of one or more objects corresponding to said element comprises:
  - an adaptation to identify and output to said display modalities of the variable that do not match the desired type of the variable;
  - an adaptation to receive from said one or more input interfaces a selection of a modality of the variable that do not match the desired type of the variable, and a replacement modality to replace said modality;
  - an adaptation to select one or more objects whose value of the variable is said modality that do not match the desired type of the variable, and replace said modality that do not match the desired type of the variable by said replacement modality for said one or more objects.

Figure 6B:
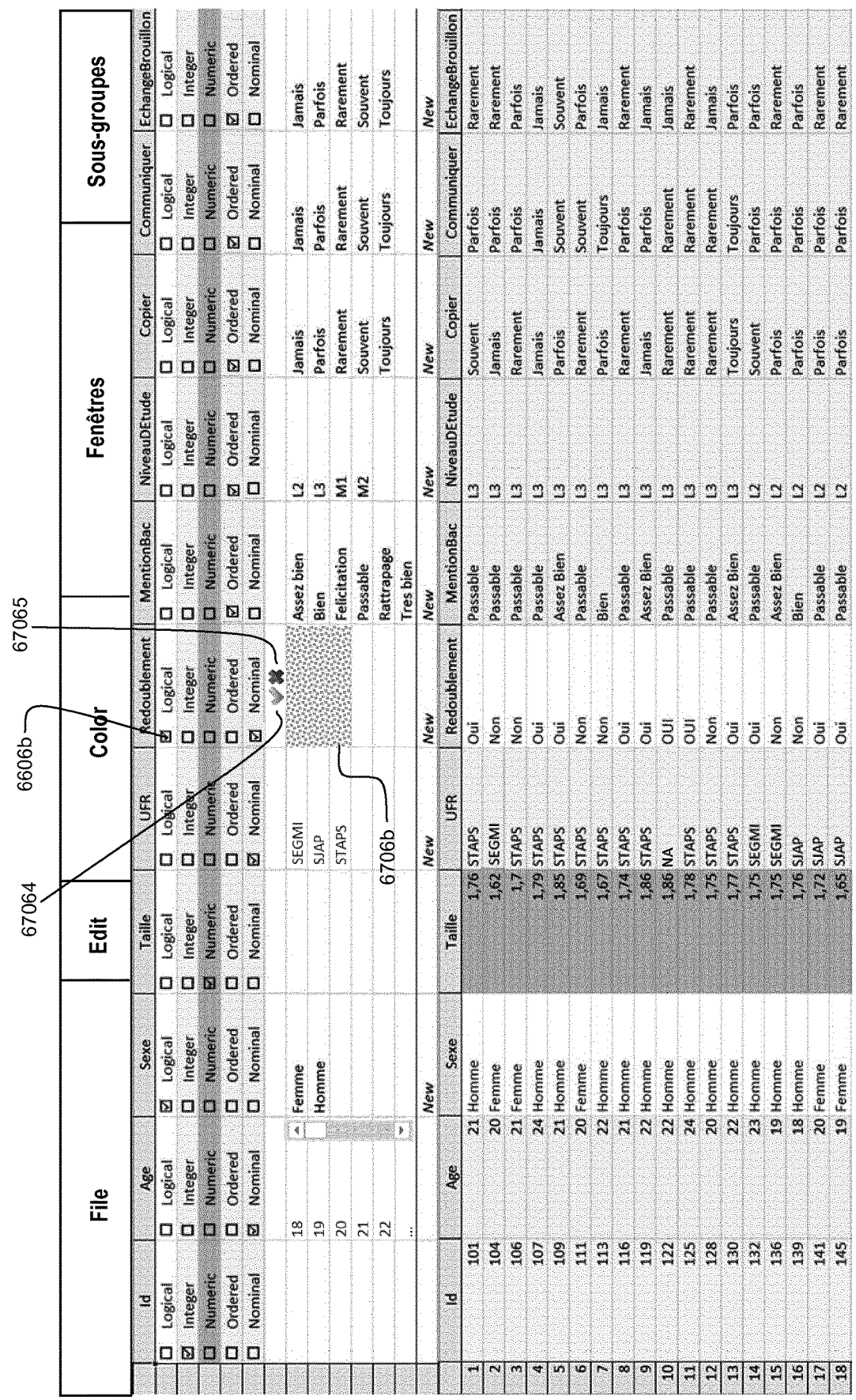
Figure 6E:
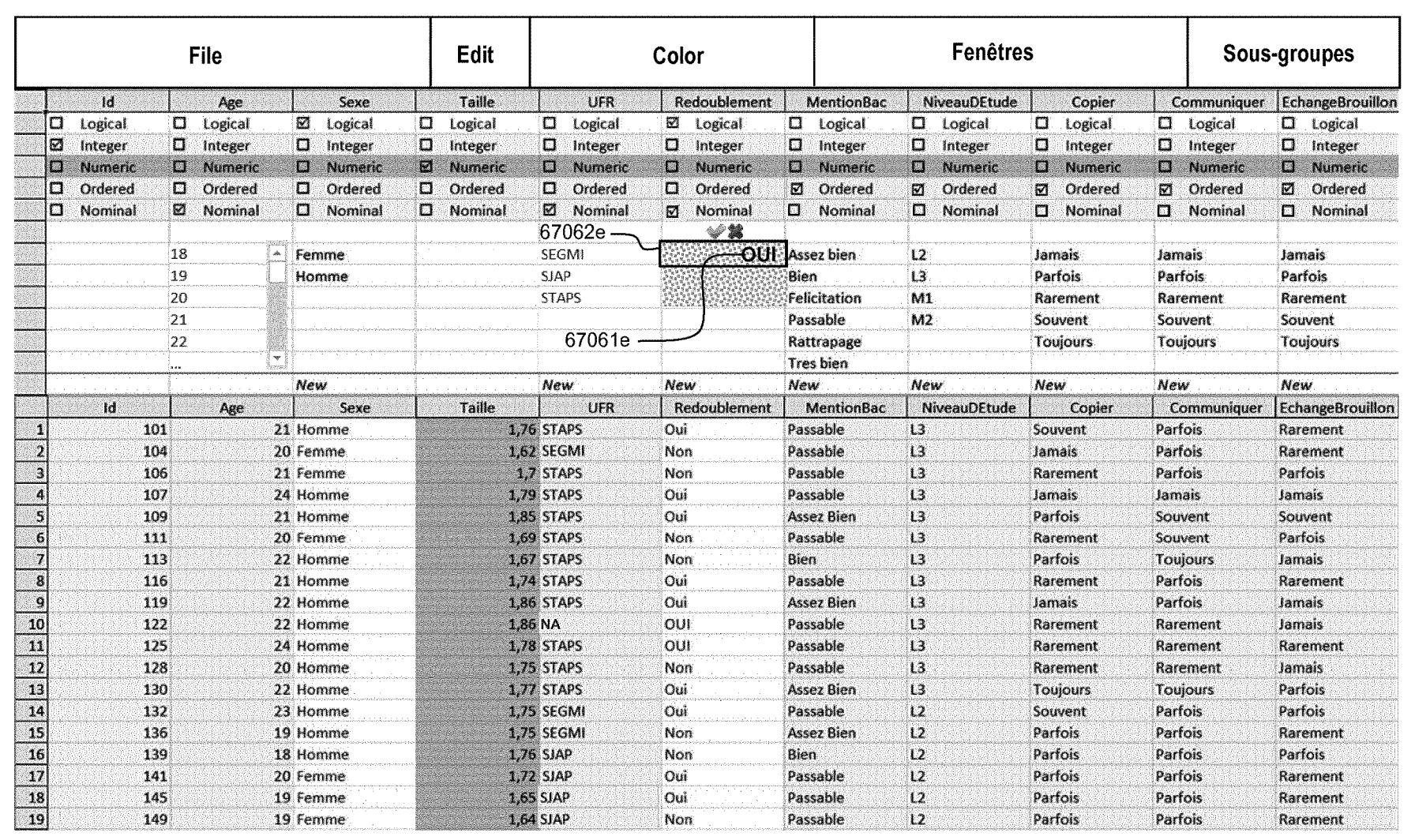
Figure 7A:
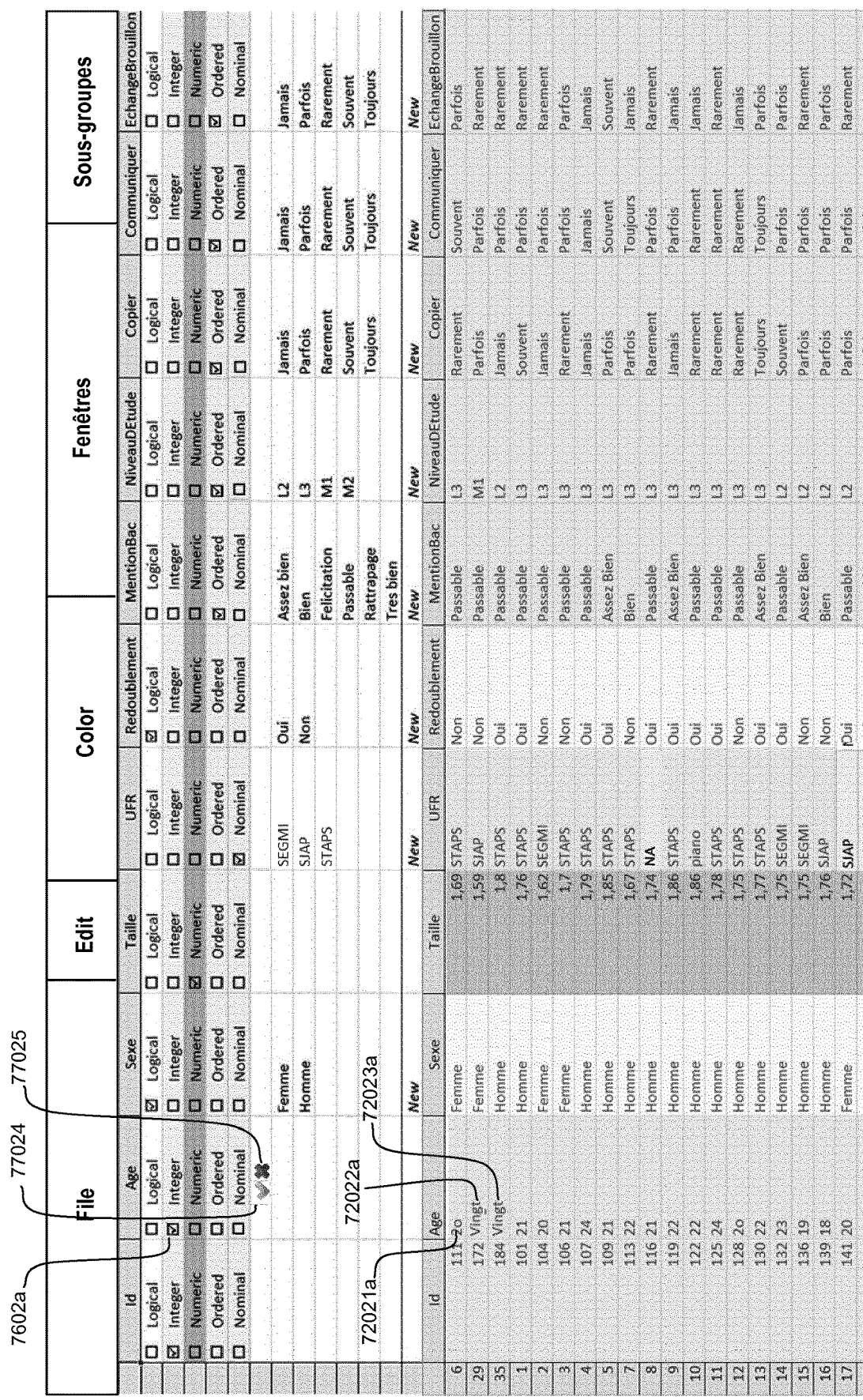

As shown in FIG. 6*b*, the user can click on "logical" 6606*b* in order to indicate that the variable "Redoublement" should be a logical one. It is impossible to set the type of the variable "Redoublement" in a logical type initially, because the values have three different modalities, while a logical variable should have only two. The list of modalities is thus highlighted 6706*b*. A validation button 67064 and a cancel button 67065 also appear. At this time, the validation button 67064 is marked in red in order to indicate that it is not yet possible to validate the change of the variable type, because there are still more than two modalities of the variable "Redoublement".

As shown in FIGS. 6*c*, 6*d*, 6*e* and 6*f*, the user drags and drops in the list the modality "OUI" 67061*c*, 67061*d*, 67061*e* to the modality "Oui" 67062*e*. When the drag and drop is complete, the modality "OUI" 67061*f* is placed under the modality "Oui" 67062*f*. The occurrences of the modality "OUI", which may be modified, are highlighted 62061*f*, 62062*f*. The validation button 67064 is not highlighted anymore, and the user can click on it to validate the modification.

Figure 6G:
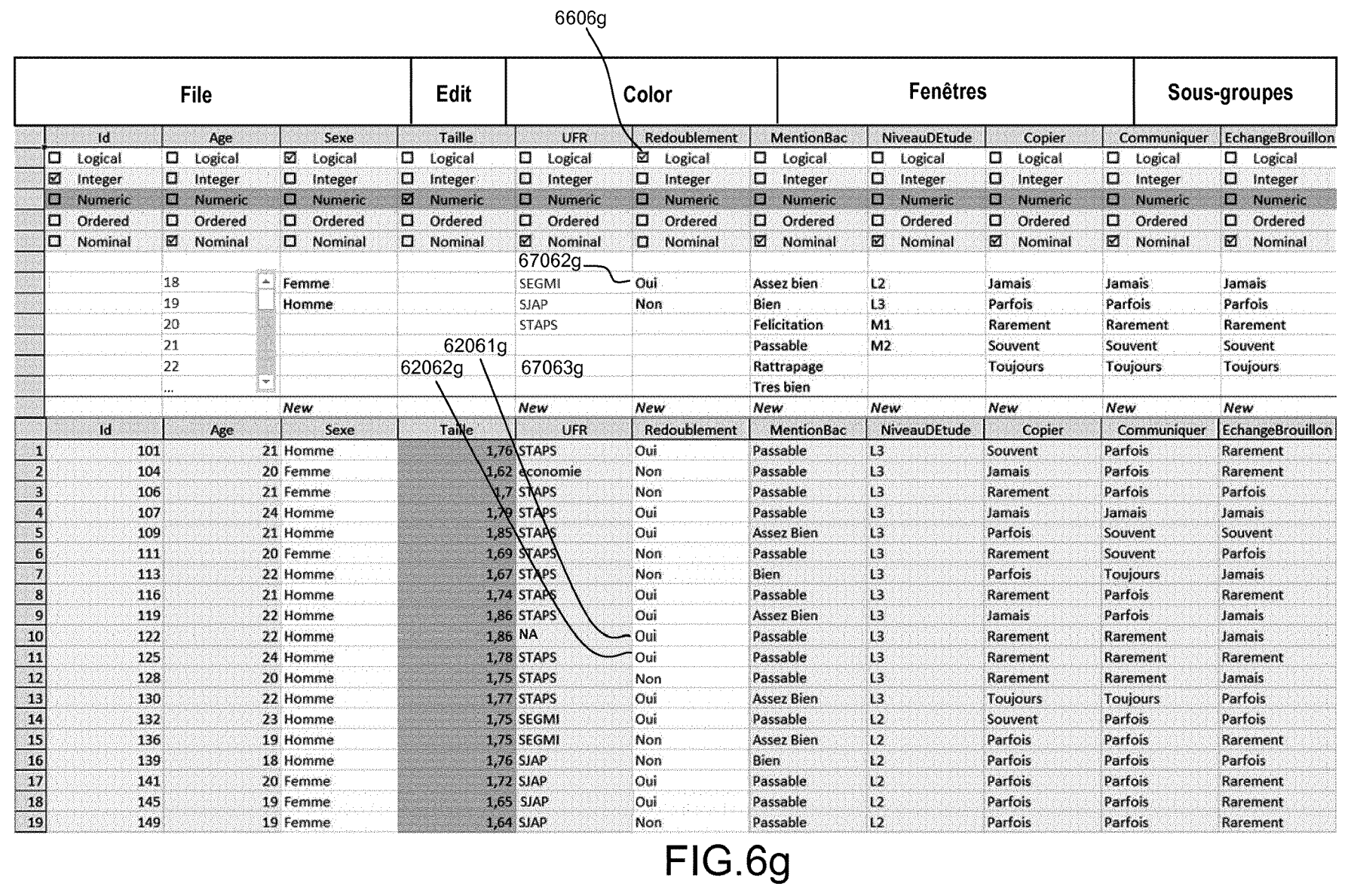

The FIG. 6*g* displays the interface when the user clicks on the button 67064 to validate the changes. The type of the variable "Redoublement" is set as "Logical" with two modalities "Oui" 67062*g* and "Non" 67063*g*. The previous occurrences of the value "OUI" have been modified in "Oui" 67061*g*, 67062*g*.

In a number of embodiments of the invention, upon the modification of a type of a variable, all values of the variable are modified in the memory of a device of the invention, in order to be casted to a type adapted to the new type of the variable. In this example, all values of the variable "Redoublement" are initially stored in the form of strings of characters. Upon modification of the type of variable to a binary variable, all the values can be casted in memory to a more adapted type, for example to a Boolean type. This allows savings of memory space, and a more efficient performance of operations on the values of the variable.

This example demonstrates the ability of the invention to let the user correct an incorrect typing due to inconsistent inputs. The modifications performed by the user can optionally automatically apply to all values of a variable. This advantageously allows a removal of inconsistent values from the dataset, which improves the statistics and graphics that can be built on the dataset afterwards.

FIGS. 7*a* to 7*g* display a second example of modification of a type of variable in a number of embodiments of the invention.

Another case of input error arises when some values of a numeric or integer variable are entered using letters. It is for example the case of the variable "Age" is detected as a nominal instead of an integer variable because some values have been entered using letters: three students aged 20 have entered "2O" (with a capital letter O instead of a zero) or "Vingt" ("Twenty" in French) instead of "20". Therefore the variable is detected as being a nominal one.

As depicted in FIG. 6*a*, the user can click on "integer" 7602*a* to indicate that the variable "Age" should be an integer one. When he/she does so, a validation button 77024, and a cancel button 77025 appear, in order to validate or cancel the modification. The button 77024 is initially highlighted in red, in order to indicate that it is not possible to validate the modification, because the values of the variable "Age" are not all integer values yet.

Meanwhile, lines corresponding to objects whose values of the "Age" variable are not compatible with an integer variable are displaced on top of the raw representation 720 and these value highlighted: the value "2O" 72021*a*, and the values "Vingt" 72022*a*, 72023*a*. Therefore, the user can identify easily the values that made the variable "Age" typed as a nominal variable instead of an integer variable.

Figure 7B:
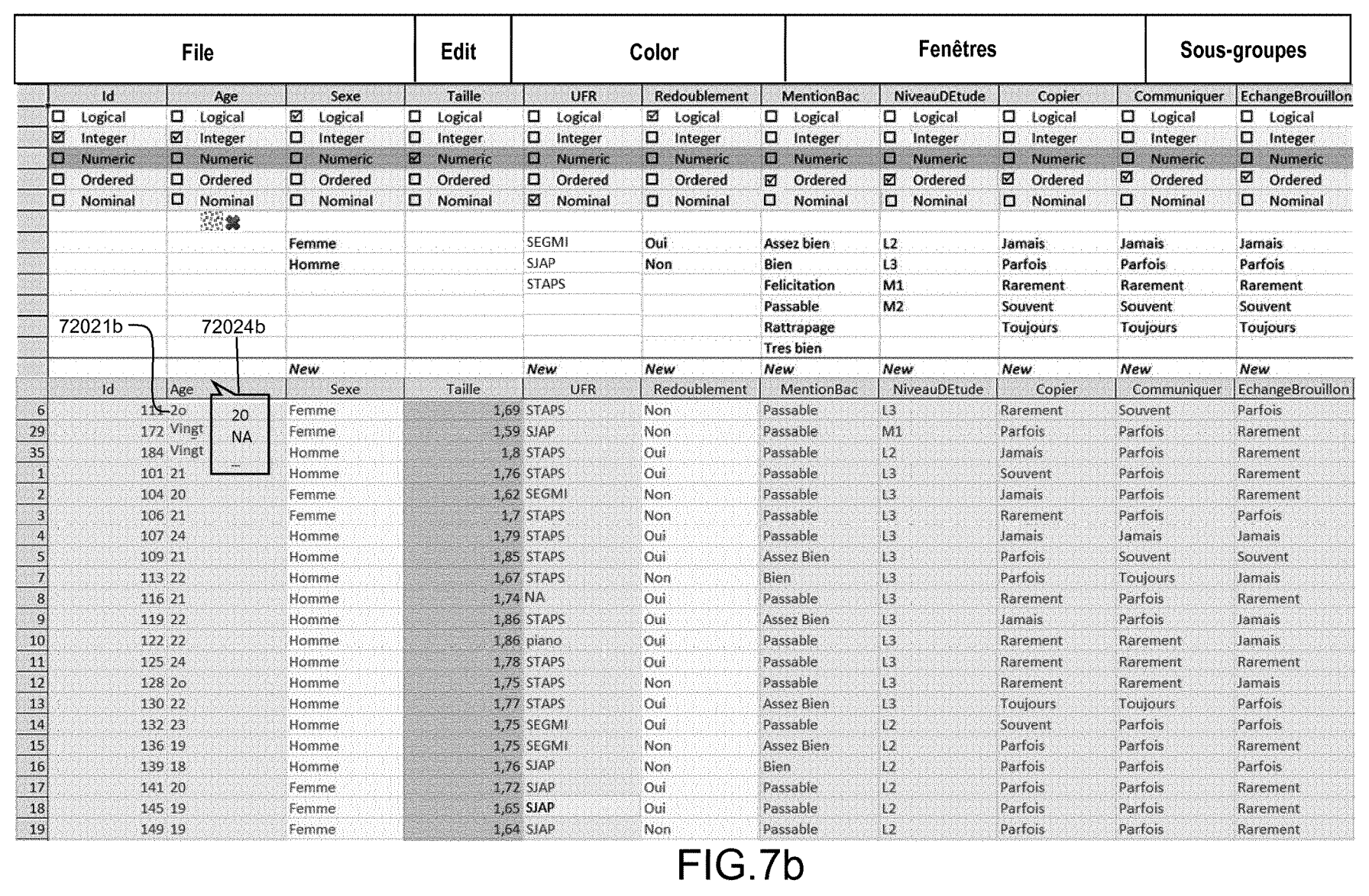

As displayed in FIG. 7*b*, when the user clicks on one of the highlighted values, a pop-up appears to let the user modify the value. For example, the user clicks on the value "2O" 72021*b*. A pop-up 72024*b* is displayed. The pop-up allows the user to choose between propositions of corrections, or manually entering a correction. In this case, a first proposition of correction is "NA" to indicate an empty value. A second proposition is "20". Indeed, the value "20" has been detected as a possible correction of the value "2O", since "0" is a digit whose shape is similar to the capital letter "O". The user clicks on "20".

As shown in FIG. 7*c*, upon the click on "20", the value "2O" is highlighted and/or put in a different color 72021*c* in order to indicate that this value is to be modified upon validation of the changes and is not highlighted anymore as an incorrect value.

As shown in FIG. 7d, the user can click on the value "Vingt" 72022d, and a pop-up 72024d appears with possible corrections. In this case, the user can choose between the empty "NA" value, and manually entering a new value. As shown in FIG. 7e, the user manually enters the value "20" 72024e.

Figure 7F:
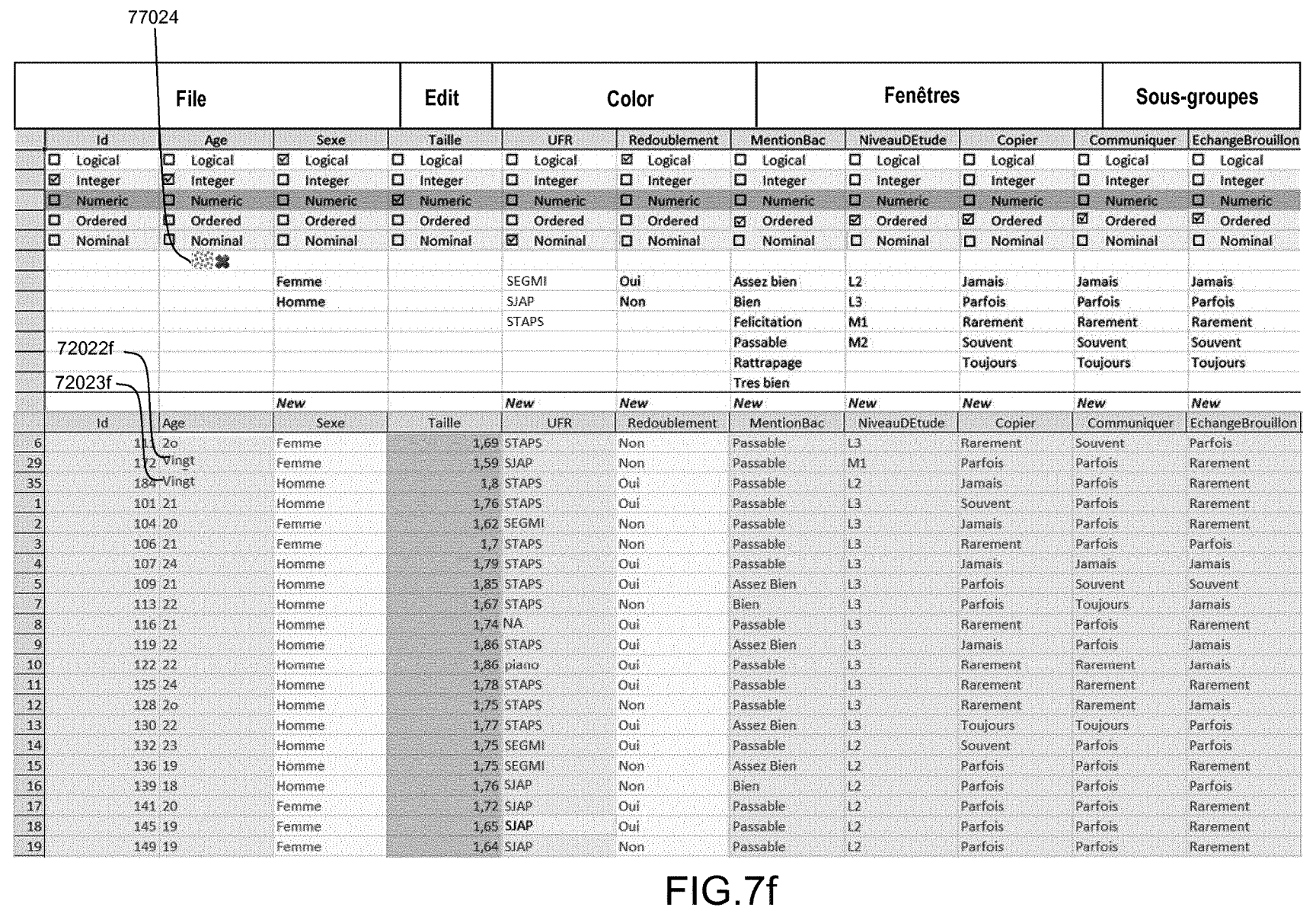

As shown in FIG. 7f, when the user enters the value "20" as the correction to perform, all the occurrences of the value "Vingt" are highlighted in a different color 72022f, 72023f in order to indicate that these values are to be modified upon validation of the changes. Therefore, all incorrect values of the variable "Age" are ready to be modified into an integer value, and no value is highlighted as incorrect value. The user can click on the validation button 77024, which is no more highlighted, in order to validate the modification.

The FIG. 7g displays the output of the modification when the user validates the changes. The type of the "Age" variable is marked as integer 7602g; the previously incorrect values are set to the integer value "20" (for example the value 72021g for the student having the Id 6) and the lines are re-ordered in the raw representation.

This example demonstrates the ability of the invention to let the user correct an incorrect type of variable due to inconsistent inputs, when a variable should be an integer. A similar modification can be performed for numeric variables. The modifications performed by the user apply to all values of the variable. This advantageously allows a removal of inconsistent values from the dataset, which improves the statistics and graphics that can be built on the dataset afterwards.

As discussed above, the representation of the values of the variable "Age" can be changed in the memory of the device. For example, if the values were initially stored in the form of string of characters, they can be casted as integers. This saves memory space and allows more efficient management of the values of the variable.

The method of modification displayed in FIGS. 7a to 7g is provided by means of example only of modifications of values of a variable to assign to a variable an integer or numeric type. This method can be adapted in many different ways to various interfaces. For example, instead of using a pop-up window, the user may enter directly corrected values in the cell that contain nominal values, and the changes can be propagated to all values of the variable that have the same modality.

Another use of the interface is to allow the user to re-order ordered values. For example, as explained above and displayed in FIG. 7g, the order of the modalities 7707g of the variable "MentionBac" is incorrect: they should rank in the following order: "Rattrapage"; "Passable"; "Assez bien"; "Bien"; "Tres bien"; "Felicitations". As discussed above, this issue can be detected easily by a user by viewing the graph 4407. The user can correct this issue by dragging and dropping modalities of the list 7707g. For example, he/she can drag and drop the modality "Rattrapage" 77071g on top on the list, then the modality "Passable" 77072g under the modality "Rattrapage", etc. . . . . This allows re-ordering the modalities in order to have proper graphs.

FIGS. 8a to 8d display an example of filtering of values based on two variables in a number of embodiment of the invention.

Another functionality of spreadsheets applications is the filtering of objects to display based on their values of variables. In the example of the dataset of students, a user of the interface may wish to view only students of a certain age, in a given faculty, etc. . . . . The filtering can be performed based on the values of one or more variables. This allows inspecting values only on a desired subset of objects. Graphs can be drawn only for a desired subset of values.

In existing applications, the selection of the values is performed using lists of all the values of a variable, wherein a user can check all the values to display. However, this action may be difficult to perform in cases of variables that allow a large number of different values, for example integer or numeric variables.

In order to allow the user to select more efficiently the objects to display, in one aspect of the invention, a processing logic of a device of the invention is configured to generate a synthetic representation type that is one of a list of modalities, a list of intervals, or a list of modalities and intervals. More specifically:

the adaptation 143 to determine the synthetic representation type based on said type of variable comprises an adaptation to set the representation type as a list of modalities if the variable is of a categorical type, and one of a list of intervals, or a list of modalities and intervals if the variable is of an integer or numeric type;

said adaptation 144 to generate the synthetic representation of values comprises an adaptation to generate a list of modalities, intervals, or combination thereof describing all the values of the variable for the plurality of object, depending on the synthetic representation type;

the processing logic 140 further comprises an adaptation to filter the values of the raw representation in order to display only values corresponding to an element of said list of modalities, intervals, or combination thereof selected by the user.

Figure 8A:
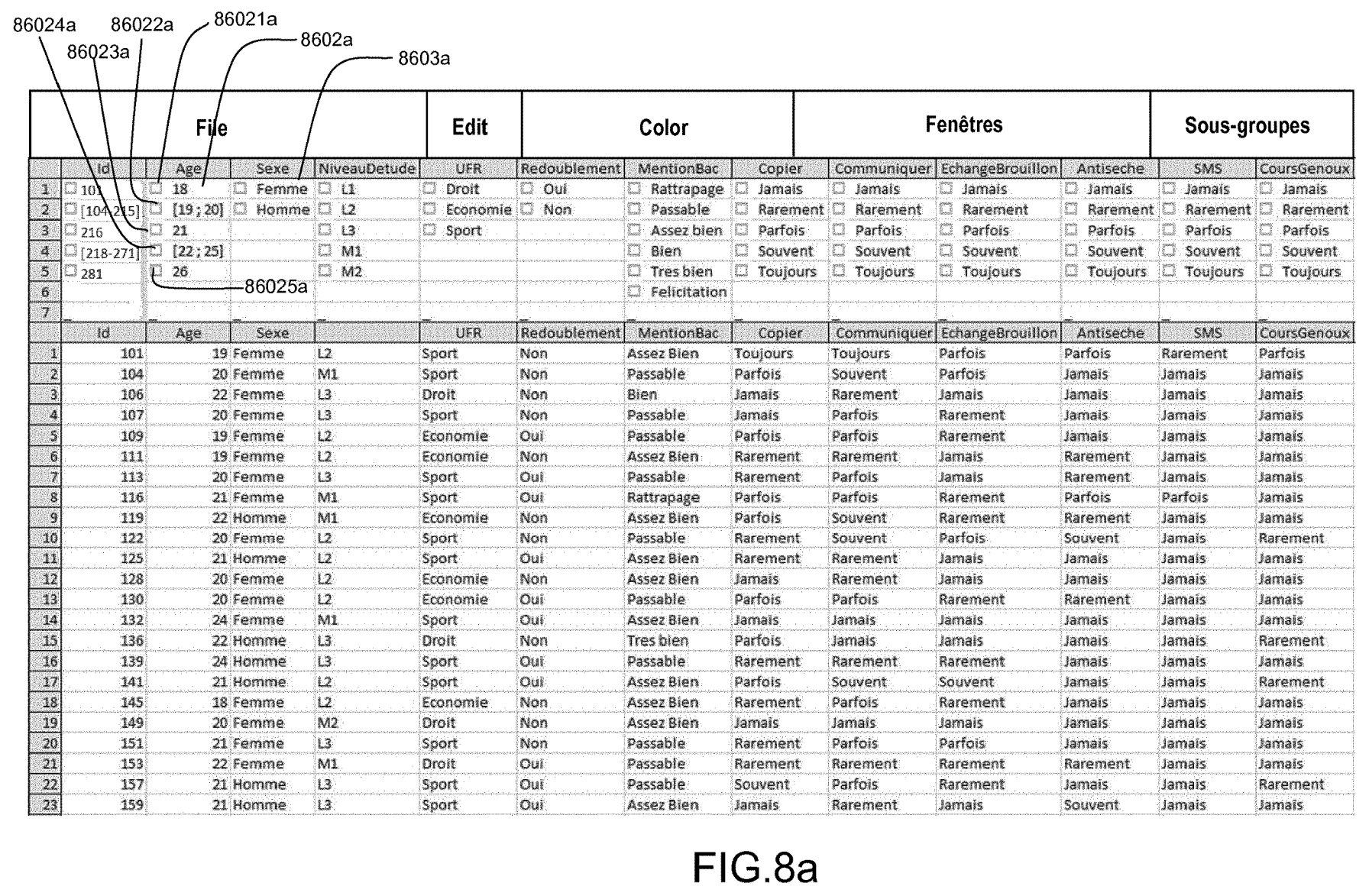

FIG. 8a displays an interface to filter values according to the invention. A synthetic representation is displayed for each variable in order to allow the user to select objects. The synthetic representation for categorical variables is a list of modalities of all the variables. For example, the synthetic representation of the variable "Sexe" is a list 8603a of the two modalities "Homme" and "Femme".

Meanwhile, the synthetic representation for integer or numerical variables is a mix of values and intervals. This allows limiting the size of the list for variable that can take a large number of different values.

According to various embodiments of the invention, the values and intervals can be defined in different ways. In this example, the synthetic representation 8602a comprises:

the minimum 86021a of the values of the variable "Age";

an interval 86022a that encompasses all of the values of the variable "Age" between the minimum and the median;

the median 86023a of the values of the variable "Age";

an interval 86024a that encompasses all of the values of the variable "Age" between the median and the maximum;

the maximum 86025a of the values of the variable "Age".

Therefore, the synthetic representation 8602a encompasses all values of the variable age, and allows the user to select easily a large number of values. Meanwhile, the combination of values and intervals allows the synthetic representation 8602a to remain compact. This synthetic representation is provided by means of example only, and other rules of definition of the values and intervals could be used for integer or numerical variables. If the user wishes to have the option to select separately all the possible values of the variable, he/she can right-click on the name of the variable "Age" on top of the synthetic representation 8602a.

FIG. 8b discloses a selection of objects by a user. For example, the variable "NiveauDEtude" has 5 modalities:

"L1", "L2", "L3", "M1" and "M2". The user clicks on the modality "M1" 8604b. Upon the selection of the user, the objects are filtered. As shown in the column 8400b, only a part of the objects are displayed in the raw representation. As shown in the column 8404b, the objects shown are those whose value of the variable "NiveauDetude" is "M1". Therefore, the selection allows the user to view only data relative the students studying for a "M1" grade. The selection could also be performed for a range of values, if this option is available. Another option is to let the user enter a formula that defines the values he/she wishes to select. For example, the user may enter simple formulas to select a plurality of values, a combination of values and intervals, etc. . . . .

Figure 8C:
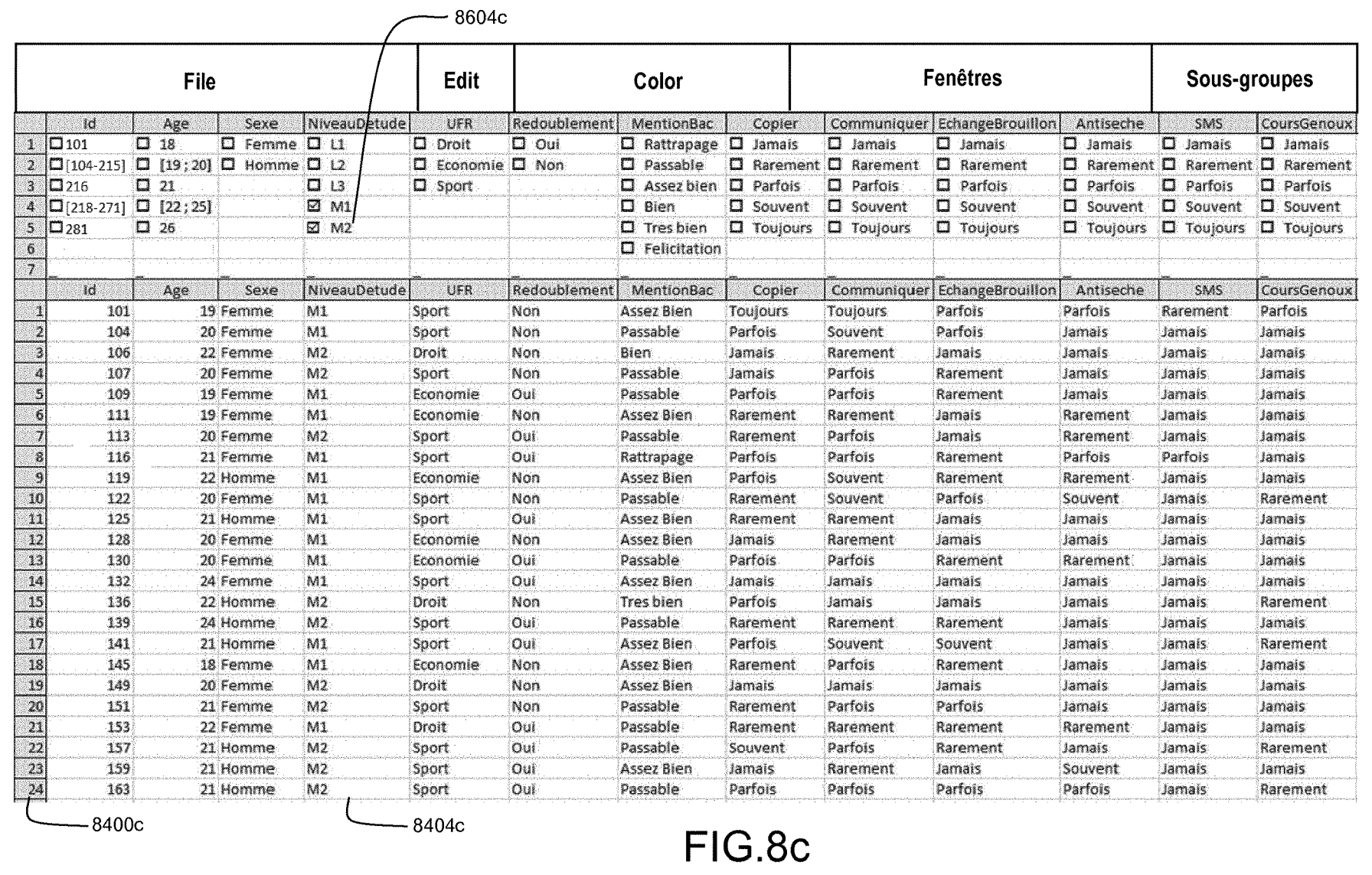

In FIG. 8c, the user modifies his/her selection by also clicking on the modality "M2" 8604c. As shown in the columns 8400c and 8404c, a larger number of objects are thus selected and represented, which corresponds to all the students that are studying for a "M1" or "M2" grade.

Figure 8D:
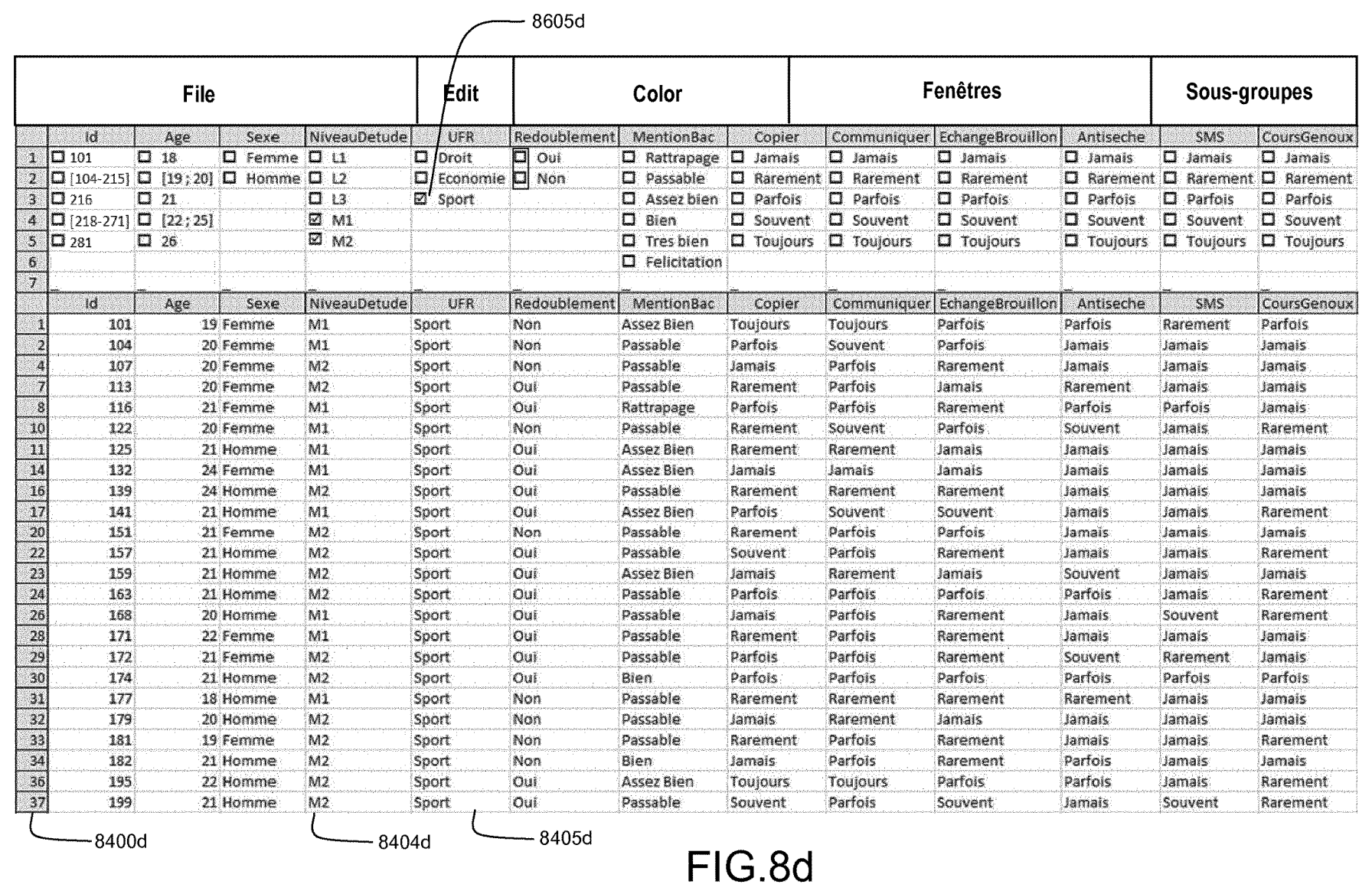

In FIG. 8d, the user further performs a filtering on the variable "UFR" that has 3 modalities "Droit" (French for law studies), "Economie" (French for economics studies), and "Sport". The user clicks on "Sport" 8605d.

Thus, the filtering is performed on two variables in the same time. As shown in columns 8400d, 8404d and 8405d, the raw representation represents the students that are either studying in "M1" or "M2", and are studying sports This example demonstrates the ability of the invention to perform selections on single or multiple variables.

FIGS. 9a to 9e display an example of highlighting values of interest depending of the types of each variable in a number of embodiments of the invention.

One objective of spreadsheet applications is to highlight the relevant information to the user. Some existing applications allow the user to highlight values by associating the output of a formula to a color. For example, a user may define rules such as "highlight values below 0 in red". However, these rules are often difficult to use for the user, and the prior art solutions lack a simple and efficient way for the user to highlight values he/she may be interested in.

In order to solve this issue, in a number of embodiments of the invention, a device of the invention is configured to display synthetic representation types consists in highlighting values in the raw representation. Furthermore:
  the adaptation 143 to determine the synthetic representation type based on said type of variable comprises an adaptation to determine said one or more types of values to highlight based on said variable type;
  the adaptation 144 to generate the synthetic representation of values comprises an adaptation to select values of the variable where to superimpose colors in the raw representation based on said types of values to highlight, and to superimpose colors on said selected values.

FIGS. 9a to 9e provide some examples of highlights.

In the FIG. 9a, the user clicks on the button 2131. This highlights the values of the variable depending on the type of each variable. For example, the binary variables (for example, "Sexe" and "Redoublement") can be highlighted in yellow; the numeric variables (for example, "Taille") in red, and the nominal variables (for example "NiveauDEtude", "UFR" or "MentionBac") in blue. This allows the user to instantaneously view the types of each variable. In this example the variable "Age" is highlighted in blue. It is indeed classified as a nominal variable because at least one student entered his/her age using letters.

In FIG. 9b, the user clicks on the button 2132. Upon the click on the button, the interface highlights the cells comprising empty values, such as for example the cells 92041b, 92081b or 92082b.

In addition of highlighting values, the invention allows the user to easily select the values he/she is interested in. In order to do so:
  the adaptation 146 to receive from said one or more input interfaces a selection by the user of an element of said representation comprises an adaptation to receive from said one or more input a selection by the user of a value highlighted in a color in the raw representation;
  the adaptation 147 to perform a selection of one or more objects corresponding to said element comprises an adaptation to select one or more objects having a value of the variable highlighted in the color.

For example, the user can click an empty value highlighted in orange for the variable "Copier" 92081b in order to indicate that he/she wishes to select and/or modify the empty values of the variable "Copier". For example, the user can click on the button 2141 in order to select all the students whose value of "Copier" is empty. If the user clicks on the button 2142, the lines corresponding to the students which are selected are furthermore displaced on top of the raw representation. If the user clicks on the button 2143, the lines corresponding to the students which are selected are displaced on top of the raw representation, and the other lines are hidden.

In the FIG. 9c, the user clicks on the button 2133. Upon the click, the cells comprising minima of integer or numeric variables are highlighted in blue, while cells comprising maxima are highlighted in red. In this example:
  the minimum of the variable "Id" is 101. It is highlighted in blue 92011c;
  the minimum of the variable "Age" is 18. The cells comprising this value in the corresponding column are highlighted in blue 92021c;
  the maximum of the variable "Age" is 24. The cells comprising this value in the corresponding column are highlighted in red 92022c;
  the minimum of the variable "Taille" is 1,55. The cells comprising this value in the corresponding column are highlighted in blue 92201c;
  the maximum of the variable "Taille" is 167 (likely input by cm instead of meters). The cells comprising this value in the corresponding column are highlighted in red 92202c.

The embodiments discussed above relative to the selection of students based on the values which are highlighted are also applicable here. For example, the user can click on one of the values highlighted in blue 92021c, in order to indicate that he/she wishes to select and/or modify these values. For example, the user can click on the button 2141 in order to select all the students whose value of "Age" is 18. If the user clicks on the button 2142, the lines corresponding to the students which are selected are furthermore displaced on top of the raw representation. If the user clicks on the button 2143, the lines corresponding to the students which are selected are displaced on top of the raw representation, and the other lines are hidden.

In the FIG. 9d the user clicks on the button 2134. Upon the button click, the very low values of integer or numerical variables are highlighted in light blue, and the very high values are highlighted in light red. The limits between very low/normal/very high values can be set for example at 2 times the standard deviation of the values of the variables below or above the average value. For example, the values below two times the standard deviation of the value below the average can be highlighted in light blue. It is for example the case of the value 92021*d* for the variable "Taille". Similarly, the values above two times the standard deviation above the average can be highlighted in light red. It is for example the case of the values 92022*d* of the variable "Taille".

In this case, the rules of selections explained above can also be used, using respectively the cells highlighted in light red or light blue.

The user can also view in the same time a combination of different types of highlights. For example, in the FIG. 9*e*, the user clicks in the same time on the buttons 2131, 2132, 2133 and 2134. All the cells that were identified in FIGS. 9*b*, 9*c* and 9*d* are highlighted in the same time: the empty cells, the cells with minimum values in blue, the cells with maximum values in red, the cells with high value in light red, and the cells with low value in light blue. A cell that could be represented as both maximum or high value is highlighted in red, such as for example the cell 92022*e*, while a cell that can be represented both in minimum or low value is highlighted in blue, such as for example the cell 92021*e*.

The embodiments discussed above relative to the selection of objects based on the value that are highlighted are also applicable here. In this example, the user has a much larger choice of variables and highlighting colors to select to perform the selection, choice and/or sort of objects.

These examples demonstrate the ability of the invention to highlight the relevant information to user in a very intuitive and friendly way.

Figure 10:
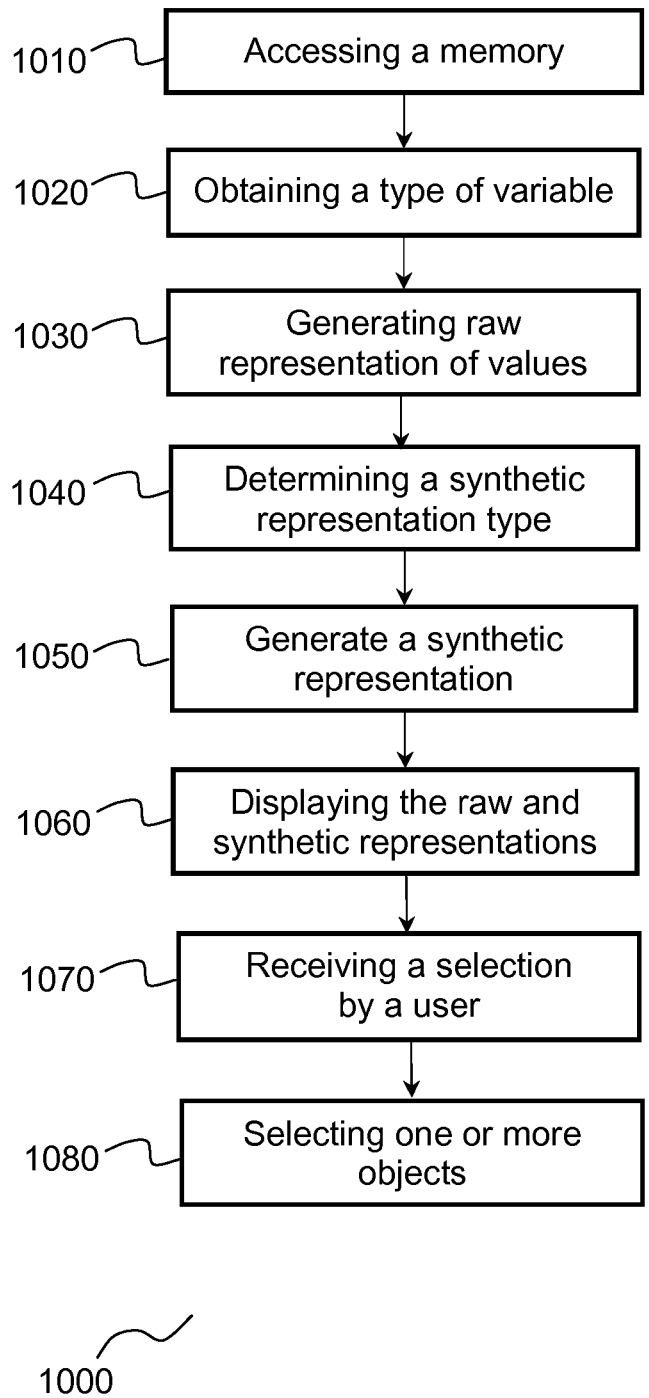
FIG. 10 displays an example of a method in a number of embodiments of the invention.

FIG. 10 displays an example of a method in a number of embodiments of the invention.

The method 1000 comprises a first step 1010 of accessing one or more memories storing a dataset comprising values of a set of variables for a plurality of objects.

The method 1000 further comprises a second step 1020 of obtaining a type of a variable in the set of variable.

The method 1000 further comprises a third step 1030 of generating a raw representation of values of said variable for said plurality of objects.

The method 1000 further comprises a fourth step 1040 of determining a synthetic representation type based on said type of variable.

The method 1000 further comprises a fifth step 1050 of generating a synthetic representation of values of said variable for said plurality of objects using said synthetic representation type, said synthetic representation comprising a plurality of elements, each element representing one or more values of the variable for one or more objects.

The method 1000 further comprises a sixth step 1060 of displaying said raw representation of values and said synthetic representation of values.

The method 1000 further comprises a seventh step of 1070 of receiving a selection by a user of an element of said synthetic representation.

The method 1000 further comprises an eighth step 1080 of selecting one or more objects corresponding to said element.

All the embodiments discussed with reference to FIGS. 1 to 9*g* are respectively applicable to the method 1000.

The examples described above are given as non limitative illustrations of embodiments of the invention. They do not in any way limit the scope of the invention which is defined by the following claims.

The invention claimed is:

1. A computing system comprising:
a display;
one or more input interfaces to receive commands from a user;
one or more memories storing a dataset comprising values of one or more sets of variables for a plurality of objects;
a processing logic comprising:
an adaptation to obtain automatically a type of a variable in one or more sets of variables;
an adaptation to generate a raw representation of values of said variable for said plurality of objects;
an adaptation to determine a synthetic representation type based on said type of variable;
an adaptation to generate a synthetic representation of values of said variable for said plurality of objects using said synthetic representation type, said synthetic representation comprising a plurality of elements, each element representing one or more values of the variable for one or more objects;
an adaptation to output said raw representation of values and said synthetic representation of values to said display;
an adaptation to receive from said one or more input interfaces a selection by the user of an element of said synthetic representation; and
an adaptation to perform a selection of all objects in said plurality of objects whose value of the variable is represented by said element,
wherein:
said synthetic representation is a list of modalities of the variable, a modality of the variable being a unique value that is assumed at least once by the variable belonging to the dataset;
said adaptation to determine the synthetic representation type based on said type of variable comprises an adaptation to determine if the variable is a categorical variable;
said adaptation to generate the synthetic representation of values comprises an adaptation to represent, if the variable is a categorical variable, modalities of the variable among the plurality of objects;
said adaptation to receive from said one or more input interfaces the selection by the user of the element of said representation comprises an adaptation to receive from said one or more input interfaces an association between a first and a second modality of the variable; and
said adaptation to perform a selection of all objects in said plurality of objects whose value of the variable is represented by said element comprises an adaptation to select one or more objects having the first modality as value of the variable, and assign the second modality as value of the variable for said one or more objects.

2. The computing system of claim 1, wherein:
the dataset comprising the values of the variable for the plurality of objects is stored in one or more files; and
the adaptation to obtain automatically a type of the variable comprises an adaptation to detect automatically the type of the variable, based on the values of said variable for the plurality of objects.

3. The computing system of claim 2, wherein said adaptation to detect automatically the type of the variable comprises an adaptation to:
retrieve a collection of text strings for all occurrences of the variable;
if the number of dictionary words in the collection of text strings is equal to two, detect the type of the variable as a binary type;

if the number of dictionary words in the collection of text strings is different from two: if each string in the collection is representative of an integer number, and if the size of each string is below a predefined threshold, detect the type of the variable as an integer type;

if each string in the collection is representative of a number, and if at least one number is a non-integer number or if the size of at least one string is above the predefined threshold, detect the type of the variable as a numeric type;

if the collection of text strings comprises at least one non-numeric character, detect the type of the variable as a nominal type.

4. The computing system of claim 1, wherein:

the synthetic representation type is an array comprising one or more statistical parameters;

said adaptation to determine the synthetic representation type based on said type of variable comprises an adaptation to determine said one or more statistical parameters based on said type of variable;

said adaptation to generate the synthetic representation of values comprises an adaptation to calculate one or more statistical parameters for said variable;

said adaptation to receive from said one or more input interfaces the selection by the user of the element of said representation comprises an adaptation to receive from said one or more input interfaces a selection by the user of a statistical parameter; and said adaptation to perform the selection of one or more objects corresponding to said element comprises an adaptation to select said one or more objects based on said statistical parameter and an adaptation to highlight values of said variable for said one or more objects in the raw representation.

5. The computing system of claim 1, wherein:

said synthetic representation is a graph, each section of the graph representing the number of occurrences of one or more values of the variable for the plurality of objects;

said adaptation to determine the synthetic representation type based on said type of variable comprises an adaptation to determine a type of graph based on the type of variable;

said adaptation to generate the synthetic representation of values comprises an adaptation to calculate a size of each section of the graph;

said adaptation to receive from said one or more input interfaces a selection by the user of an element of said representation comprises an adaptation to receive from said one or more input interfaces a selection by the user of a section of the graph; and said adaptation to perform a selection of one or more objects corresponding to said element comprises an adaptation to select said one or more objects whose value of the variable is represented by the section selected by the user.

6. The computing system of claim 1, wherein:

said synthetic representation type is one or more types of values to highlight;

said adaptation to determine the synthetic representation type based on said type of variable comprises an adaptation to determine said one or more types of values to highlight based on said type of variable;

said adaptation to generate the synthetic representation of values comprises an adaptation to select values of the variable where to superimpose colors in the raw representation based on said types of values to highlight, and to superimpose colors on said selected values;

said adaptation to receive from said one or more input interfaces a selection by the user of an element of said representation comprises an adaptation to receive from said one or more input interfaces a selection by the user of a value highlighted in a color in the raw representation; and said adaptation to perform a selection of one or more objects corresponding to said element comprises an adaptation to select one or more objects having a value of the variable highlighted in the color.

7. A computing system comprising:

a display;

one or more input interfaces to receive commands from a user;

one or more memories storing a dataset comprising values of one or more sets of variables for a plurality of objects;

a processing logic comprising:

an adaptation to obtain automatically a type of a variable in one or more sets of variables;

an adaptation to generate a raw representation of values of said variable for said plurality of objects;

an adaptation to determine a synthetic representation type based on said type of variable;

an adaptation to generate a synthetic representation of values of said variable for said plurality of objects using said synthetic representation type, said synthetic representation comprising a plurality of elements, each element representing one or more values of the variable for one or more objects;

an adaptation to output said raw representation of values and said synthetic representation of values to said display;

an adaptation to receive from said one or more input interfaces a selection by the user of an element of said synthetic representation; and an adaptation to perform a selection of all objects in said plurality of objects whose value of the variable is represented by said element, wherein:

said synthetic representation is one of a list of variable types or a combination of a list of variable types and a list of modalities of the variable, a modality of the variable being a unique value that is assumed at least once by the variable belonging to the dataset;

said adaptation to determine the synthetic representation type based on said type of variable comprises an adaptation to determine if the variable is a categorical variable;

said adaptation to generate the synthetic representation of values comprises an adaptation to represent a list of variable types and, if the variable is a categorical variable, modalities of the variable among the plurality of objects;

said adaptation to receive from said one or more input interfaces the selection by the user of the element of said representation comprises an adaptation to receive from said one or more input a selection by the user of a desired type of the variable, which is different from said type of variable; and said adaptation to perform a selection of all objects in said plurality of objects whose value of the variable is represented by said element comprises:

an adaptation to identify and output to display modalities of the variable that do not match the desired type of the variable;

an adaptation to receive from said one or more input interfaces a selection of a modality of the variable that do not match the desired type of the variable, and a replacement modality to replace said modality; and an adaptation to select one or more objects whose value of the variable is said modality that do not match the desired type of the variable, and replace said modality that do not match the desired type of the variable by said replacement modality for said one or more objects.

8. The computing system of claim 7, wherein the processing logic further comprises an adaptation to set the type of the variable as the desired type of variable, and modify representations in memory of occurrences of said variable according to said desired type of variable, when all occurrences of said variable match the desired type of variable.

9. A computing system comprising:
a display;
one or more input interfaces to receive commands from a user;
one or more memories storing a dataset comprising values of one or more sets of variables for a plurality of objects;
a processing logic comprising:
an adaptation to obtain automatically a type of a variable in one or more sets of variables;
an adaptation to generate a raw representation of values of said variable for said plurality of objects;
an adaptation to determine a synthetic representation type based on said type of variable;
an adaptation to generate a synthetic representation of values of said variable for said plurality of objects using said synthetic representation type, said synthetic representation comprising a plurality of elements, each element representing one or more values of the variable for one or more objects;
an adaptation to output said raw representation of values and said synthetic representation of values to said display;
an adaptation to receive from said one or more input interfaces a selection by the user of an element of said synthetic representation; and
an adaptation to perform a selection of all objects in said plurality of objects whose value of the variable is represented by said element,
wherein:
said synthetic representation type is one of a list of modalities, a list of intervals, or a list of modalities and intervals, a modality of the variable being a unique value that is assumed at least once by the variable belonging to the dataset;
said adaptation to determine the synthetic representation type based on said type of variable comprises an adaptation to set the representation type as a list of modalities if the variable is of a categorical type, and one of a list of intervals, or a list of modalities and intervals if the variable is of an integer or numeric type;
said adaptation to generate the synthetic representation of values comprises an adaptation to generate a list of modalities, intervals, or combination thereof describing all the values of the variable for the plurality of objects, depending on the synthetic representation type; and
the processing logic further comprises an adaptation to filter the values of the raw representation in order to display only values corresponding to an element of said list of modalities, intervals, or combination thereof selected by the user.

\* \* \* \* \*